(12) United States Patent
Lewis, Jr. et al.

(10) Patent No.: US 6,816,625 B2
(45) Date of Patent: Nov. 9, 2004

(54) DISTORTION FREE IMAGE CAPTURE SYSTEM AND METHOD

(76) Inventors: Clarence A. Lewis, Jr., 127 English Village Rd., #103, Manchester, NH (US) 03102-2441; Richard Dale Lewis, 105 Kendall Pond Rd., Windham, NH (US) 03087-1422

( * ) Notice: Subject to any disclaimer, the term of this patent is extended or adjusted under 35 U.S.C. 154(b) by 607 days.

(21) Appl. No.: 09/930,046

(22) Filed: Aug. 15, 2001

(65) Prior Publication Data

US 2002/0041383 A1 Apr. 11, 2002

Related U.S. Application Data

(60) Provisional application No. 60/225,549, filed on Aug. 16, 2000.

(51) Int. Cl.[7] .................................................. G06K 9/40
(52) U.S. Cl. ........................ 382/275; 382/141; 382/165; 382/274; 358/3.26; 358/504; 358/518
(58) Field of Search ................................. 382/141, 145, 382/148, 149, 151, 275, 165, 274; 358/504, 3.26, 3.27, 518, 520

(56) References Cited

U.S. PATENT DOCUMENTS

| | | | |
|---|---|---|---|
| 3,976,982 A | | 8/1976 | Eiselen |
| 4,557,599 A | | 12/1985 | Zimring |
| 4,581,762 A | | 4/1986 | Lapidus et al. |
| 4,618,938 A | * | 10/1986 | Sandland et al. ........... 382/148 |
| 4,938,591 A | * | 7/1990 | Anderson et al. ............. 356/73 |
| 5,014,332 A | * | 5/1991 | Nakajima et al. ........... 382/274 |
| 5,175,808 A | | 12/1992 | Sayre |
| 5,263,011 A | * | 11/1993 | Maeda et al. ............ 369/44.27 |
| 5,295,237 A | | 3/1994 | Park |
| 5,475,803 A | | 12/1995 | Stearns et al. |
| 5,572,102 A | * | 11/1996 | Goodfellow et al. ... 318/568.13 |
| 5,715,385 A | | 2/1998 | Stearns et al. |
| 5,825,483 A | | 10/1998 | Michael et al. |
| 6,026,172 A | | 2/2000 | Lewis, Jr. et al. |
| 6,137,893 A | | 10/2000 | Michael et al. |
| 6,166,366 A | | 12/2000 | Lewis, Jr. et al. |
| 6,173,087 B1 | | 1/2001 | Kumar et al. |
| 6,219,442 B1 | | 4/2001 | Harper et al. |
| 6,300,974 B1 | * | 10/2001 | Viala et al. ................... 348/61 |

* cited by examiner

Primary Examiner—Bhavesh M. Mehta
Assistant Examiner—Yosef Kassa
(74) Attorney, Agent, or Firm—Bourque & Associates, P.A.

(57) ABSTRACT

A system and method for correcting distortions that occur in image capture systems is disclosed. The present invention in some preferred embodiments includes provisions to correct or change magnification differences for all causes including position errors in zoom lens positioning mechanisms as well as those caused by chromatic aberration, CCD alignment errors, lens distortion off center variations, pincushion/barrel lens distortion, magnification distortions, camera and lens misalignment errors, and lighting variations (including flash-to-flash illumination variations). A significant feature of the present invention in contrast with the prior art is that with the use of a movable calibration plate in the present invention it is possible to image capture both the calibration plate and the input object image in a single image capture, thus permitting simultaneous compensation for a variety of lighting and illumination variations not possible with the prior art.

33 Claims, 83 Drawing Sheets

BARREL DISTORTION

% DISTORTION = $\Delta h/h \times 100$

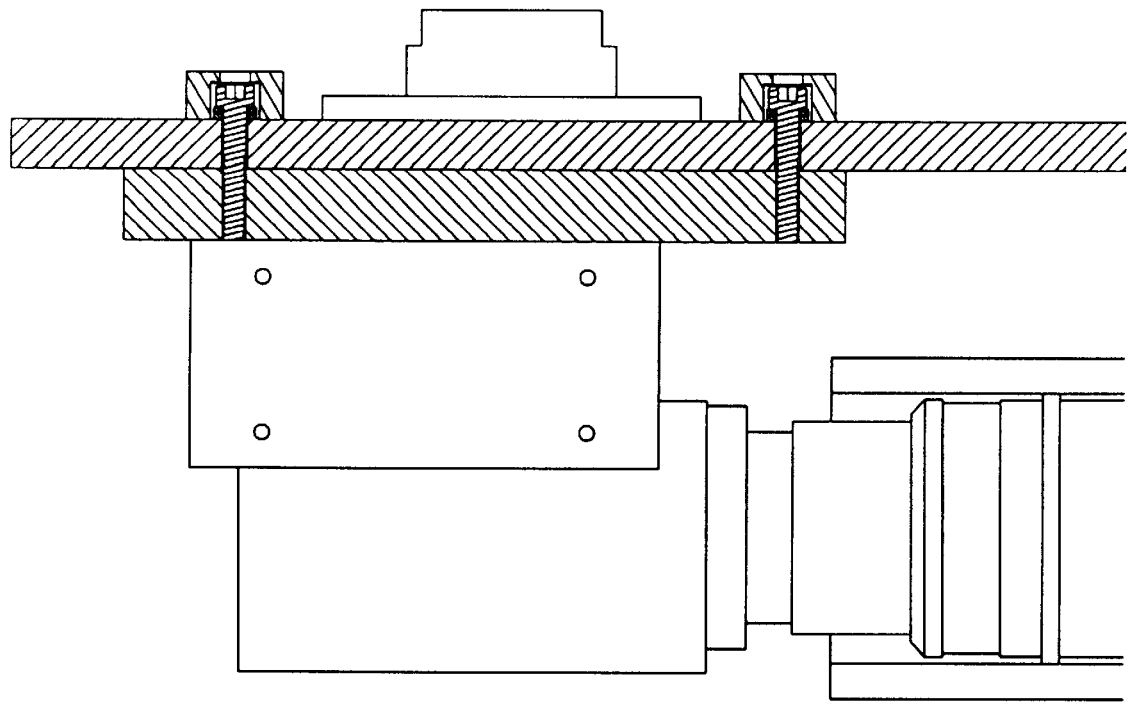
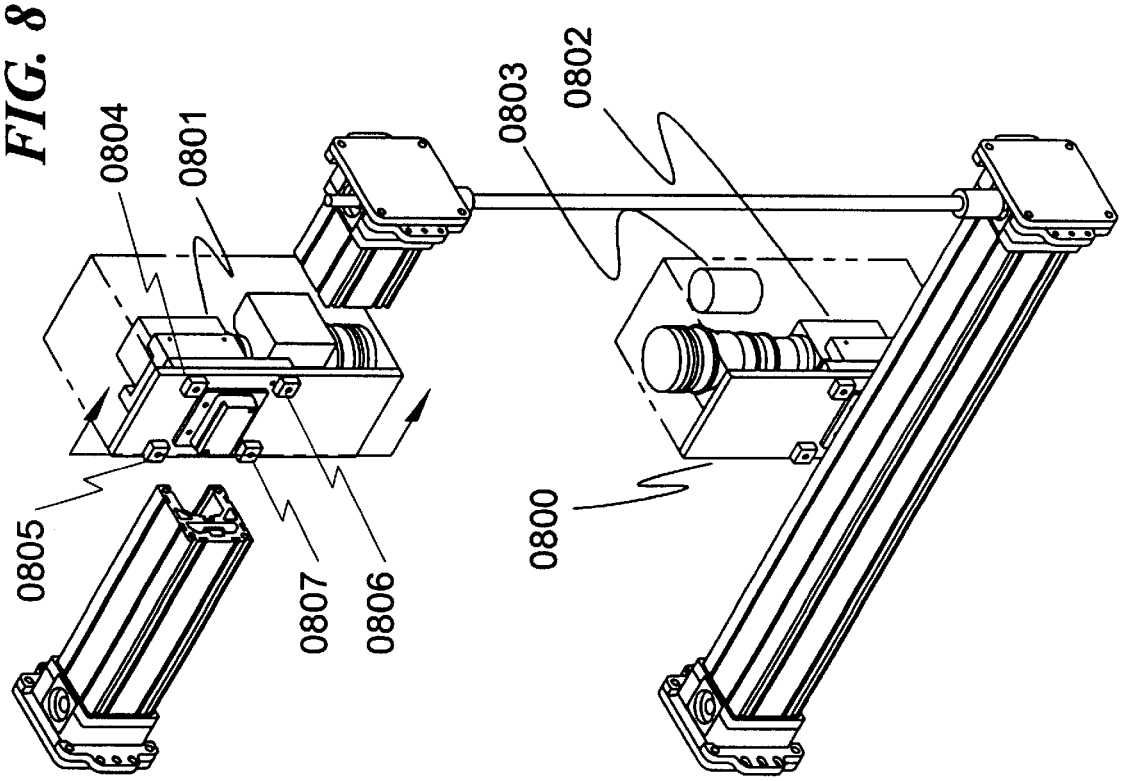
FIG. 8

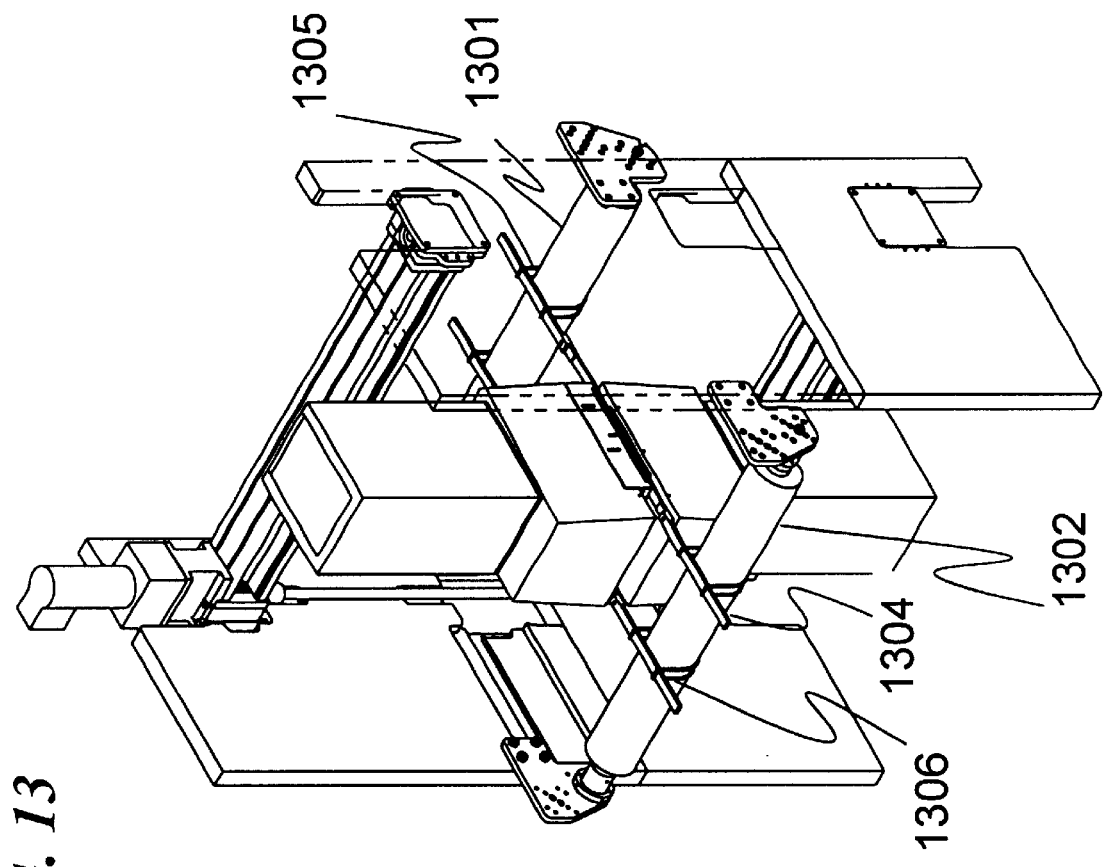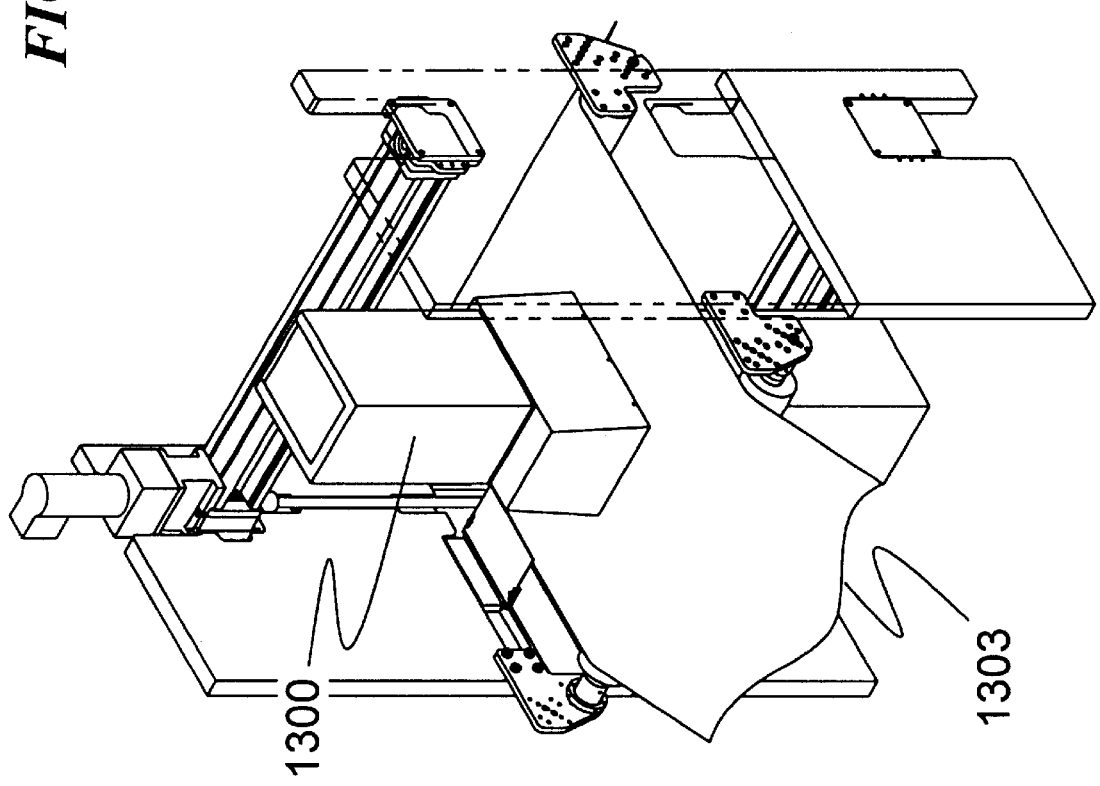
FIG. 13

DISTORTION FREE IMAGE CAPTURE SYSTEM AND METHOD

CROSS REFERENCE TO RELATED APPLICATIONS

PROVISIONAL PATENT APPLICATIONS

Applicant claims benefit pursuant to 35 U.S.C. § 119 and hereby incorporates by reference Provisional Patent Application for "DISTORTION FREE IMAGE CAPTURE SYSTEM AND METHOD" patent application Ser. No. 60/225,549, filed Aug. 16, 2000, and submitted to the USPTO with Express Mail Label EM267140291US.

ZOOM LENS CALIBRATION

This patent application incorporates by reference U.S. Pat. No. 6,026,172 issued on Feb. 15, 2000 to Clarence A. Lewis, Jr. and Richard Dale Lewis for SYSTEM AND METHOD FOR ZOOM LENS CALIBRATION AND METHOD USING SAME. Some of the techniques mentioned in this patent application make direct use of the methodologies disclosed in this patent.

REGISTER MARK RECOGNITION

Applicants incorporate by reference U.S. Utility Patent Application tilted SYSTEM AND METHOD FOR REGISTERED MARK RECOGNITION, Ser. No. 09/422,720, filed Oct. 22, 1999 and submitted to the USPTO with Express Mail Label E267140141US.

Applicants incorporate by reference U.S. Provisional Patent Application titled SYSTEM AND METHOD FOR REGISTERED MARK RECOGNITION, Ser. No. 60/105,456, filed Oct. 23, 1998 and submitted to the USPTO with Express Mail Label EM267141354US.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related in the general area of image capture and processing systems where images of objects are obtained using cameras, computers, and lighting systems that are then processed through software for a variety of measurement and control applications.

Various distortions inherent in cameras, lenses, mounting and lighting systems produce inaccuracies between the object and its stored image thus limiting applications of image capture and image processing where accurate measurement and control of objects is required.

The present invention provides a means for the measurement and correction of all combined geometric distortions of a camera, lens, lighting and computer system that produce a distortion free computer image at the correct magnification that is an exact duplication of the object from which the computer image is generated. The present invention eliminates distortions that are inherent in cameras, all types of lenses and lens systems including fixed and zoom lens, with all lighting systems and will in addition correct distortions that occur due to alignment errors in cameras and lens systems.

The present invention has further application in the field of inspection and control where images from any number of different sources must be compared on a minute pixel to pixel basis. The sources can be but are not limited to images obtained from different cameras, lenses and lighting systems, and computer digital files. These images are all corrected for distortion and are scaled to the same magnification using the present invention disclosed within this disclosure.

BACKGROUND OF THE INVENTION

In the field of computerized image processing, images of objects are generally captured and stored in computer memory. The image of an object is usually first digitized using a CCD type linear or area camera with a fixed or variable field of view zoom lens. The object is illuminated with various types of lighting systems including continuous illumination such as provided with an incandescence or halogen lamp and or high intensity very short duration lighting such as provided by a xenon flash tubes or other light source.

Each of these components (cameras, lens, lighting systems and camera-lens mounting) introduce various types of distortions that prevent an accurate geometric representation between the object and the stored image of the object. These inaccuracies or geometric distortions limit the use of image capture and processing where accurate measurement and control of objects is required.

The present invention also discloses a method for measuring and correcting all of the geometric distortions to be described under Prior Art. The present invention thus provides a means for implementing a multitude of new image processing applications where accurate measurement and control are required. A number of applications that employ the present invention will be described in this disclosure.

A secondary major advantage of the present invention is that it provides a means for significant cost reduction of all components used in image capture systems. It enables the use of increased manufacturing tolerances such as less accurate prisms, and location of CCD chips on the prisms, lower cost material such as plastic lenses and the elimination of multiple substrates used in chromatic correction in lenses to name a few. The resulting distortions and accuracy will still be considerably more preferable when using the present invention with lower cost components as compared with the prior art technologies.

DESCRIPTION OF THE PRIOR ART

Overview

In the prior art the reduction of distortions has focused on a method for the reduction of each individual distortion by concentrating on its cause with the introduction of changes that focus on the reduction of the magnitude of the distortion. Some approaches have included changing or improving processes, changing or selecting different materials, improvements in mechanical and electrical design and improved assembly techniques.

Open Loop Correction

These prior art approaches to the reduction of distortions are what can be referred to as open loop solutions. That is, a change is made in a device that reduces the magnitude of a particular distortion. All future devices that incorporate this change will then exhibit the same degree of improvement.

Closed Loop Correction

The present invention provides a closed loop solution to the measurement and correction for all causes of image distortion. These corrections are then made to every pixel every time a new image is captured thus providing a geometrically perfect (or near perfect) image.

RELEVANT PATENTS

The prior art contains a plethora of patents in regards to image correction. Some of interest in discussing the present invention are the following:

U.S. Pat. No. 3,976,982 issued to Everett Truman Eiselen on Aug. 24, 1976 for APPARATUS FOR IMAGE MANIPULATION that discloses a rudimentary system capable of scaling and manipulating a digital image.

U.S. Pat. No. 4,557,599 issued to Bruce Zimring on Dec. 10, 1985 for CALIBRATION AND ALIGNMENT TARGET PLATE that discloses a rudimentary target calibration plate used for microscopic analysis.

U.S. Pat. No. 4,581,762 issued to Stanley N. Lapidus, et. al., on Apr. 8, 1986 for VISION INSPECTION SYSTEM that discloses a vision inspection system that permits comparison of selected regions of a known object to an unknown object.

U.S. Pat. No. 5,175,808 issued to Rick Sayre on Dec. 29, 1992 for METHOD AND APPARATUS FOR NON-AFFINE IMAGE WARPING that discloses a system that permits arbitrary warping of an image.

U.S. Pat. No. 5,295,237 issued to You-keun Park on Mar. 15, 1994 for IMAGE ROTATION METHOD AND IMAGE ROTATION PROCESSING APPARATUS that discloses a system for image rotation and image processing.

U.S. Pat. No. 5,475,803 issued to Charles C. Stearns, et. al., on Dec. 12, 1995 for METHOD FOR 2-D AFFINE TRANSFORMATION OF IMAGES that discloses a system for interleaved affine transformations.

U.S. Pat. No. 5,715,385 issued to Charles C. Stearns, et. al. on Feb. 3, 1998 for METHOD FOR 2-D AFFINE TRANSFORMATION OF IMAGES that discloses a system for interleaved image transformations.

U.S. Pat. No. 5,825,483 issued to David Michael, et. al., on Oct. 20, 1998 for MULTIPLE FIELD OF VIEW CALIBRATION PLATE HAVING A REGULAR ARRAY OF FEATURES FOR USE IN SEMICONDUCTOR MANUFACTURING that discloses a multiple field of view calibration plate.

U.S. Pat. No. 6,026,172 issued to Clarence A. Lewis, Jr., et. al., on Feb. 15, 2000 for SYSTEM AND METHOD FOR ZOOM LENS CALIBRATION AND METHOD USING SAME that discloses a method to calibrate a zoom lens based on a fixed calibration plate.

U.S. Pat. No. 6,137,893 issued to David Michael, et. al., on Oct. 24, 2000 for MACHINE VISION CALIBRATION TARGETS AND METHODS OF DETERMINING THEIR LOCATION AND ORIENTATION IN AN IMAGE that discloses a machine vision method of analyzing a calibration plate having different colors, contrast, or brightness.

U.S. Pat. No. 6,166,366 issued to Clarence A. Lewis, Jr., et. al., on Dec. 26, 2000 for SYSTEM AND METHOD FOR MONITORING AND CONTROLLING THE DEPOSITION OF PATTERN AND OVERALL MATERIAL COATINGS that discloses a method of optical and image processing to monitor and control the quality control of pattern and material coatings applied to web materials based on image processing techniques.

U.S. Pat. No. 6,173,087 issued to Rakesh Kumar, et. al., on Jan. 9, 2001 for MULTI-VIEW IMAGE REGISTRATION WITH APPLICATION TO MOSAICING AND LENS DISTORTION CORRECTION that discloses a system for multi-image alignment that does not rely on the measurements of a reference image being distortion free.

U.S. Pat. No. 6,219,442 issued to Benny Michael Harper, et. al., on Apr. 17, 2001 for APPARATUS AND METHOD FOR MEASURING DISTORTION OF A VISIBLE PATTERN ON A SUBSTRATE BY VIEWING PREDETERMINED PORTIONS THEREOF that discloses an inspection station for determine the characteristics of a visible overlay pattern on a substrate.

While the prior art teaches some forms of image correction, the prior art is deficient in that there is no teaching of how one skilled in the art might enable correction of all the known types of optical and electronic distortion that are present in a modern image capturing system. Specifically, the prior art fails to teach how it is possible to simultaneously correct for errors in the cameras, lenses, and lighting systems that are present within a modern image capturing system.

SOURCES OF ERROR CORRECTED BY THE PRESENT INVENTION

The following is a description of the common causes of geometric distortion in cameras, lenses, and lighting systems that are eliminated using the present invention. The nature of each distortion, its cause and the prior art solutions for its reduction is included. Also included is the significant feature that the present invention provides relative to the elimination of the particular distortion.

Chromatic Aberration

This is a common distortion in all lenses that arises from dispersion of the RED, GREEN and BLUE planes. It is caused by the refractive index of glass that varies with the wavelength of light passing through the lens. It appears as registration errors between the RED, GREEN, and BLUE are particularly noticeable at higher magnifications and at the extremities of the image. Prior art approaches to reducing chromatic aberration included the construction of lenses from combinations of materials that exhibit unusual dispersion characteristics not found in optical glass. In the past lenses were constructed of two or three different materials to reduce this problem.

Today Cannon™ brand lenses uses fluorite in the construction of the lenses to reduce chromatic aberration. The present invention eliminates the mis-registration of the RED, GREEN and BLUE planes that are visually objectionable at the extremes of the image. It allows the use of lower cost materials in lens manufacture such as plastic for optical and special materials presently used to reduce chromatic aberrations.

CCD Alignment Errors

In the manufacture of high quality cameras, three imaging devices are mounted on a prism so that each image can be broken into the RED, GREEN and BLUE primary colors.

The location of each imaging device is critical with any misalignment between the three imaging devises introducing a registration error between the RED, GREEN, and BLUE planes.

The present invention will reduce the cost of cameras by allowing much greater variations in the location of the imaging chips on a prism that can be corrected in each image according to the present invention.

Lens Distortion Off Center Variations

All conventional lenses produce geometric distortions in images that are off axis to the lens. Prior art approaches to reducing off center distortions of lenses have included a combination lens called a telecentric lens. This lens reduces off center distortions by reducing perspective or magnification errors. It is used in machine vision applications for fixed lens applications. The concept does not have application on variable field of view zoom lenses.

Lens Distortion: Pincushion, Barrel Distortion

All lenses exhibit either a pincushion distortion effect FIG. 4, or a barrel distortion effect FIG. 5 due to the curvature of the lens. In fixed lens applications these distortions can be greatly minimized. However, in a zoom lens these distortions are substantial because of the multiplicity and complexity of the large number of lenses required and used in the manufacture of a zoom lens. The magnitude of these distortions as reported by Cannon™ for a typical zoom lens is represented in Table 1. Typical distortion is about 2% negative (barrel distortion) in the wide angle position to about 0.5% positive (pincushion distortion) in the telephoto position.

TABLE 1

Distortion of 16 to 1 Zoom Lens

| Zoom Magnification | Field Of View | | Distortion | | | X-inches/ |
|---|---|---|---|---|---|---|
| | X inches | Y inches | % | Inches | # of pixels | pixel 512 array |
| 1 | 10 | 7.5 | 2.0 | 0.200 | 10.240 | 0.020 |
| 2 | 5 | 3.8 | 1.5 | 0.075 | 7.680 | 0.010 |
| 4 | 2.5 | 1.9 | 1.0 | 0.025 | 5.120 | 0.005 |
| 8 | 1.3 | 0.9 | 0.8 | 0.008 | 3.072 | 0.002 |
| 16 | 0.6 | 0.5 | 0.5 | 0.003 | 2.560 | 0.001 |

It can be seen from Table 1 that the total distortion for each zoom setting in number of pixels is many times the pixel distance increasing rapidly for the larger fields of views. The distortion is greatest 0.2 inches at maximum field of view (10 inches) representing 75 square inches. (XY= 10×7.5)] falling off to 0.003 inches at minimum field of view (0.6 inches) whose image covers 0.3 square inches. (XY= 6×0.5).

Thus, if it was desirable to detect a defect equal to a pixel at the 10-inch field of view (0.02 inch) it would require the use of the field of view for zoom position 4 where the distortion is nearly equal (0.025 inch). In this zoom position the image area or field of view is 2.5 by 1.9 representing 4.5 square inches.

Because of this distortion it would be necessary to process 17 images to equal one image of 10 inches by 7.5 inches, whereas with the elimination of distortion according to this disclosure only one 10-inch by 7.5-inch image need be processed.

Magnification Distortions

All lens camera and lighting systems exhibit variations in magnification that prevent an accurate comparison between two images from two different sources. These magnification errors have limited the applications where accurate comparison between two images on a pixel by pixel basis is required for the purpose of detecting minute differences.

This present invention disclosure provides the capability for the correction of magnification differences at the same time as corrections for other distortions is accomplished. This enables a very accurate pixel by pixel comparison between images obtained from any number of different camera lens systems, and between stored files of the geometric dimensions of the object.

Zoom Lens Position and Magnification Distortions

In U.S. Pat. No. 6,026,172, "SYSTEM AND METHOD FOR ZOOM LENS CALIBRATION AND METHOD USING SAME", the errors of magnification due to the non-repeatability of the zoom positioning mechanism was discussed in detail. The disclosure in this patent presented a method of calibration of each final zoom position using a duplicate mark pattern of known distance between marks. It made no attempt to correct the magnification caused by the zoom lens positioning mechanism nor did it address or attempt to correct the other geometric distortions as described.

The main patented feature of U.S. Pat. No. 6,026,172 was the capability of limited error measurement between marks of a mark pattern used in the measurement and control of color registration on a multicolor press. The present invention disclosure is quite different in that it includes provisions to correct or change magnification differences for all causes including position errors in the zoom lens positioning mechanism. This provides the capability for applications where images are compared with a stored master where the images of both must be at the same magnification or else the images cannot be examined on a pixel by pixel basis and thus would be incapable of detecting small discrepancies.

Thus, in applications of a zoom lens where the zoom is frequently repositioned to the same position or to any number of different zoom positions, the present invention provides a means to correct the magnification of any image for zoom lens positioning errors as well as for all other distortions such as have been described. Images can be corrected for zoom positioning errors to provide the same magnification of a stored image with the capability of comparison between the stored master and the corrected image. The method provided by this present invention disclosure provides a means of eliminating the magnification error due to lens motor positioning errors and to magnify the image through software to any degree required for image matching.

Camera and Lens Misalignment Error

There are applications where it is desirable to angle the camera. Two such applications are where spectral reflection is desired instead of diffuse light such as when inspecting clear or glossy coatings, and or where space limitations dictate that the camera must be mounted other than perpendicular to the object plane. For these applications and others like them the distortion due to the angular position of the camera can also be eliminated providing an image that would result if the camera were mounted perpendicular to the object plane.

Lighting Variations

All image processing applications using camera based imaging employ some type of lighting system. It is very difficult if not impossible to achieve even lighting over the entire field of view. As the field of view increases this problem becomes even more difficult. These variations in intensity produce errors in the image especially when used for color measurement and control.

This present invention disclosure provides a means for measuring and correcting the lighting intensity over the entire field of view of the camera and lens system.

Flash-to-Flash Variations

An additional lighting error is caused by the flash-to-flash variations that are common in every strobe. While presently available stroboscopic tubes such as those manufactured by EG&G have reduced flash to flash variations to 5% or less these variations are still significant when measuring and controlling color. The present invention enables the introduction of white targets within the field of view. These white targets allow direct measurement of the lighting intensity for every flash providing the ability to correct for flash-to-flash variations. Either the stored lighting values can be recalled after measurement of the lighting intensity measured at a single white target or a number of white targets can be used to compensate for non-repetitive variations in flash-to-flash lighting over a greater percentage of the field of view.

OBJECTIVES OF THE INVENTION

Exemplary Goals

Accordingly, the objectives of the present invention are (among others) to circumvent the deficiencies in the prior art and affect the following aspirational goals:

(1) To provide a means of measurement and correction of the following geometric distortions common in image capture systems with the objective of providing an accurate geometric representation between an object and its stored image.
  (a) Eliminate geometric distortion caused by chromatic aberration.
  (b) Eliminate geometric distortion caused by errors in the location and registration of imaging chips within cameras.
  (c) Eliminate geometric distortion caused by images located off center of a lens system.
  (d) Eliminate geometric distortion due to the curvature of lenses within a lens system that produce pincushion or barrel distortion of the image.
  (e) Eliminate magnification distortion errors because of non-repetitive positional errors of the motorized zoom positional mechanism.
  (f) Eliminate distortion errors due to angular misalignment of the camera and lens system.
  (g) Provide an accurate representation of background lighting and its variations over the entire field of view for any camera, lens, and lighting system (including correction of flash-to-flash stroboscopic variations).
  (h) Provide a means for the measurement and correction of the combined distortions of 1$a$ through 1$g$ above for any image obtained from a combination of cameras, fixed or zoom lenses and lighting systems and camera traversing mechanisms. The resulting stored image will be an exact geometric representation of the object from which the image has been obtained.
  (i) Provide (1)($a$) through (1)($g$) above for any camera and lighting system that include either a fixed focal distance lenses, or for any setting of a zoom lens throughout its entire zoom range.

(2) Applications: Applications due to (1)($a$) through (1)($g$).
  (a) Provide the capability for comparison on a pixel by pixel basis, a distortion free image obtained using the present invention of the same magnification of an image obtained from another source or from the same image capture system or another image capture system.
  (b) Provide the capability for comparison on a pixel by pixel basis, a distortion free image obtained from an image capture system of the same magnification as that of a stored image obtained from another source. This other source can be from a computer located in the same location or from data received over telephone lines, satellite and or the Internet.
  (c) Provide the capability for comparison on a pixel by pixel basis, a distortion free image obtained from an image capture system of the same magnification as that of a stored image obtained from another source. This other source can be from a computer located in the same location or from data received over telephone lines, satellite and or the Internet. Measure and compare on a continuous basis differences between the following ideal stored image parameters and the same parameters and locations in images obtained from the image capture system: Color, Register, Dot gain, Defects.
  (d) Provide undistorted images of the same magnification at multiple remote image capture cites for comparison and quality control purposes with a digital image transmitted by satellite telephone or Internet.
  (e) Provide two opposing cameras with undistorted images of the same magnification taken simultaneously for the purposes of measuring and controlling front to back registration.
  (f) Provide the capability of mounting cameras at an angle providing undistorted images as if the camera were mounted vertically.

(3) To reduce costs of cameras, lenses, and lighting systems by incorporating lower cost alternatives that by themselves introduce greater distortions, but result in significantly lower distortions when incorporated in a camera, lens, and lighting system that employ the subject of this disclosure.
  (a) The substitution of low cost plastic lenses for costly composite lenses manufactured using exotic materials of unusual dispersion characteristics for the sole purpose of reducing chromatic aberration.
  (b) The use and substitution of a simple low cost lens for multiple lenses and the more costly telecentric lens system that reduces the off center viewing angle error.
  (c) The substitution of low cost zoom lens that would exhibit intolerable barrel and pincushion distortion but when incorporated with cameras and lighting system that include the method of this disclosure provides virtually distortion free images.
  (d) Provide low cost prisms and a simplified lower cost method of locating imaging chips on the prisms. These lower cost cameras when incorporated in cameras, lenses and lighting systems that include the method of this disclosure provide virtually perfect registration of the RED, BLUE, and GREEN planes.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

Exemplary Advantages of the Present Invention

The following list details some of the advantages possible in some preferred embodiments of the present invention:
1. The present invention permits image processing (the capability of capturing an image, storing it and altering it through a computer algorithm) to occur with respect to both the calibration plate and the resulting captured image.

2. The present invention permits the capture of a full or partial field of view camera image of a calibration plate where the calibration plate is composed of a series of image recognizable objects of know very accurate dimensions.
3. The present invention has the ability to compute the actual and absolute pixel positions as defined by the calibration plate and the pixel positions do to geometric distortion for all caused in the acquired camera images. The capability of calculating the error for each pixel to provide a camera image that is geometrically equal to the actual image.
4. The present invention has the ability to provide corrections for geometric distortion and to provide for magnification of the image at the same time.
5. The present invention has the ability to provide these corrections to the image.
6. The present invention has the ability to provide the same geometric corrections to a white background and to provide for additional corrections for variations in lighting and flash-to-flash variations in illumination.
7. The present invention has the ability to inspect images after corrections to be compared with the same corrected images stored in memory.
8. The ability to have the same calibration plates located in remote locations with the ability to have difference cameras geometrically equivalent to provide conformity in geometric and color consistency. This allows one-to-one comparison of a computer prepress stored image with the actual printed image for comparison, registration and color measurement and control. Remote images can be verified in any location all using the same calibrations plates.
9. The present invention has the ability simultaneously perform correction of geometric variations, lighting variations, magnification, and flash-to-flash stroboscopic variations.
10. The present invention has the ability to compare prepress undistorted images including transmitted images over phone lines (and the like) with distortion corrected images from the image capture device including flash-to-flash variations.

While this list is not exhaustive or limitive of the scope of the present invention, it does serve in some instances to contrast the present invention from the prior art.

BRIEF SUMMARY OF THE INVENTION

All image acquisition systems include some means of acquiring a digitized image of an object. Each image acquisition system includes at a minimum: a camera, lens, a lighting system and a computer means that generates an image acquisition cycle that obtains and stores an image of any object in the field of view of the camera in computer memory.

There are a number of sources of distortions that prevent the stored image from being geometrically identical to the object from which the image is generated. This disclosure provides a means for measuring and correcting a composite of all of the distortions that prevent the stored image from being geometrically identical to the object.

A specially designed calibration plate (FIG. 9) is installed in the field of view of the camera and lens system. This calibration plate includes high contrast (typically black on white) 1 mm squares (size and geometry are typical) spaced very accurately over the entire field of view of the camera and lens system. The calibration plate includes a centering object that is used to align the centerline of the camera to the calibration plate. Using image processing techniques each square in both the X and Y dimensions is recognized and its actual pixel position in X,Y coordinates recorded. The actual position of the pixels with no geometric distortion is calculated from the known dimensions of the individual squares.

The offset displacement that would be required for the image to achieve perfect geometric integrity is then calculated. Thereafter for every image generated every pixel is first displaced by this offset thus providing perfect geometric representation of the object.

A similar technique is used to determine the variation in the lighting system over the entire field of view of a camera and lens system. The calibration plate is replaced by a white (or other neutral color) plate that covers the entire field of view of the camera and lens system.

BRIEF DESCRIPTION OF THE DRAWINGS

For a fuller understanding of the advantages provided by the present invention, reference should be made to the following detailed description together with the accompanying drawings wherein:

FIG. 8 illustrates an expanded view of an exemplary system embodiment of the present invention utilizing a two camera image capture system;

FIG. 13 illustrates an exemplary system embodiment of the present invention utilizing a two camera image capture system with printing media and processing rollers installed;

DESCRIPTION OF THE PRESENTLY PREFERRED EXEMPLARY EMBODIMENTS

Embodiments are Exemplary

Figure 1:
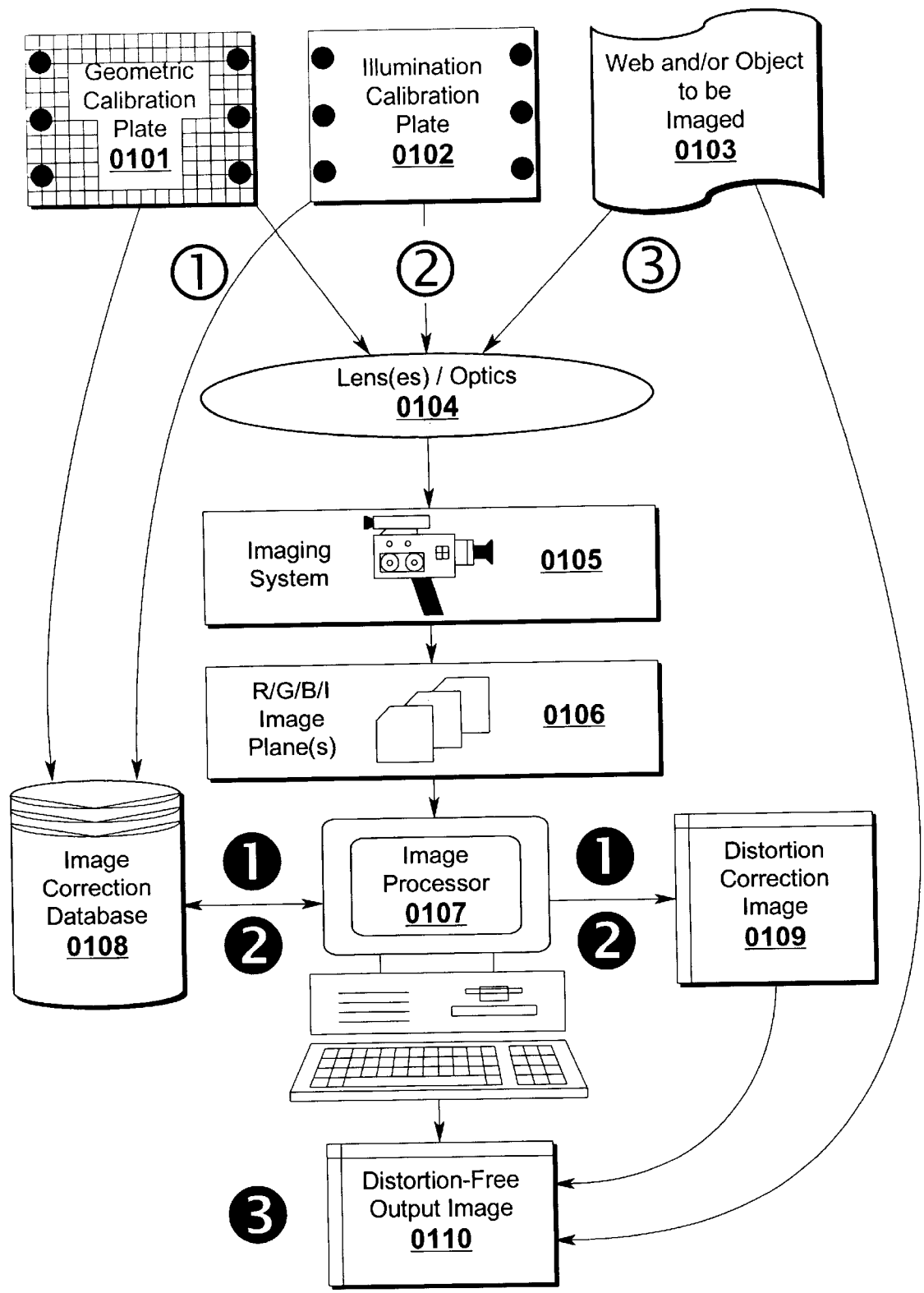
FIG. 1 illustrates an exemplary system embodiment of the present invention.

While the present invention is susceptible of embodiment in many different forms, there is shown in the drawings and will herein be described in detailed preferred embodiment of the present invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of a DISTORTION FREE IMAGE CAPTURE SYSTEM AND METHOD. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Operating System not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface.

Measurement System is Exemplary

While the preferred embodiments may make use of many measurements in millimeters, inches, or the like, there is no express limitation in the disclosed system to use either system of measurement. More specifically, many examples provided herein utilize 1-millimeter (mm) targets, which one skilled in the art will quickly recognize as being amenable to any suitable size in any measurement system.

Thresholds are Exemplary

The disclosed system and method in many cases make use of thresholds in the context of an 8-bit camera system. There is nothing critical about these thresholds and one skilled in the art will quickly recognize that they may be adapted to other types of camera systems with varying resolutions. Specifically, reference will be made to values of 128 and 220, when in fact these generally represent a half-saturation and near full saturation value.

System

Overview

Referencing FIG. 1, an exemplary system embodiment of the present invention is depicted in which a geometric calibration plate (0101) and/or an illumination calibration plate (0102) is imaged through lens(es) and/or optics (0104) with an imaging system (0105) to generate RED, GREEN, BLUE, and/or INTENSITY plane(s) (0106). These plane(s) (0106) are then processed by an image processor (0107) to generate an image correction database (0108). This database (0108) is then used to create a distortion correction image (0109). The distortion correction image (0109) when applied to a web and/or object to be imaged (0103) through the same lens(es)/optics (0104), imaging system (0105), image plane (s) (0106) and image processor (0107) will then produce a distortion-free output image (0110).

This distortion-free output image (0110) has unique properties in that a plethora of inaccuracies associated with the imaging process have been completely compensated for and as a result the output image (0110) has a high degree of quality and accuracy, irrespective of whether the lens(es)/optics (0104), imaging system (0105) and/or image plane(s) are expensive or of high quality. Thus, the system as described is designed specifically to compensate for both the inaccuracies and quality of each component in the imaging system.

Figure 2:
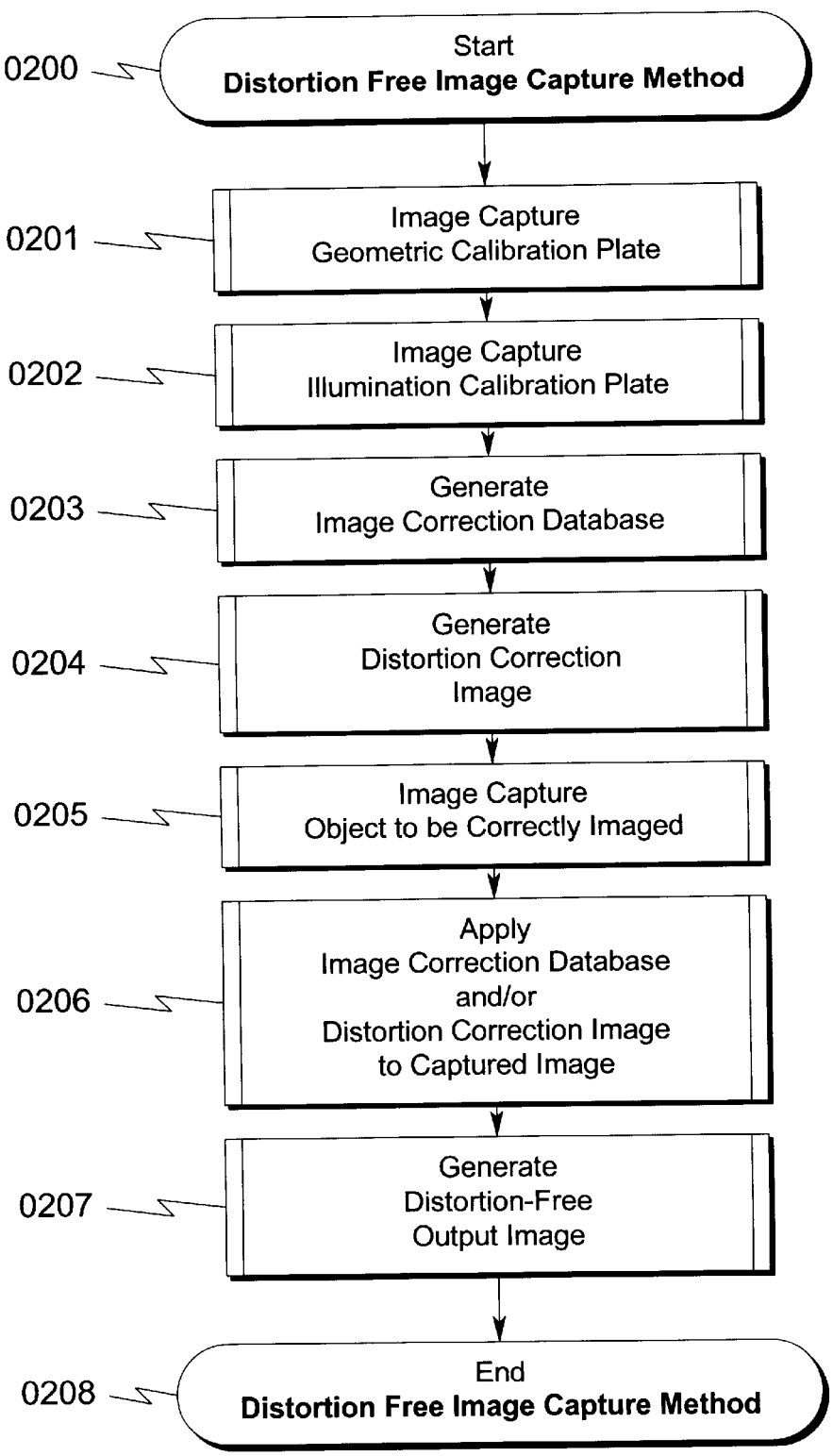
FIG. 2 illustrates an exemplary method embodiment of the present invention.

Referencing FIG. 2, the general method associated with the system embodiment of FIG. 1 is illustrated (0200) in terms of generic steps associated with capturing the geometric and/or image calibration plate(s) (0201, 0202), computation of the image correction database (0203) and distortion correction image (0204), and capturing the input object image (0205). This is followed by correction of the image (0206) to generate the distortion-free output image (0207). Details of this method will be described more fully later in this document.

Object to be Imaged Not Limitive

Note that the web and/or object to be imaged need not be limited to the confines of the printing industry. While this limitation is the case in many preferred embodiments, there are a plethora of other applications possible. Just as an example, the system and techniques described herein can easily be applied to the field of digital cameras and the like where high pixel density is desirable but expensive to implement because defect densities in the CCD arrays used for digital still imaging drive up the price of these arrays. The present invention can easily be applied to this application to take a low quality, high density CCD array and convert it into a high output quality CCD array.

Note that some pixels in a given CCD array will be defective or weak, and as a result in many situations these arrays must be scrapped as they cannot be used in commercial consumer applications. By using the calibration features disclosed within, these scrap CCD units may be used in production, thus driving down the cost of digital cameras with large CCD or other imaging arrays.

Images may be Compared Remotely

Figure 3:
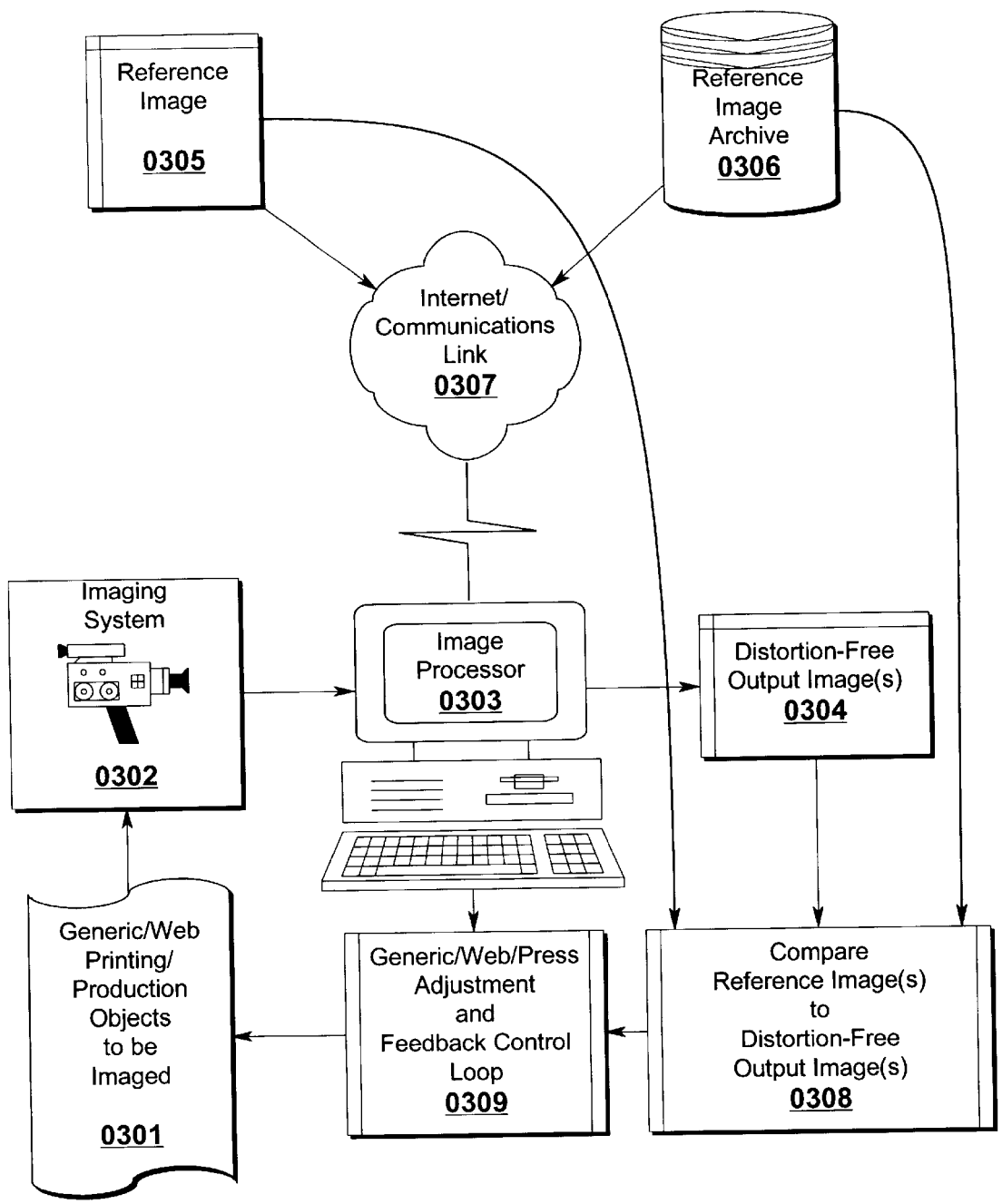
FIG. 3 illustrates an exemplary application embodiment of the present invention.
Figure 4:
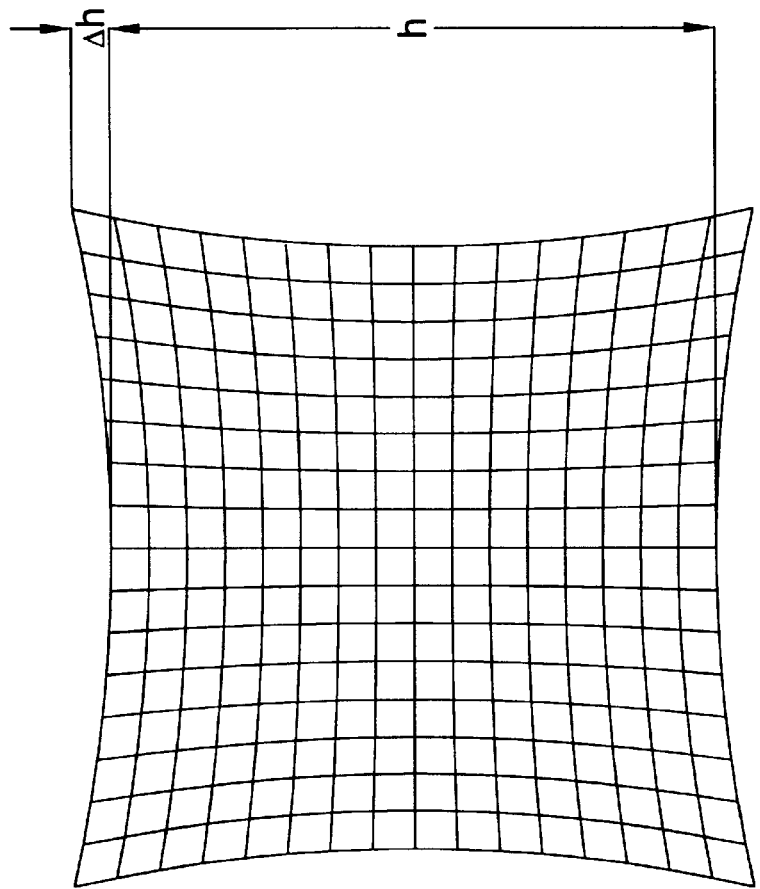
FIG. 4 illustrates conventional pincushion distortion.
Figure 5:
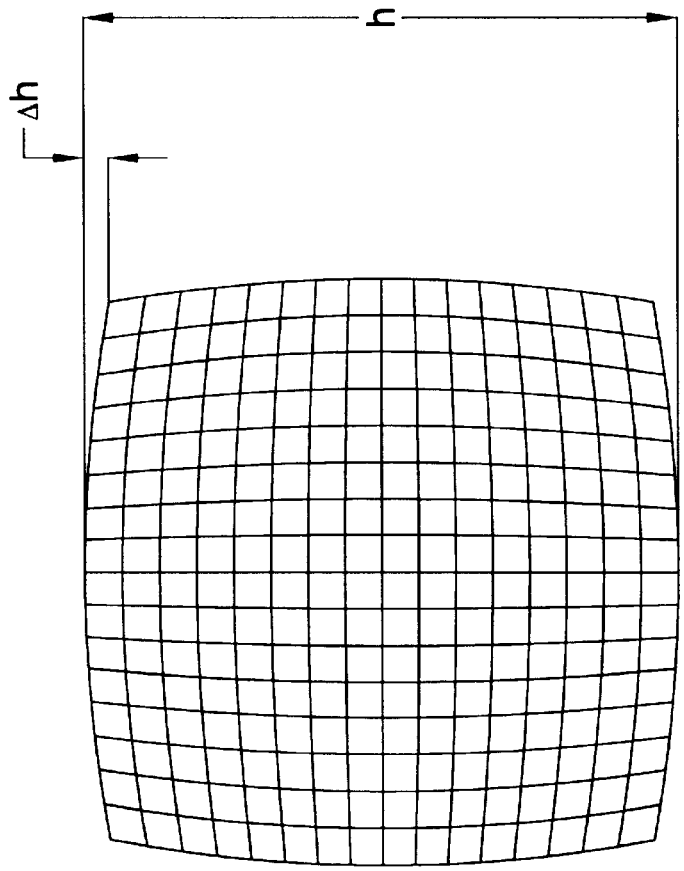
FIG. 5 illustrates conventional barrel distortion.
Figure 6:
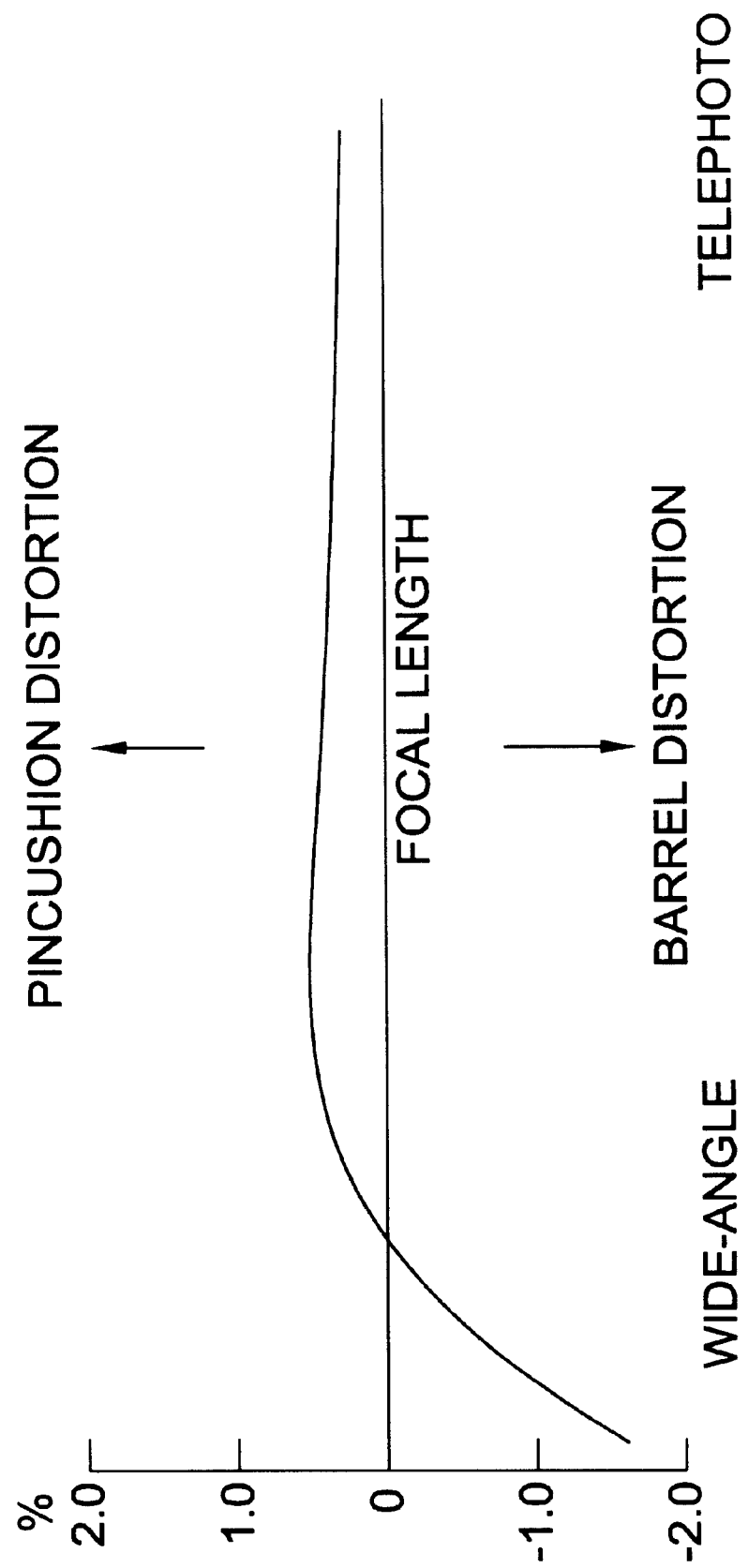
FIG. 6 illustrates distortion type as a function of focal length.

Referencing FIG. 3, it must be noted here that the system as described may be incorporated into a remote control processing system utilizing closed loop feedback to ensure high quality manufacturing control using the corrected images as described herein. In these applications, a generic manufacturing process (for example, a web printing or other printing press application) (0301) is imaged by an imaging system (0302). This image is processed by an image processor (0303) to generate one or more distortion-free output images (0304). These distortion-free output images (0304) are then compared to reference images (0305) that may be archived (0306) remotely and accessed via the Internet (0307) or some other communications medium. This image comparison operation (0308) is then used to control the generic manufacturing process (0309) such as to promote better compliance between the product being produced (0301) and the reference images (0305) or image archive (0306).

This exemplary application has great appeal in the newspaper printing industry and in other printing applications. Here the reference images (0305) and/or image archive (0306) could be the central printing plate definitions at the national newspaper office. This information can then be compared (0308) directly to the actual newspapers printed (0301), since the distortion-free images (0304) produced by the image processor (0303) have corrected for any inaccuracies in the imaging system (0302).

The ramifications of this type of closed loop feedback control in this industry are significant, because for the first time it permits nationwide (or worldwide) process quality controls to be automatically implemented on a per-paper printing scale. Previously, there was no way to control the variation between presses across the nation, so a paper printed in one location may not appear the same as a paper printed in another location. This discrepancy resulted in wide quality variations that in general have been undesirable in the newspaper industry. Similar arguments apply for other forms of printing which originate from a central location.

Calibration Hardware
Overview of Calibration Hardware

Figure 7:
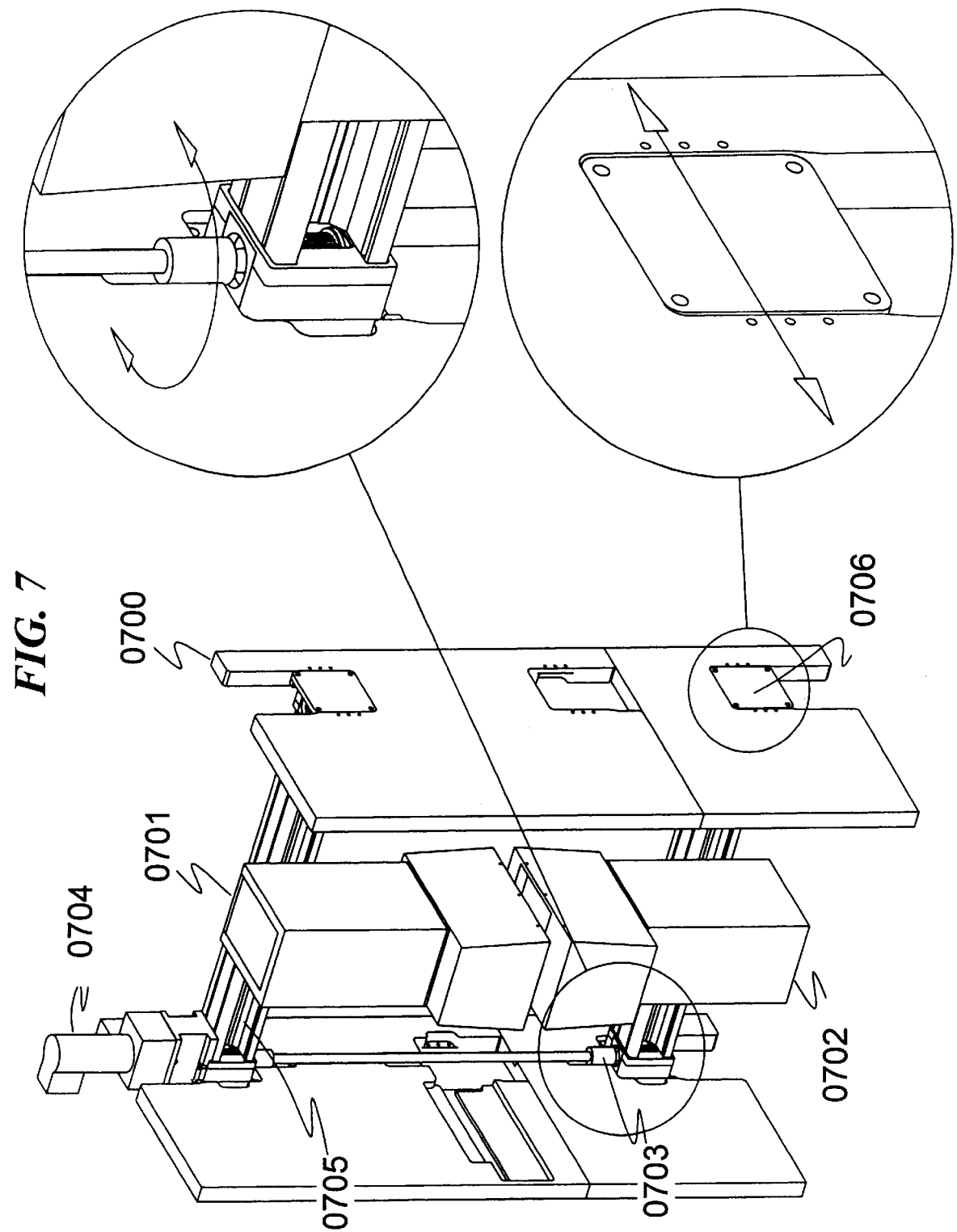
FIG. 7 illustrates an exemplary system embodiment of the present invention utilizing a two camera image capture system.

As shown in FIG. 7, an exemplary system embodiment for producing distortion-free images is a two-camera system employing a traversing mechanism (0700) for moving these cameras. The two cameras (0701, 0702) in the exemplary system embodiment have motorized lenses and move together via a coupled drive mechanism (0703). Although this system is used as an exemplary embodiment of the present invention, it must be understood that the methods described are also applicable on single camera systems, cameras with fixed lenses, and stationary cameras.

FIG. 7 shows the traversing mechanism that spans the area to be imaged (0700). A DC motor drive (0704) moves a timing belt (0705) that moves the two camera enclosures (0701, 0702) across the imaging area.

FIG. 8 is a more detailed drawing of the exemplary camera enclosures (0701, 0702). The lower camera enclosure (0800) is illustrated with the cover shown dotted to expose the camera and lens assembly (0802) and the strobe assembly (0803).

Figure 9:
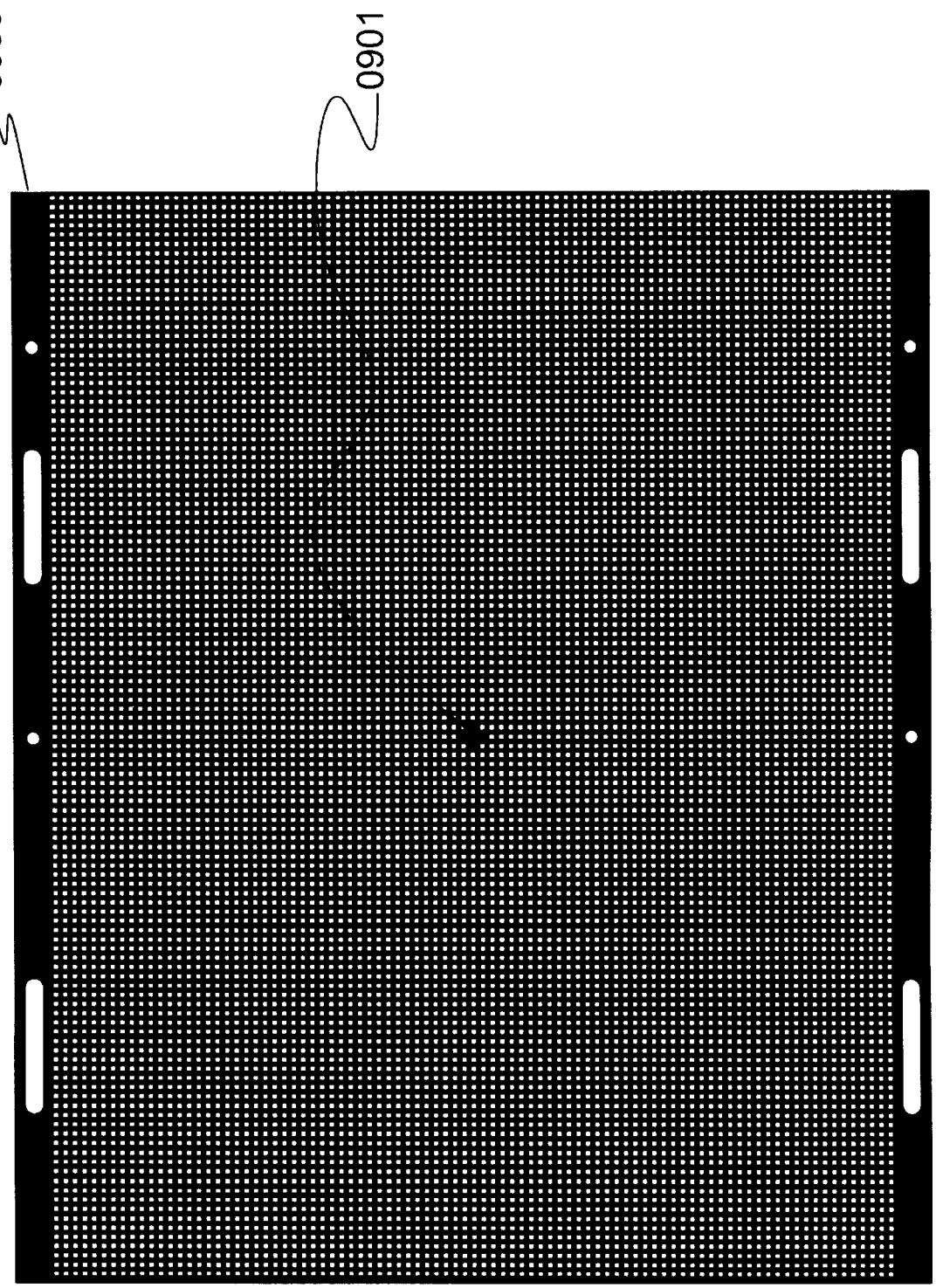
FIG. 9 illustrates an exemplary geometric calibration plate with registration marks.
Figure 10:
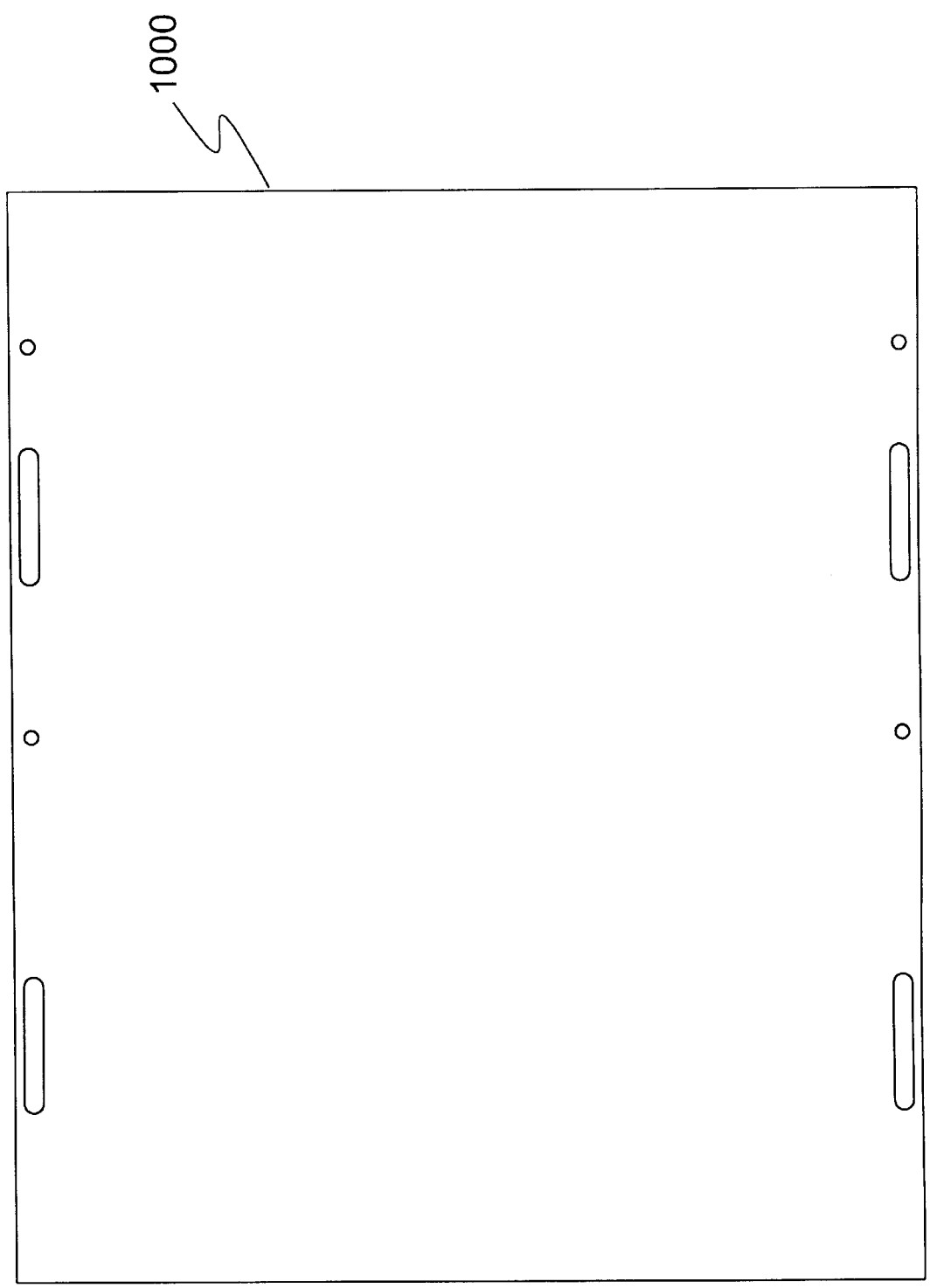
FIG. 10 illustrates an exemplary illumination calibration plate.

FIG. 9 shows the geometric calibration plate (0901) and FIG. 10 shows the corresponding illumination calibration plate (1000). Each plate fits inside the adjustment bracket in FIG. 11 (1100). This bracket (1100) can be mounted on the end of the camera enclosure (0800) as illustrated in FIG. 12.

Each camera enclosure (0800) can be pivoted relative to the traversing unit (0700) via four adjustment screws (0804, 0805, 0806, 0807). This is illustrated in FIG. 8. These adjustments can place the camera in a variety of orientations relative to the traverse and ultimately the imaging plane.

The traversing mechanism has two other adjustments that allow movement of one camera relative to the other opposing camera in the disclosed exemplary embodiments. FIG. 7 illustrates a coupling (0703) that connects the drive shaft of the one camera to the drive shaft of the other. By loosing the coupling (0703), introducing an offset, and then re-tightening the coupling (0703), a permanent camera-to-camera offset can be set. FIG. 7 illustrates a second adjustment (0706) that provides for pivoting one camera's extrusion relative to the other. Adjustment here is sometimes necessary to get both cameras to track together perfectly.

Geometric Calibration Plate

The geometric calibration plate (0900) is typically designed to provide a series of sampling points evenly spaced in a grid throughout the field of view of the camera. The geometric calibration plate shown in FIG. 9 is the plate that is used to calibrate the exemplary system embodiment for geometric anomalies. This plate has 1-millimeter square targets spaced evenly in a grid by 1-millimeter spacings. The plate was made using printed circuit board (PCB) technology to give very accurate tolerances. The center of the plate has five targets that have been omitted in a fashion to appear as a crosshair target. This is best understood by referring to FIG. 9. The omission of these targets (0901) provides for a means of locating the center of the calibration plate. As will be seen later, this is a very important aspect of the disclosed calibration procedure.

The geometric calibration plate (0900) that has been designed for the exemplary system embodiment provides an adequate number of sampling points for the largest field of view of the cameras. In the example system, which employs a zoom lens, the largest lens distortion is found in the largest field of view. The smallest amount of distortion is found when zoomed all the way in and viewing the smallest field of view. Due to this fact, it is possible to use a single geometric calibration plate as shown in FIG. 9. If this were not the case, multiple plates would be used which would be optimized for each desired zoom magnification. That is, the target sizes and spacings on each plate would be adjusted to provide adequate sampling points for each zoom level. The exemplary system embodiment will generally be described using the one plate, but the reader is reminded of the fact that multiple plates would be used if the system required it.

Illumination Calibration Plate

The other calibration plate in the disclosed system is the illumination calibration plate (1000) and is detailed in FIG. 10. This plate (1000) resembles the geometric calibration plate (0900) in dimensions and fits inside the same bracket mechanism (1100) described. The plate is typically made of steel and optimally painted with a matte-white paint. Its function is to provide a homogenous high-contrast viewing image for strobe illumination calibration.

Calibration Plate Bracket and Adjustments

Figure 11:
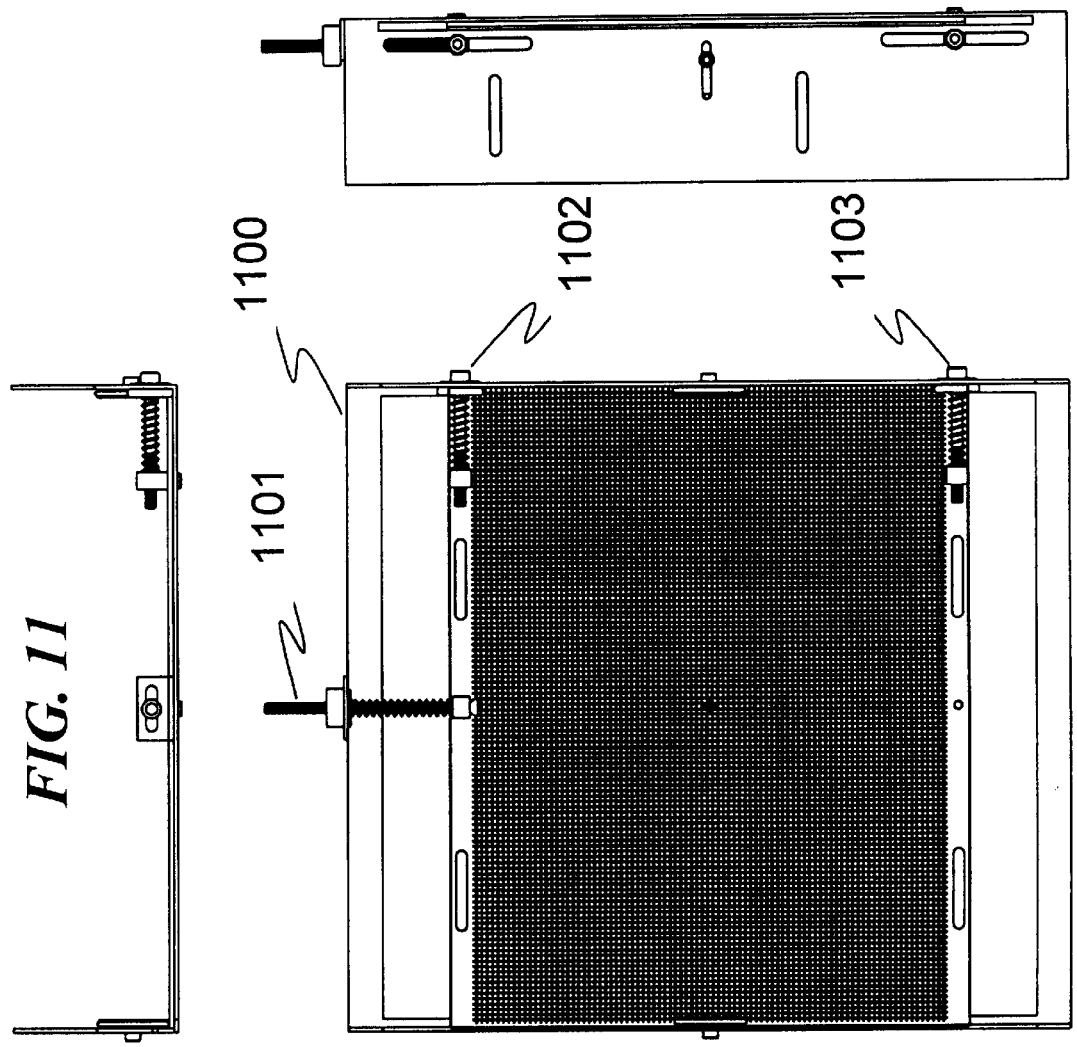
FIG. 11 illustrates exemplary mounting hardware for the geometric calibration plate.
Figure 12:
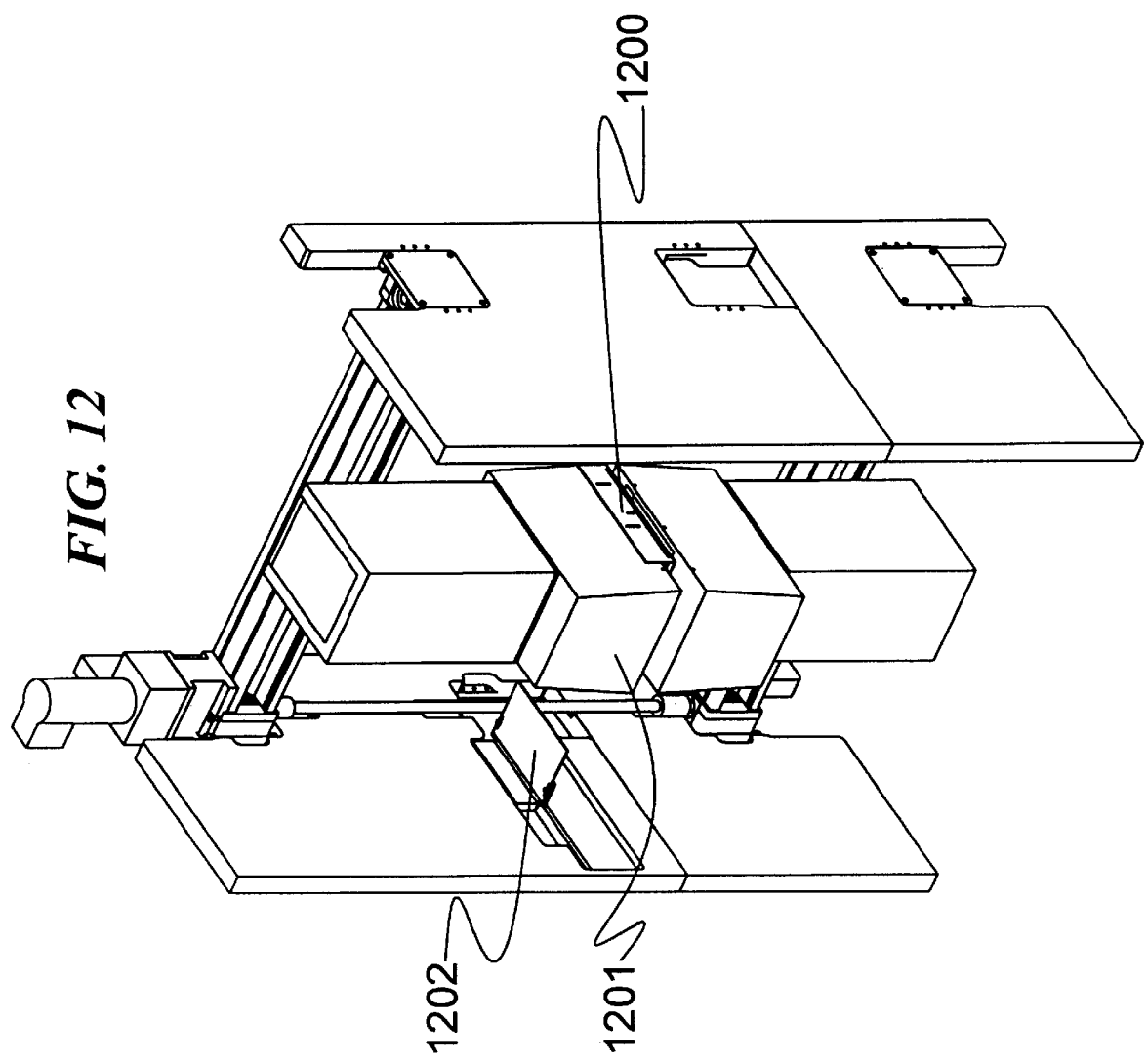
FIG. 12 illustrates an exemplary system embodiment of the present invention utilizing a two camera image capture system with provisions for mounting plate attachment.

FIG. 11 shows the bracket mechanism that rigidly attaches a calibration plate (0900, 1000) to one of the camera enclosures (0800). In order to calibrate the system, the bracket and plate must first be located in the correct imaging plane. FIG. 13 shows the means for accomplishing this function. For application of the exemplary system embodiment, there are always two rollers (1301, 1302) that are present which the printed material (1303) passes over. This is the orientation of the imaging plane. To locate the bracket (1100), two fan-fold aluminum-aligning brackets (1304) are extended to rest on each roller (1301, 1302). These brackets are depicted in FIG. 13. The brackets are temporarily held to the rollers by strong rubber straps (1305, 1306) in the case where the imaging plane is not necessarily horizontal. The calibration bracket (1100) is then placed in the alignment brackets (1304) to force the calibration bracket (1100) to be in the imaging plane. With the calibration bracket (1100) in this orientation, four screws are tightened to rigidly attach the bracket (1100) to the camera enclosure (0800). Once the calibration bracket (1100) is attached, the alignment brackets (1304) and rubber straps (1305, 1306) are then removed from the rollers (1301, 1302).

As shown in FIG. 11, the calibration bracket (1100) allows for X,Y movement of any of the calibration plates in the image plane relative to the camera. First a plate is mounted in the calibration bracket (1100) and secured. One adjustment screw (1101) in FIG. 11 is used to change the Y orientation and two screws (1102, 1103) in FIG. 11 are used to change the X orientation. As will be seen later these adjustments will be used to center the plate relative to the camera.

Camera Box Orientation Adjustments

As shown in FIG. 8, four screws (0804, 0805, 0806, 0807) are provided on each camera housing which provide for camera movement relative to the traversing mechanism (0700) and consequently to other cameras mounted on the traverse and viewing the same image plane. In example systems that employ a single camera or where camera-to-camera alignment is not necessary, these adjustments are never used. In the exemplary system embodiment, where two cameras will be viewing the same image plane and need to be aligned to each other, these adjustments will typically be used. The reader should understand that these adjustments are merely used to improve the misalignment but by no means can eliminate the misalignment. It is the function of the distortion-free system being described which ultimately will remove all misalignment.

By adjusting these screws (0804, 0805, 0806, 0807) in pairs, it is possible to rotate the camera in question around one of two axes. For example, in FIG. 8, to rotate the camera around an axis parallel to its length, the screw pairs (0804, 0806) or (0805, 0807) in FIG. 8 are adjusted. To rotate the camera around an axis perpendicular to its length, the screw pairs (0804, 0805) or (0806, 0807) in FIG. 8 are adjusted. These adjustments are made to improve the misalignment of two cameras viewing the same image plane.

Traversing System Adjustments

FIG. 7 depicts two cameras viewing the same image plane. These cameras are attached to the traversing mechanism (0700) and track back and forth together. In this example system, two additional adjustments have been provided to improve alignment of the cameras. The first adjustment provides for offsetting the two cameras along the traversing direction. By loosening the coupling (0703) in FIG. 7, moving one camera by hand, and then re-tightening the coupling (0703), a permanent offset can be applied in that direction. The second adjustment improves the tracking of one camera to the other as these traverse across the image plane. By pivoting the camera extrusion at one end relative to the other camera (0706) in FIG. 7, the tracking can be greatly improved.

Traversing Camera/Calibration Plate

Figure 81:
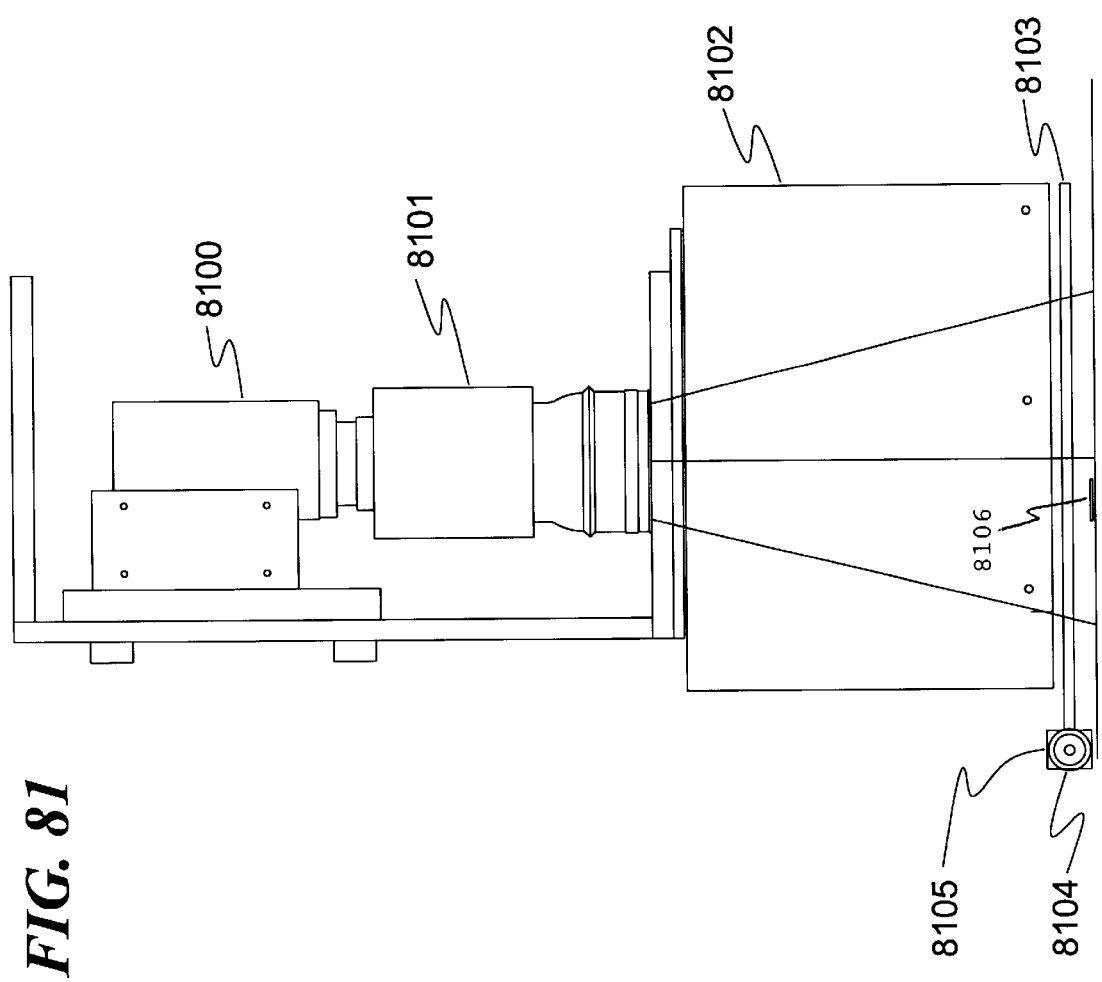
FIG. 81 illustrates an exemplary movable image capturing system using the teachings of the present invention.

FIG. 81 illustrates one variation of the present invention in which a camera (8100) (which may have a zoom or other lens assembly) (8101)) and optionally having a strobe enclosure (8102) with movable means (8103), (8105), and (8104), for moving and positioning calibration plate (8106) to any position within the field of view of the camera.

Figure 82:
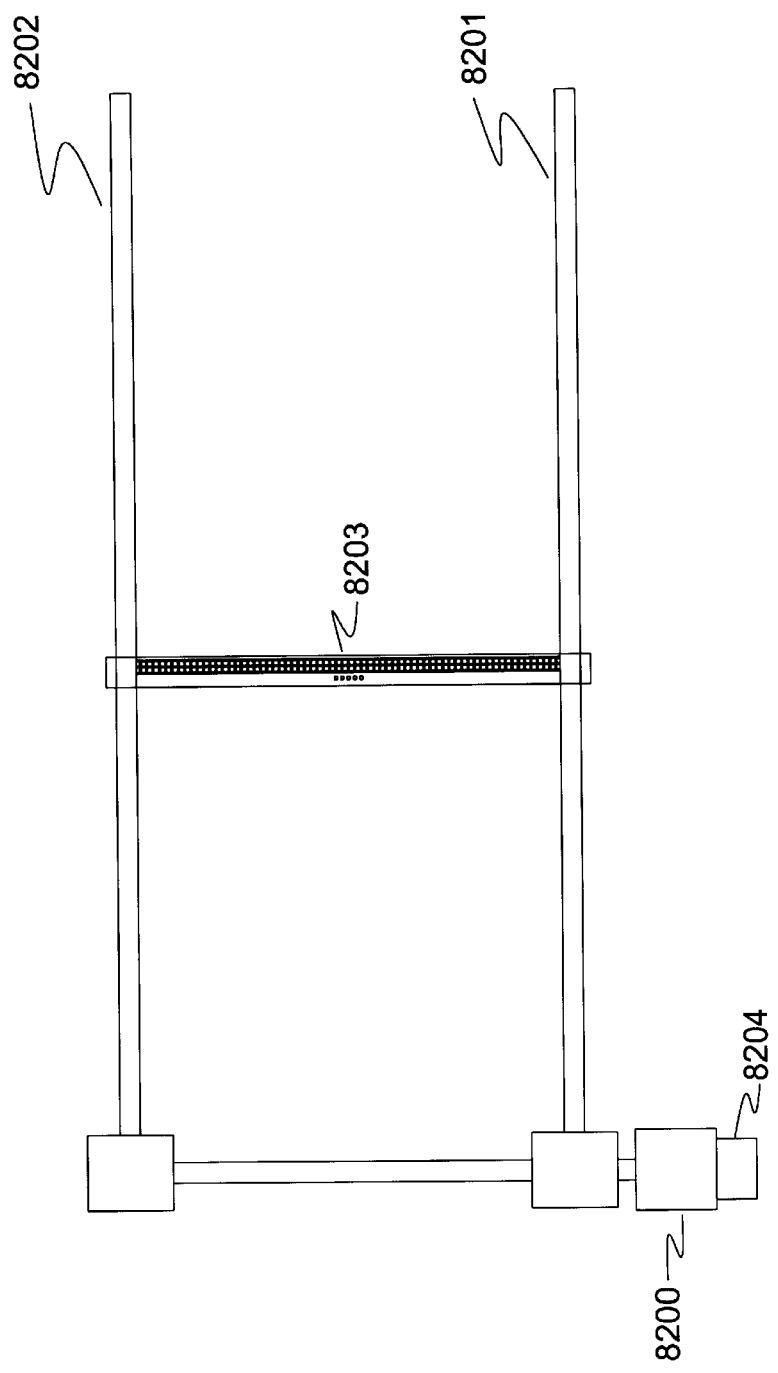
FIG. 82 illustrates an exemplary movable calibration plate that may be used with some preferred embodiments of the present invention.

FIG. 82 presents one method of moving and positioning calibration plate (8203) which is mounted on lead screws (8201) and (8202) and positioned with motor (8200) and feedback encoder (8204). Calibration plate (8203) can be positioned laterally to any position within the field of view of camera (8100) so that its image appears in all images taken by camera (8100) or it can be positioned so that it does not appear in the image.

Figure 83:
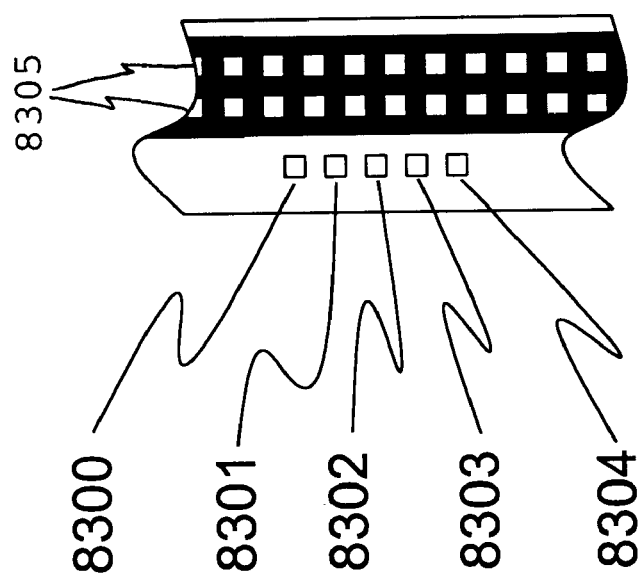
FIG. 83 illustrates a detail of an exemplary calibration plate that may be of use with some preferred embodiments of the present invention.

FIG. 83 details an exemplary calibration plate having a plethora (8300, 8301, 8302, 8303, 8304) of color and/or white/black marks which can be of the four process colors of yellow, magenta, cyan, black and white but could include addition colors and chips. The abbreviated calibration plate (8305) need consist only of two rows of 1-millimeter marks.

From this information, the magnification error can be calculated from mark pattern (8305) with flash-to-flash variation calculated from the white chip according to the invention. In addition the RGB values of the four process color chips can be recorded to compare with the same RGB values taken from color marks that are printed and included within the image. This later information can be used to measure and control color by automatic control of color keys, which meter the ink to the printing process.

Calibration plate (8203) can be positioned at the very edge of the field of a chosen view of view to maximize the image area of interest. A number of alternative advantages are possible:

1. The calibration target (8305) can be automatically positioned to the edge of the image as a function of zoom position so that instant image correction can be achieved according to the teachings of the invention.
2. In addition with the marks (8300), (8301), (8302), (8303), and (8304) additionally positioned at the edge of the image, color measurement, flash to flash strobe variations, and variations do to mechanical limitations can all be corrected according to the teaching of the invention.

Thus it is possible to fully compensate for magnification variations, flash-to-flash illumination, variations in ambient room lighting, and RGB color variations all in the same image. These multiple compensations and corrections are not possible using the teachings of the prior art.

Method

Overview

The following section deals with the method of producing a distortion-free image. That is, a method and means of taking source pixels from a distorted camera image and producing a geometrically correct version as an output. Not only is the image corrected for geometric anomalies but for illumination anomalies as well.

Referencing FIG. 2, the general distortion free image capture method (0200) includes image capturing a geometric calibration plate (0201) and/or an illumination calibration plate (0202). From this information an image correction database (0203) is generated, which in turn permits a distortion correction image (0204) to be formed. After this calibration information has been determined, the object image to be captured is acquired (0205), to which the image correction database and/or the distortion correction image is applied (0206). Once this calibration information has been applied to the input object image, a distortion-free output image (0207) can be generated from this result. The general method ends (0208) with the option of repeated application of either the calibration and/or image correction phases of operation.

The means for producing a distortion-free image lies in specially designed calibration plates. These plates and the other calibration adjustments employed are described in the "Calibration Hardware" section. One calibration plate, the geometric calibration plate (0900), has numerous square white targets (1 millimeter) on it spaced evenly on a 1-millimeter grid and a special pattern in the center for locating the center of the plate. To maximize contrast, the background of the plate was chosen to be as close to a black color as possible. This plate is used to determine the geometric anomalies in some present invention embodiments. A special bracket is used to hold the plate rigidly to a camera so it is imaged in the orientation to the camera as the desired operating imaging plane. This bracket provides for plate movement and rotation relative to the camera in question.

A second plate, the illumination calibration plate (1000), is made of a very even white (or neutral) color. This plate fits in the same bracket as described, and is used to determine the illumination anomalies in some present invention embodiments. This plate is also described in the "Calibration Hardware" section.

In order to initialize the distortion-free system, a calibration phase must be performed using the plates described. This procedure is described in the "Calibration Procedure" section, and the result is a series of calibration images that are stored on the hard drive for later processing.

Once the calibration images have been obtained the system enters a processing phase where these files are processed and reduced to the distortion-free data files. These files contain all the distortion information in them to produce images at a desired zoom magnification and distortion-free. The procedure for processing calibration files and determining the corresponding data files is outlined in "Calculation of Data Point Files from Calibration Image Files".

With the calibration phase complete, the system can now produce distortion-free images on command. This process is described in the "Creating the Distortion-Correction Image" and the "The Distortion-Free System in Action" sections. The "Creating the Distortion-Correction Image" section describes how a special image lookup table is created which is responsible for removing all distortion from the source image. This image need only be calculated once after a lens change (zoom movement) or once for a fixed lens. The image consists of a series of (X,Y,I) coordinates for each output coordinate (x,y) in the output image. It determines the source pixel location and illumination information for each output coordinate (x,y). The "The Distortion-Free System in Action" section describes how this look-up image is used to finally produce a distortion-free image.

Calibration Procedure
Overview of Procedure

This section outlines the procedure for calibrating the exemplary system embodiment in order to produce distortion-free images. As mentioned earlier, the exemplary system embodiment depicted in FIG. 7 includes two cameras viewing the same image plane and rigidly attached to each other via a traversing mechanism (0700). The procedure of calibration includes a method of mechanical alignment with the aid of the calibration plates and software. At the completion of this mechanical alignment, special software programs are run to store distortion-free calibration files. Although this system is used as a good example of the present invention, it must be understood that the methods described are also applicable on single camera systems, cameras with fixed lenses, and stationary cameras.

In order to begin the calibration several mechanical adjustments must be set to nominal positions and the software programs used must be initialized. This is described in the "Initialize All Adjustments" section. Next the geometric calibration plate is installed on to one camera's housing. This is illustrated in the "Install Geometric Calibration Plate" section. Because it is desirable to accurately recognize some rather small targets, it is desired to have an image with as much contrast as possible. This is accomplished by manipulating the iris and frame-grabber electronics and is described in the "Calibrate Camera Digitization System" section.

After the system has been optimized for contrast, the next step is to center the calibration plate in each camera's view. This step is described in the "Adjust Calibration Plate to Camera(s)" section. With the plate in good viewing orientation for each camera, it is now time to compute the camera centers. A camera center is defined as that point (x,y) in the image which lies on the same imaging target independent of zoom. The computation of this important property is outlined in the "Compute Camera Center" section. Because this step can alter the centering of the calibration plate to each camera, the plate centering procedure is repeated. This procedure is outlined in the "Adjust Calibration Plate to Camera(s)" section. The remaining adjustment to be performed on the system, is how well the cameras track to each other. This is quality is adjusted by pivoting one camera's extrusion relative to the other and is described in the "Adjust Camera to Camera Tracking" section.

After concluding all mechanical adjustment, the system has reached a state where camera-to-camera alignment can no longer be improved. In order to make it perfect, the distortion-free system must be employed. In light of this, the remainder of the calibration procedure is dedicated to storing information about distortion on the system. The first piece of information that needs to be established is magnification information. A software program is run which will take a picture of the geometric calibration plate at every desired magnification for each camera. The images are analyzed to compute and store the magnification for each camera and at each zoom level. This software program is described in the "Lock Zoom Magnifications" section. These magnifications will be used as the operating magnifications for the life of the system. That is, if the magnification changes at a zoom level (which it always does), the system will compensate for this through the distortion-free system.

With magnifications calculated, the next step in the calibration procedure is to store all geometric calibration information. A software program is run which positions the cameras to each zoom magnification and multiple traversing locations. Each location gets a picture of the geometric calibration plate and this picture is stored on the hard drive for later processing. This software program is described in the "Store Calibration Points" section.

The system has now stored all information pertinent to geometric anomalies. The next step in the procedure is to store illumination anomalies. Before this can be accomplished, it is necessary to switch calibration plates in the calibration bracket assembly. The geometric calibration plate is removed and the illumination calibration plate is installed. This procedure is outlined in the "Install Illumination Calibration Plate" section. Due to the fact that the plates are radically different in imaging content, it is desirable to optimize the iris and frame-grabber electronics to achieve the best possible image for analysis. This is accomplished by running the special optimization program described in the "Calibrate Camera Digitization System" section. Before storing any information at this point, the system needs to know which strobing systems need calibration information. The operator uses a menu system on the machine to turn on or off the strobing systems desired. This is outlined in the "Enable Strobes for Illumination Calibration" section. The system is now ready to store all information pertinent to illumination correction. A special software program is run which will position each camera to each zoom magnification and traverse location in question and store an image of the illumination calibration plate on to the hard drive storage system. This step in the procedure is outlined in section "Store Illumination Points".

To conclude the "Calibration Procedure" section, the calibration bracket assembly is removed from the camera housing. This is described in the "Remove Calibration Assembly" section. The system's hard drive storage system now contains all raw distortion information in the form of images.

Initialize All Adjustments

In order to begin the calibration procedure, all mechanical adjustments must be set to starting positions. These are positions that will give us the most adjustment and flexibility throughout the procedure. Since many software programs are used in the calibration procedure, it will also be necessary at this time to initialize their functionality.

The first adjustment that needs to be initialized is the camera housing adjustment screws (0804, 0805, 0806,

0807). They are depicted in FIG. 8, and, as has been demonstrated, are responsible for moving each camera in a variety of positions relative to the traversing system and consequently relative to other cameras on that mechanism. To initialize them, the operator screws them all to one extreme and then back in the other direction a specified number of turns. This will put the screws at a point of half adjustment and allow for maximum compensation in both directions.

At this point the cameras are moved to the center of their travel, and their camera housings are lined-up by eye in the running direction of the traverse. To achieve this rough alignment, the traverse coupling (0703) depicted in FIG. 7 is loosened, moved, and re-tightened.

The cameras are then moved to the extreme limit of traverse travel at the pivoting end of the extrusions. The pivoting end and pivoting adjustment (0706) are depicted in FIG. 7. At this end of the traverse the operator lines up the camera housings by eye. To accomplish this rough adjustment, the pivot adjustment is loosened, the extrusion is pivoted, and then the adjustment is retightened.

Install Geometric Calibration Plate

The geometric plate (0900) is the first calibration plate that needs to be installed to store calibration information. The calibration bracket (1100) has yet to be installed so it will be necessary to install it first. The main issue in mounting the calibration bracket (1100) to the camera enclosure (0800) is to assure that the bracket (1100) is exactly in the operating imaging plane. To achieve this accurately and in a timely fashion, two fan-fold aluminum-aligning brackets (1304) were fabricated. For application of the exemplary system embodiment, there are always two rollers (1301, 1302) that are present which the printed material passes over. This is the orientation of the imaging plane. To locate the bracket (1100), the aluminum-aligning brackets (1304) are extended to rest on each roller (1301, 1302). These brackets are depicted in FIG. 13. The brackets (1304) are temporarily held to the rollers (1301, 1302) by strong rubber straps (1305, 1306) in the case where the imaging plane is not necessarily horizontal. The calibration bracket (1100) is then placed in the alignment brackets (1304) to force the calibration bracket (1100) to be in the imaging plane. With the calibration bracket (1100) in this orientation, four screws are tightened to rigidly attach the bracket (1100) to the camera enclosure (0800). Once the calibration bracket (1100) is attached, the alignment brackets (1304) are then removed from the rollers (1301, 1302).

The geometric calibration plate (0900) is placed in the calibration bracket (1100) and secured. The adjustments (1101, 1102, 1103) are used if necessary on the bracket to assure that the plate (0900) is entirely in the camera's field-of-view. In the exemplary system embodiment, it is necessary to check the opposing camera to make sure it has the plate (0900) entirely in its field-of-view. To achieve this, it might be necessary to adjust the traverse coupling (0703) as shown in FIG. 7. By loosening the coupling (0703), applying an offset, and then re-tightening it, the two cameras can be aligned. If necessary, the opposing camera's housing screws (0804, 0805, 0806, 0807) can be adjusted as shown in FIG. 8. This is an additional method of applying an offset between cameras.

Calibrate Camera Digitization System

Figure 20:
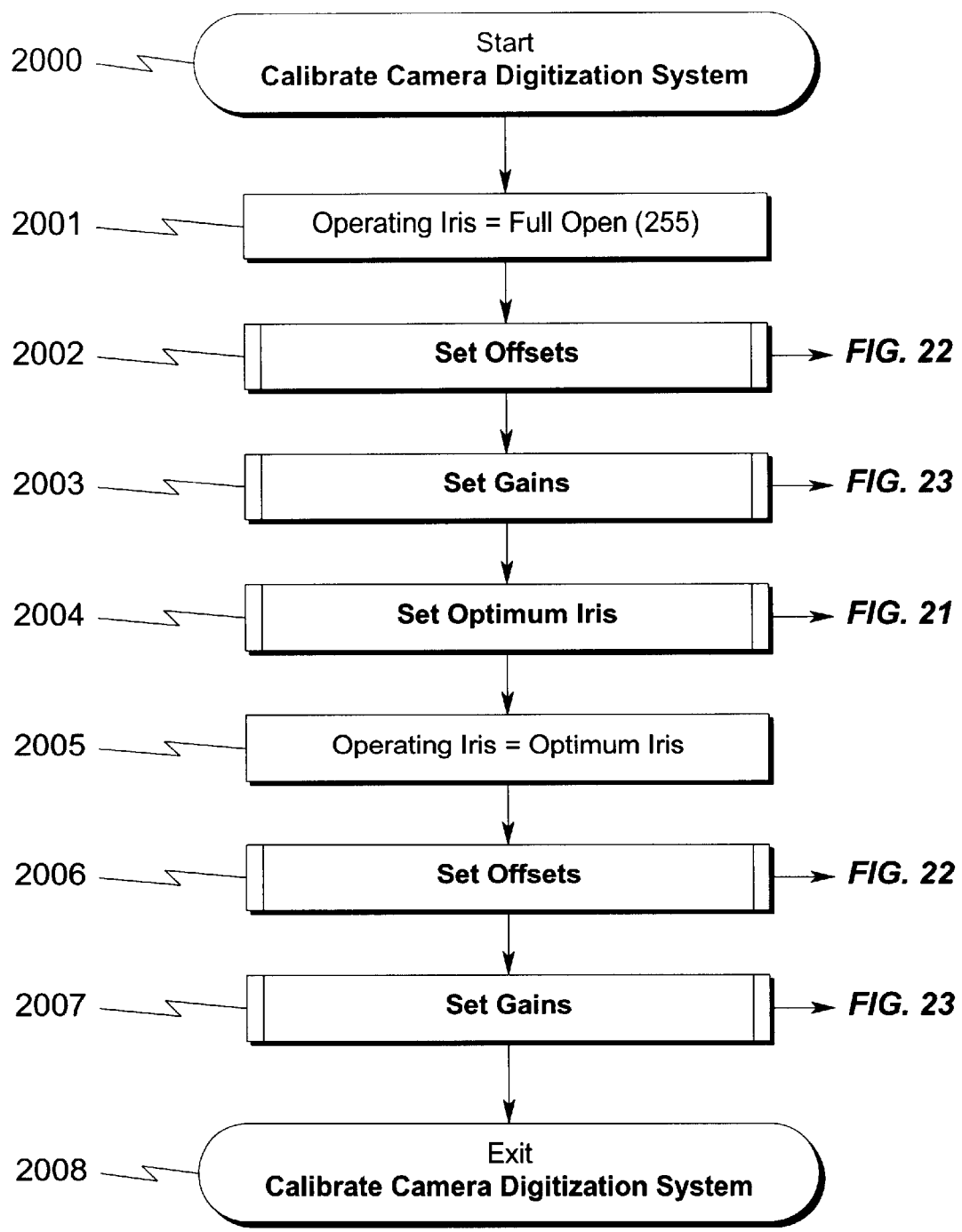
FIGS. 20–80 illustrate exemplary process flowcharts for the present invention.

With the geometric calibration plate (0900) firmly in place, it is now time to optimize the picture for contrast. During this phase of calibration, a special program is run on the system. This program will manipulate the iris and frame-grabber electronics to achieve the highest contrast image possible. By opening or closing the iris, more or less light is allowed into the camera imaging system and can improve a washed-out image (one with too much light) or an excessively dark image (not enough light). The frame-grabber electronics that are mentioned are the analog-to-digital converters. These converters are responsible for digitizing the image into frame-grabber memory. By changing the offset and/or gain values of these converters, the they can be optimized to the camera signal being converted. FIG. 20 is a flowchart that illustrates the iris and converter optimization process (2000).

Figure 22:
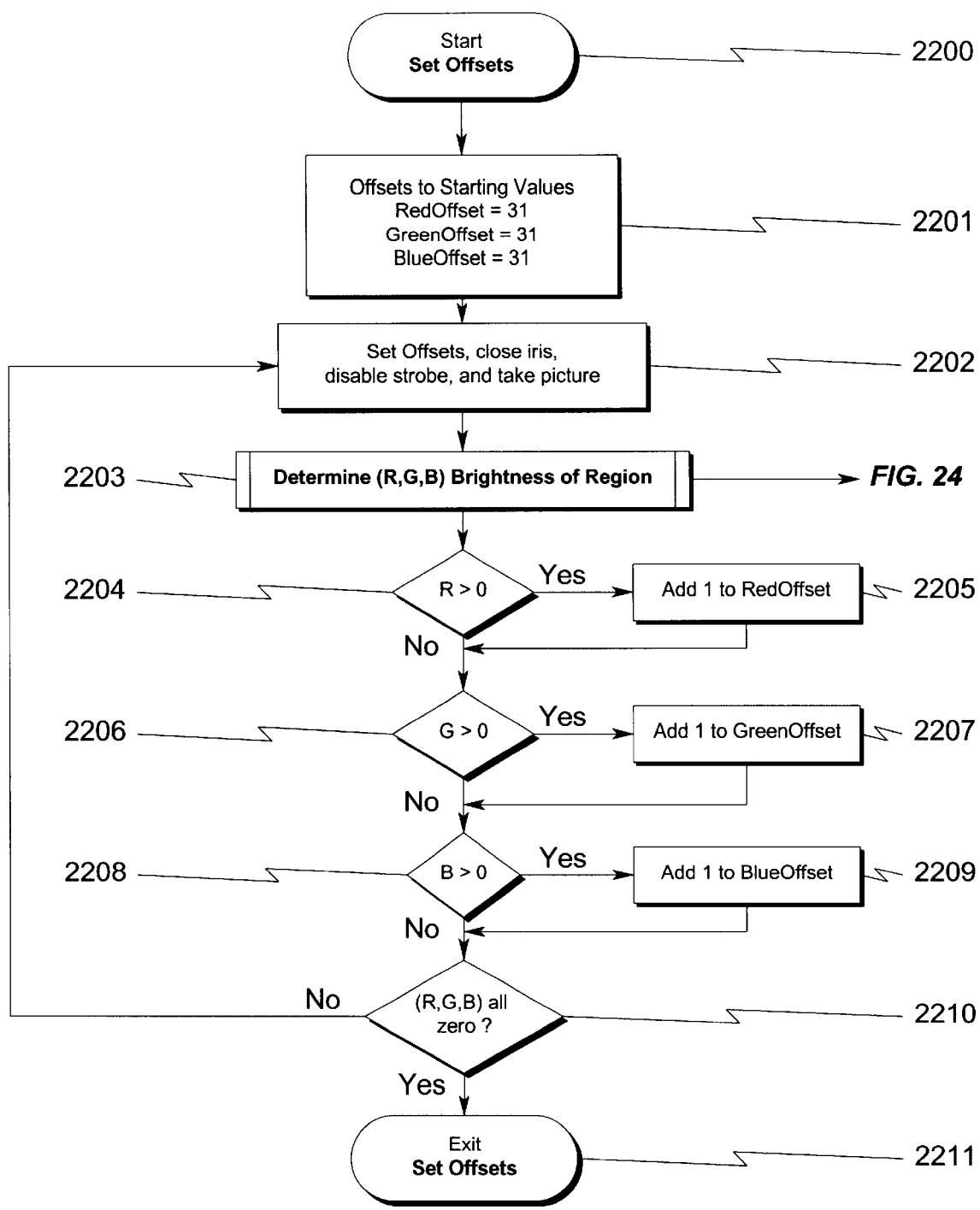

There are three main tasks to perform to optimize the digitization of a camera's image. First the iris has to be set to an optimal value. In order to determine this value, it is necessary to set the gains and offsets of the analog-to-digital converters so some initial values. The iris is initialized to full open (2001), and the offsets are calculated as depicted in FIG. 22 (2200). First the offsets are set to nominal starting values as recommended by the manufacturer of the frame-grabber (2201). These parameters are set on the frame-grabber board, the iris is closed all the way, and the strobe is disabled (2202). Taking a picture in this mode will give an image that should be entirely dark (2202). If the image is not entirely made of zeroes, it means that the offset(s) for the RED, GREEN, and BLUE analog-to-digital converters might need to be adjusted. The image is analyzed to determine the brightness (2203).

Figure 24:
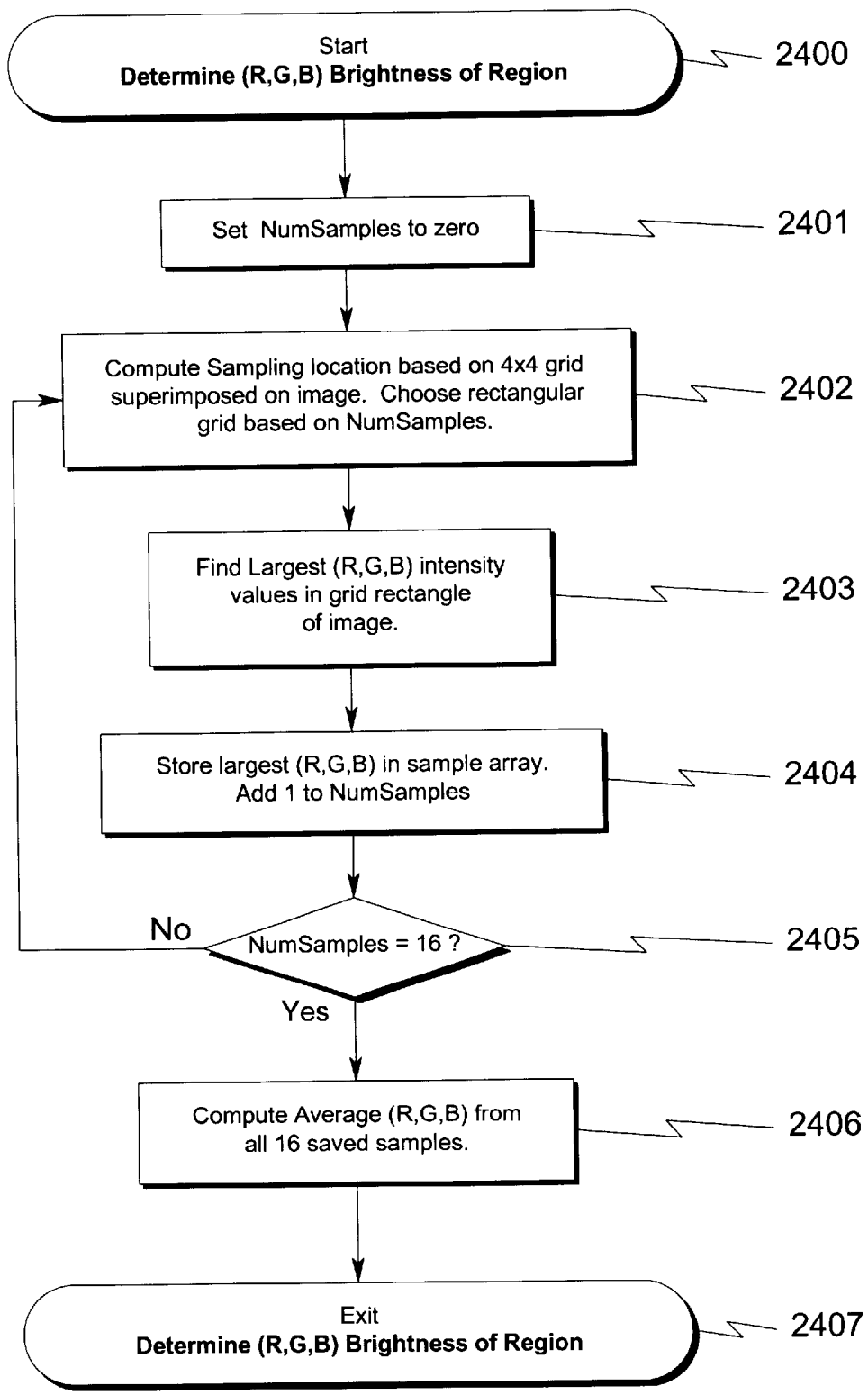

FIG. 24 describes how an image can be analyzed to return its largest RED, GREEN, and BLUE values (2400). The image is divided into 16 equal rectangular area regions. Based on the numbered sample (2401), the location of the rectangular region is calculated (2402). The largest RED, GREEN, and BLUE intensity values are determined by examining this region (2403). These values are stored in a sample array (2404). After all samples have been taken (2405), an average RED, GREEN, and BLUE sample is computed (2406). This routine exits back (2204), and the RED, GREEN, and BLUE values are examined to determine what needs to be done to the offsets. If the RED value is greater than zero (2204), its corresponding offset is raised (2205). Likewise this is done with GREEN (2206, 2207) and BLUE (2208, 2209). This task continues until RED, GREEN, and BLUE values all reach zero (2210). The offsets have now been set and the routine returns back (2002).

Figure 23:
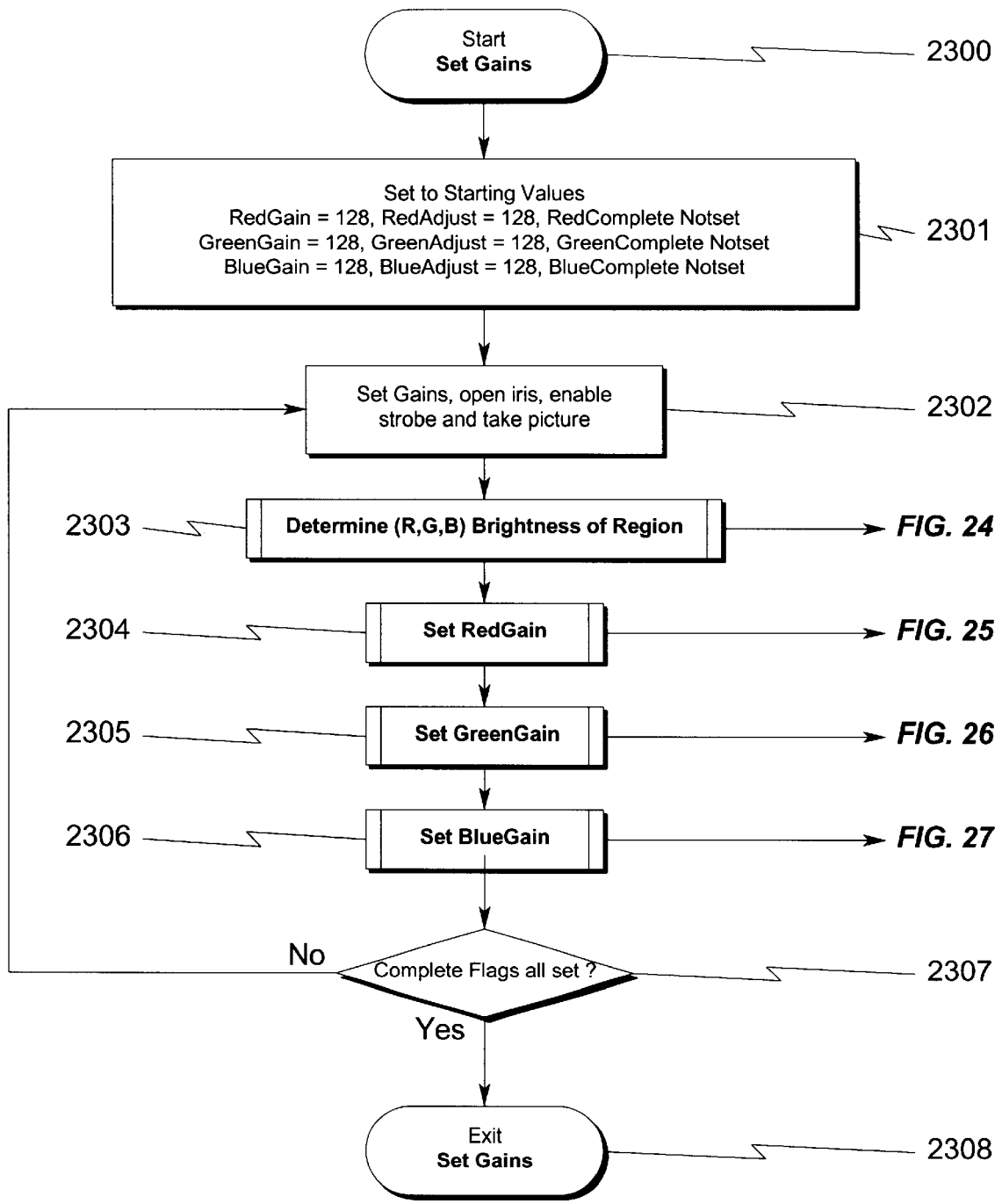
Figure 25:
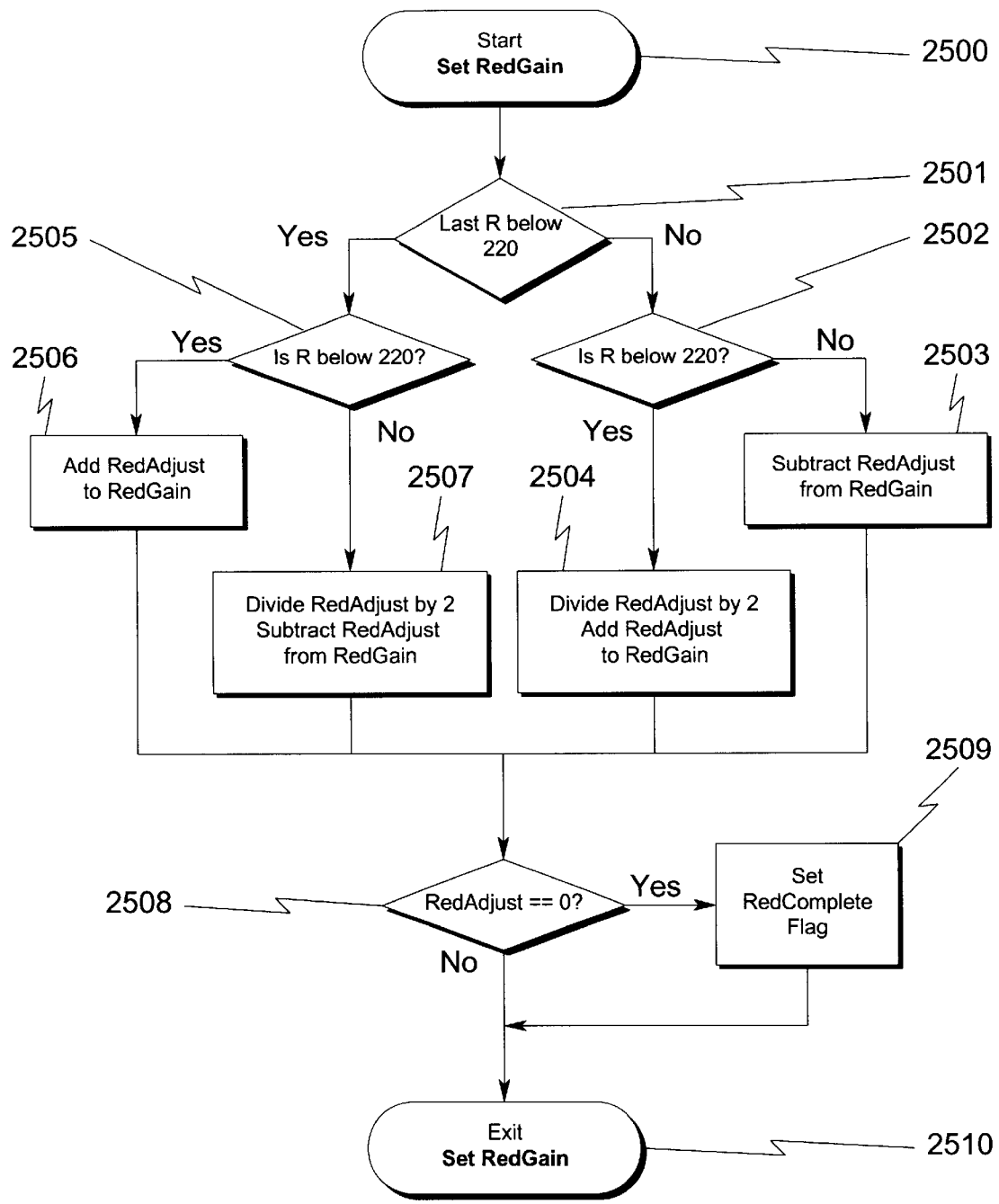
Figure 26:
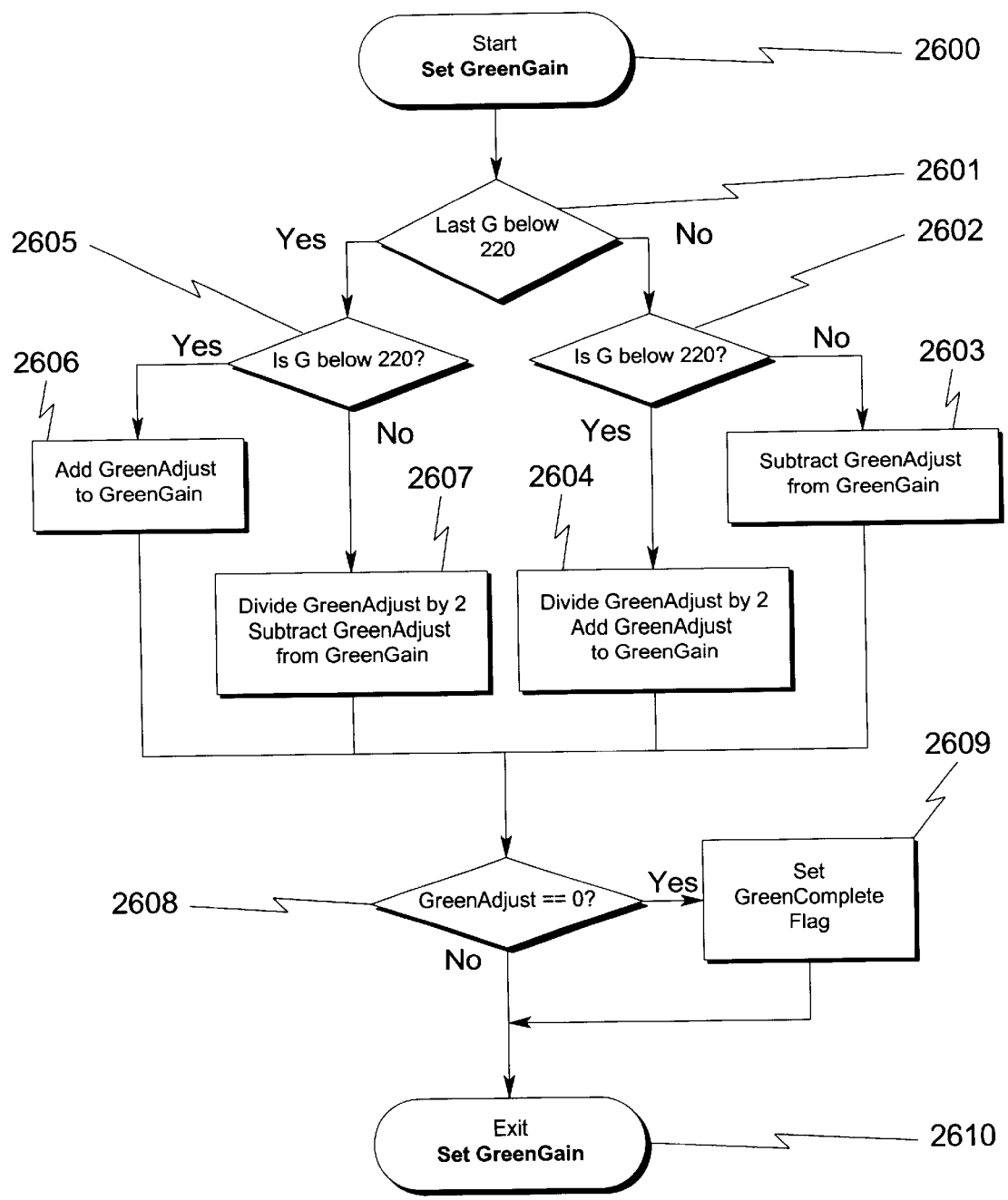
Figure 27:
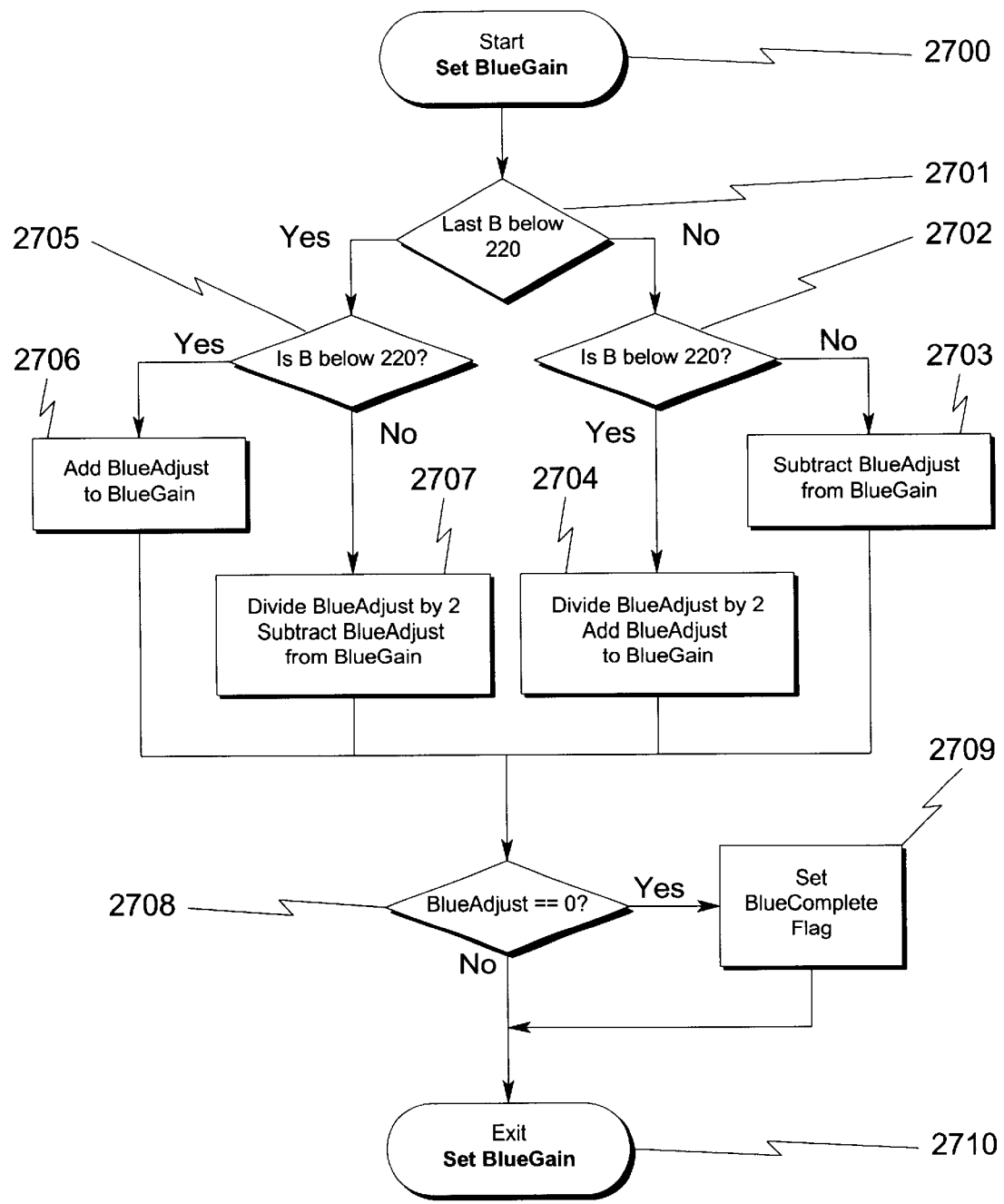

Next it is necessary to set the gains for the RED, GREEN, and BLUE analog-to-digital converters (2003). FIG. 23 describes the process for performing this function (2300). First the gains themselves are set to a starting point (2301). The amount of adjustment for each iteration is also initialized (2301). Each component, has its own completion indicator that is initialized (2301). A loop is entered which will change the gains until each RED, GREEN, and BLUE component reaches a desired level. At this point, the gains on the frame-grabber are set, the operating iris is set, the strobe is enabled, and a picture is taken (2302). The image is analyzed to determine the brightness (2303). FIG. 24 describes how an image can be analyzed to return its largest RED, GREEN, and BLUE values (2400). From the returned brightness value, the RED gain is set (2304). FIG. 25 illustrates how the RED gain is changed relative to the current and last brightness level. If the last brightness was below the desired setting of 220 (2501), then the current brightness is checked to see if it is below 220 (2505). If so the RED adjust value is added to RED gain value (2506). Otherwise, the direction of adjustment must be changed. The RED adjust value is halved and subtracted from the RED gain value (2507). If the last RED brightness value was greater than the desired value of 220 (2501), then the current brightness is checked to see if it is below 220 (2502). If so, it is time to change the direction of adjustment. The RED adjust value is halved and added to the RED gain value (2504). Otherwise the RED adjust value is subtracted from the RED gain value (2503). Processing continues with the setting of the GREEN gain (2305) and then the setting of the BLUE gain (2306). The setting of the GREEN gain is done exactly like the RED gain and is described in FIG. 26. The setting of the BLUE gain is also performed the same and is described in FIG. 27. After each gain is manipulated, the system then checks to see if all gain settings have completed (2307). If all flags read complete, the routine exits with all gains set (2308).

Figure 21:
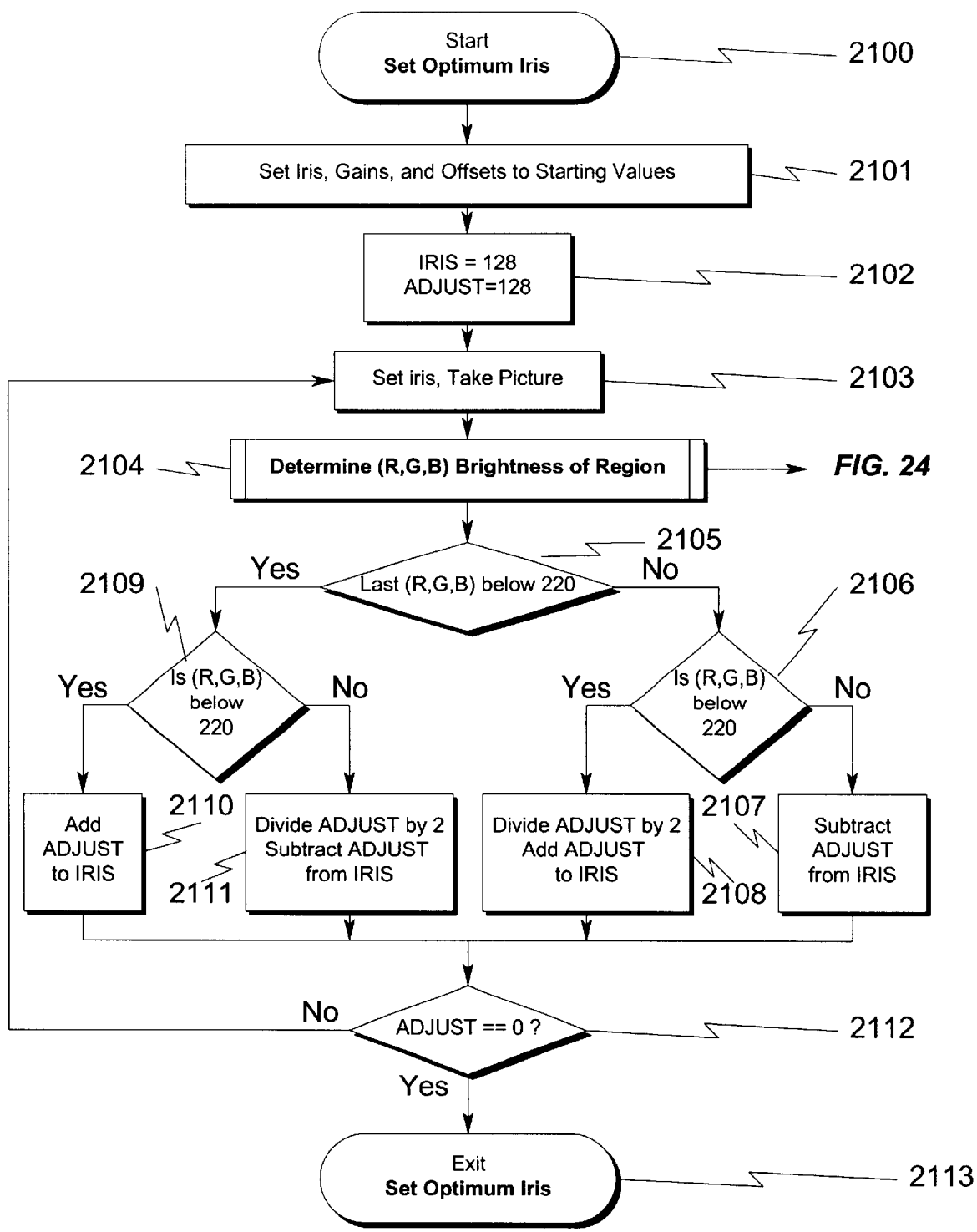

Referring back to FIG. 20, the optimum iris (2004) setting procedure will now be discussed. FIG. 21 is an illustration of how this procedure is performed (2100). First all calculated gains and offsets are setup on the frame-grabber (2101). The operating iris is set to a half setting of 128, and the adjustment setting is set to 128 (2102). The system then enters a loop to calculate the optimum iris. This is an iris where the system has all three intensity components of RED, GREEN, and BLUE less then some desired value. The iris is set and a picture is taken (2103). The image is analyzed to determine the brightness (2104). FIG. 24 describes how an image can be analyzed to return its largest RED, GREEN, and BLUE values (2400). From the returned brightness values and the last brightness values, a decision is made of whether to increase or decrease the iris. If the last brightness values were all less then the desired value of 220 (2105), then the current brightness values are checked against the 220 value. If the current values are less than 220 (2109), then add the adjust value to the iris (2110). Otherwise, the direction of adjustment must be switched so the adjust value is halved and subtracted from the operating iris (2111). If the last brightness values were greater than the desired value of 220 (2105), then the current brightness values are checked against the 220 value. If the current values are less than 220 (2106), then the direction of adjustment must be switched so the adjust value is halved and added to the operating iris (2108). Otherwise, subtract the adjust value from the operating iris (2107). The last thing to be done in FIG. 21 is to check to see if the adjust value has reached zero (2112). If so, then the procedure is done and it returns with the optimum iris (2113). Otherwise the looping continues to set the iris (2103).

With the optimum iris determined, processing continues in FIG. 20 (2005) where the operating iris is set to this new optimum iris. The final offsets and gains for the RED, GREEN, and BLUE analog-to-digital converters can now be set. This setting of the offsets is repeated as before (2006) in FIG. 22. The setting of the gains is repeated as before (2007) in FIG. 23. This concludes the calibration of the camera digitization system. The system will now take high contrast images of the geometric calibration plate.

Adjust Calibration Plate to Camera(s)

After the geometric calibration plate (0900) had been placed in the calibration bracket (1100) and secured, the iris and frame-grabber electronics was optimized to provide a high contrast image. With this complete, it is now time to center and take out as much of the rotational errors that might exist between camera(s) and plate. This is accomplished by running a special software program on the system.

This software program is described in FIGS. 28–38. It is designed to take image(s) from the camera(s) and display information in order to expedite the adjustment of camera-to-plate parameters. Information that is helpful during this part of the calibration procedure, is data concerning how off-center the plate is from each camera, and how much rotation exists between each camera and the plate. This information is constantly refreshed on the display monitor as adjustment takes place. The goal is to minimize these errors as much as possible.

To minimize the off-center error of the plate to the first camera, the X and Y adjustments on the calibration bracket (1101, 1102, 1103) are changed. These are the adjusting screws in FIG. 11. To minimize rotation of this camera relative to the geometric calibration plate, the camera housing screws (0804, 0805, 0806, 0807) are adjusted in pairs in FIG. 8. In the exemplary system embodiment, it is necessary to check the opposing camera to make sure it has the geometric plate centered and in the proper rotation. To minimize these errors, it might be necessary to adjust the traverse coupling (0703) as shown in FIG. 7 and/or the camera housing screws (0804, 0805, 0806, 0807) in FIG. 8 for the opposing camera.

Figure 28:
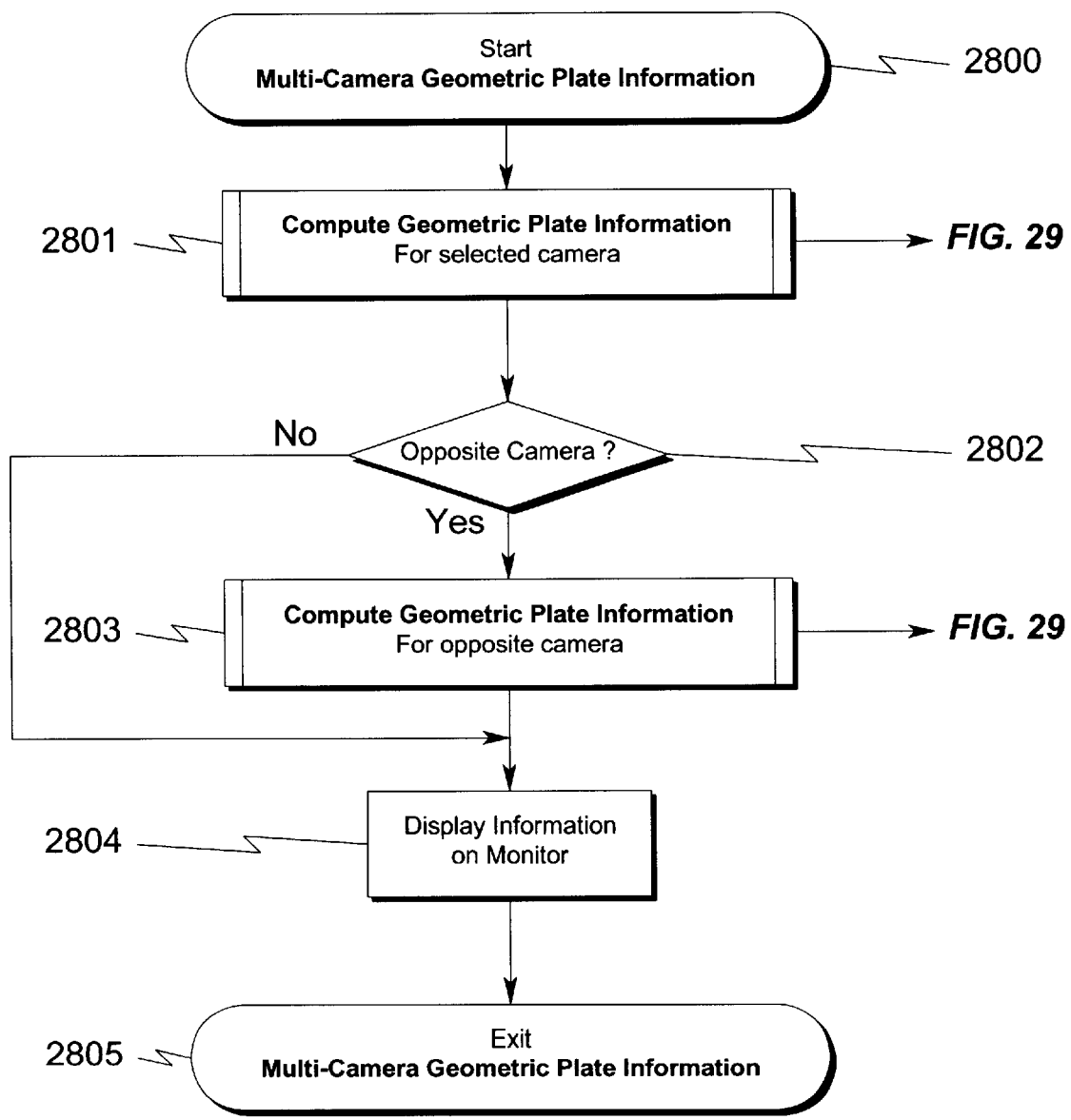
Figure 29:
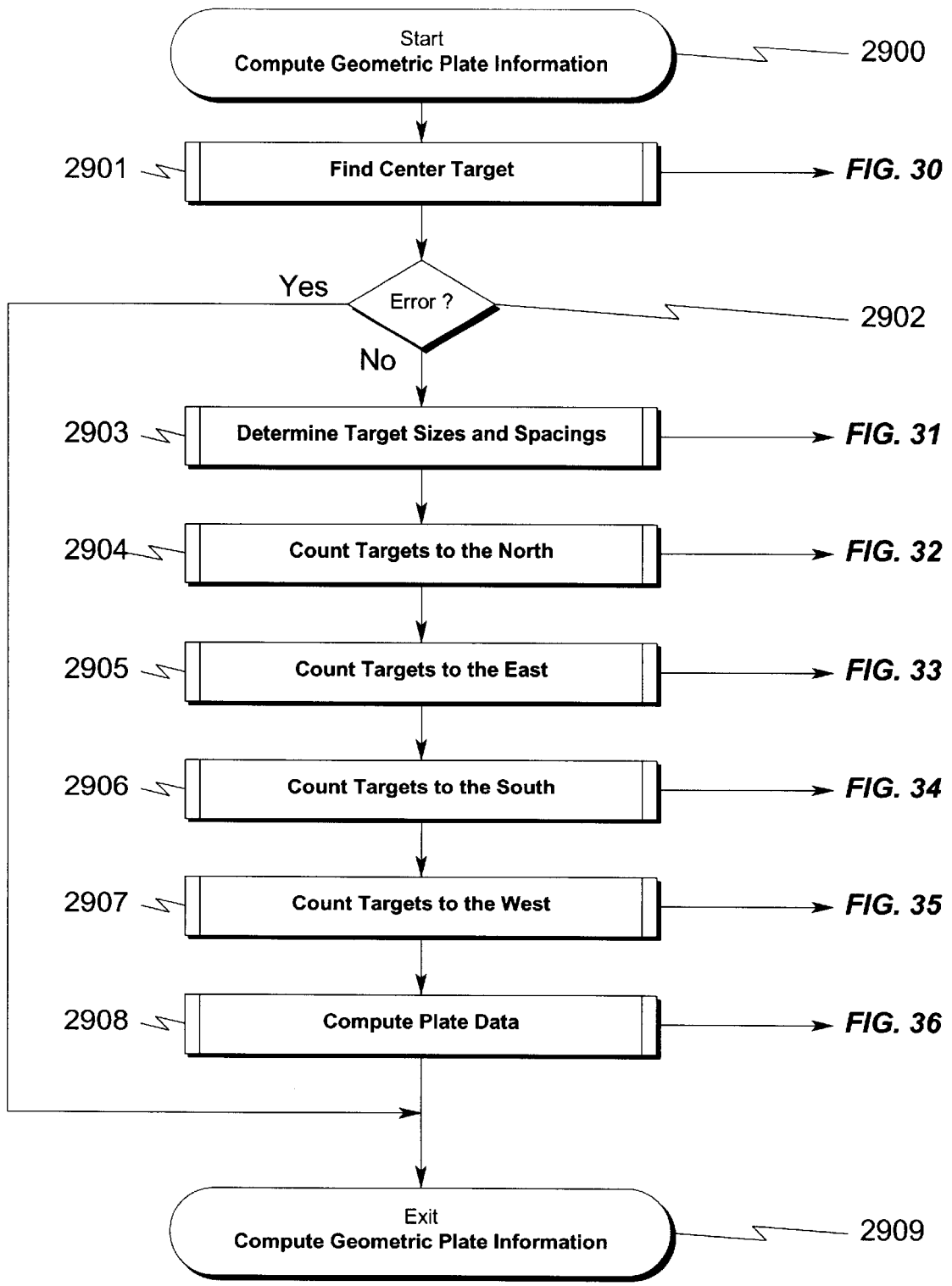

As previously discussed, FIGS. 28–38 are flowcharts describing the software program which refreshes the alignment data on the display monitor. FIG. 28 is the root of this software and describes the techniques employed (2800). First the software computes the geometric calibration plate's (0900) alignment relative to the camera that has the calibration bracket attached (2801). FIG. 29 describes how the data is obtained for a camera (2900).

Figure 30:
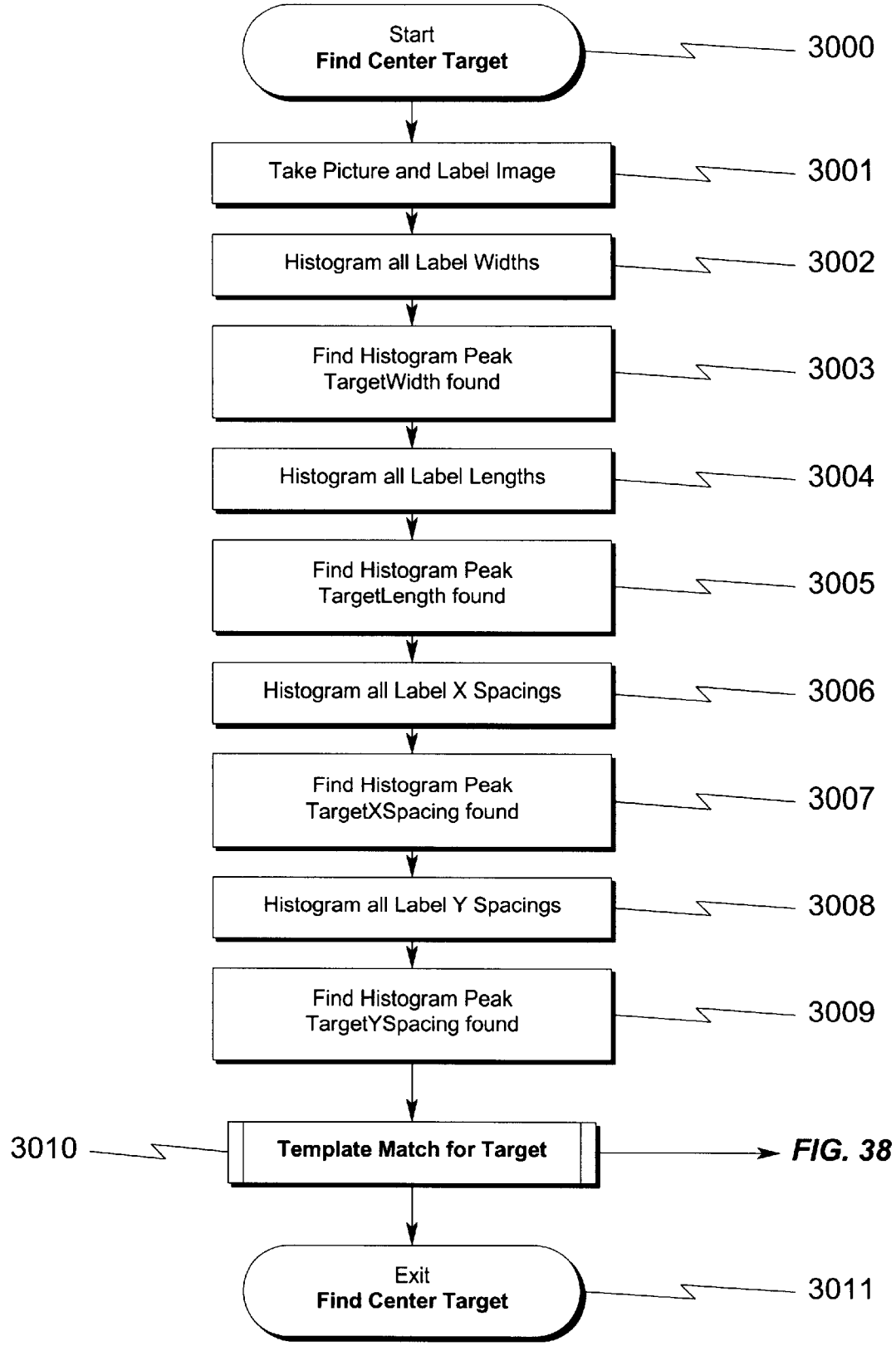

The first function that needs to be performed is to locate the plate's center target (2901). This target (0901) and the plate (0900) are illustrated in FIG. 9. FIG. 30 shows how this target is located (3000). An image is taken off the camera and a label list is generated (3001). A label list is a list of all the white squares detected in the image and their locations in the image. This is accomplished by thresholding the image to separate dark background from white targets and then performing a labeling operation. The list is then histogrammed for each of the desired dimensions and a peak or most-predominant dimension is extracted. First the label widths are histogrammed (3002) and the most-predominant width (peak in histogram) is determined (3003). The target length is found in a similar manner (3004, 3005) followed by the X spacing of the targets (3006, 3007) and the Y spacing (3008, 3009).

Figure 14:
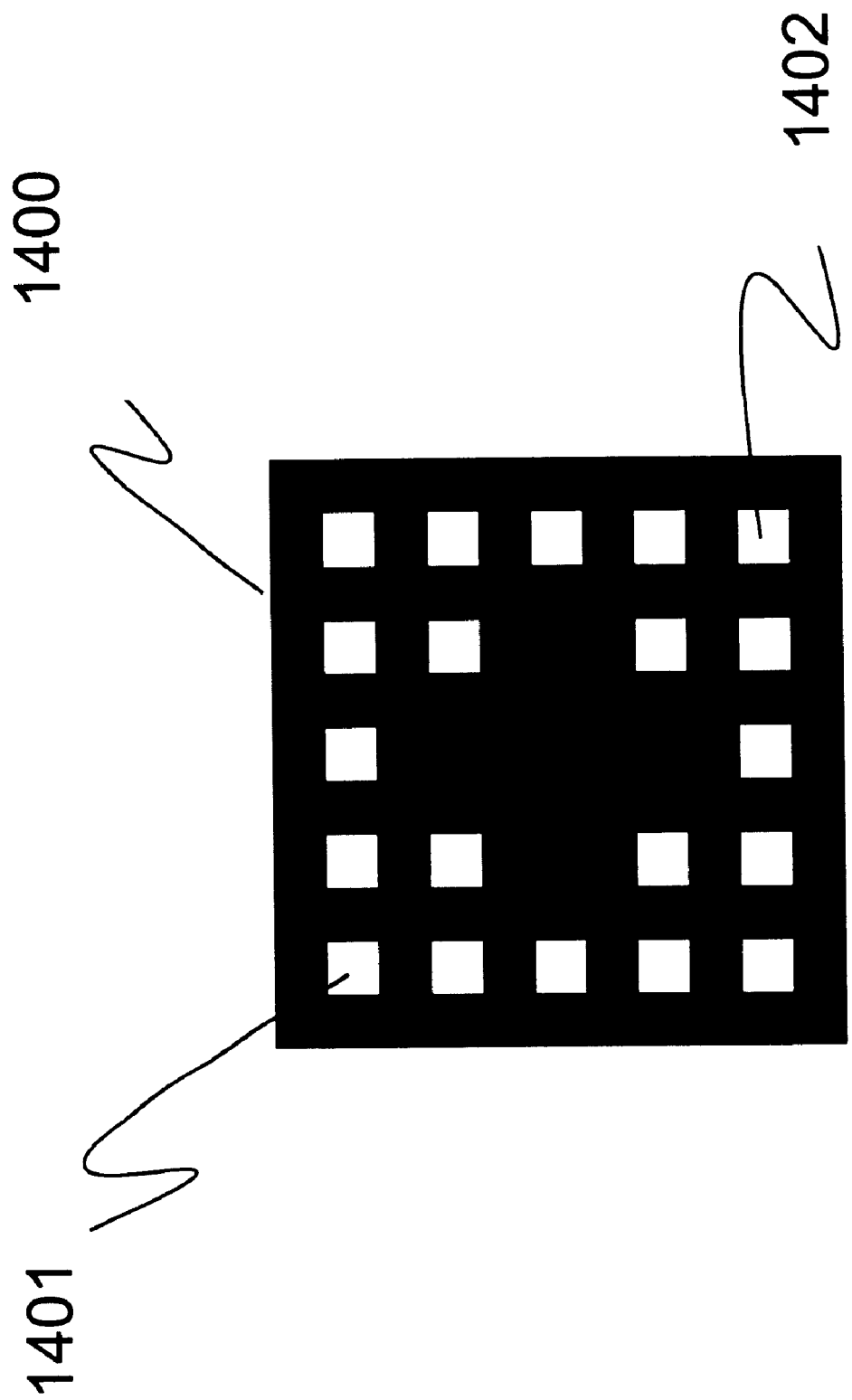
FIG. 14 illustrates a detail of an exemplary camera center crosshair used in an exemplary geometric calibration plate.
Figure 38:
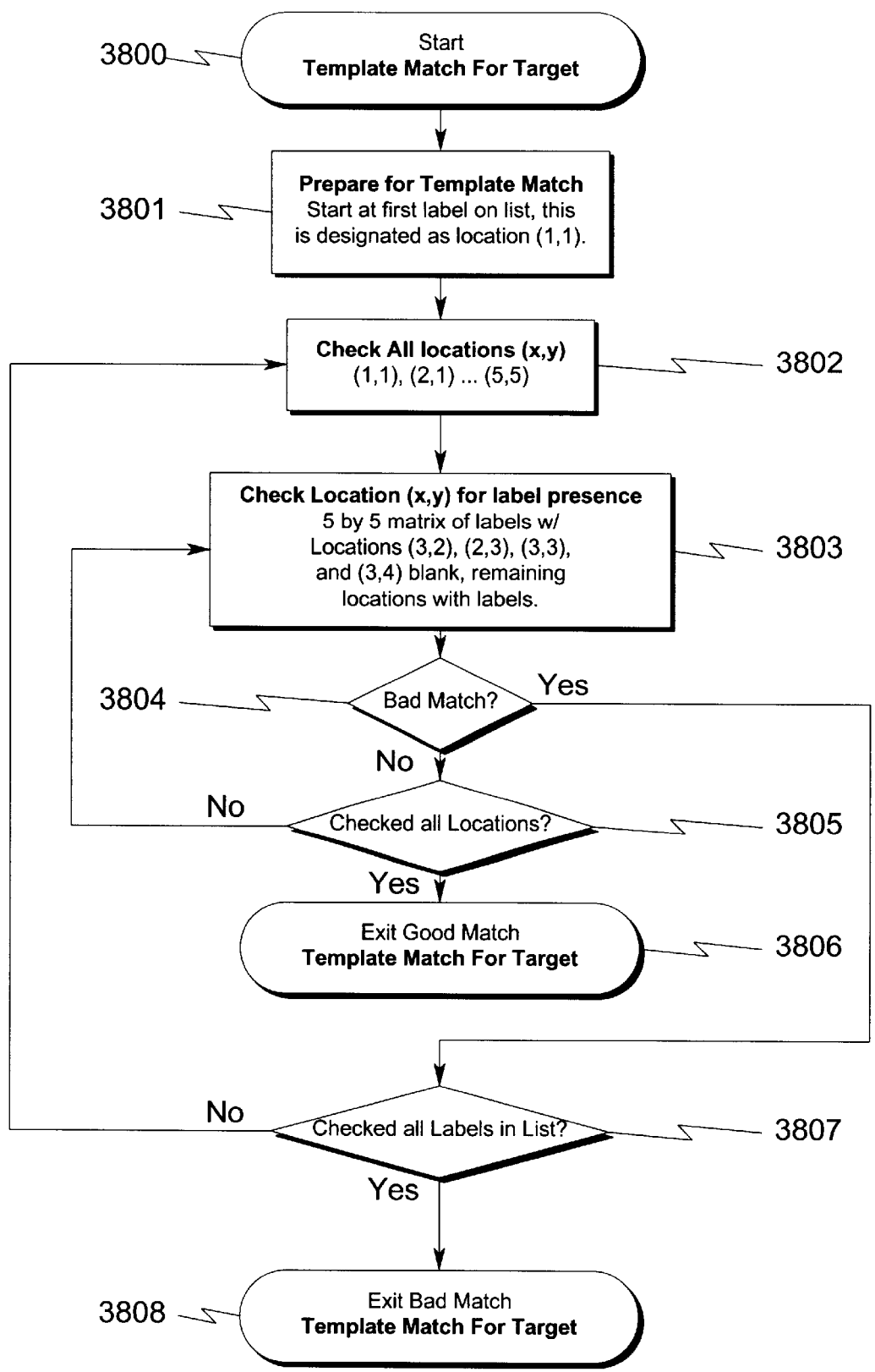

Once these parameters are known, it is possible to perform a template match over the entire list of labels to locate the center target region (3010). FIG. 14 is an illustration of this region. This region (1400) is a 5 by 5 matrix of labels. Location (1,1) is the upper-left corner (1401) and location (5,5) is the lower-right corner (1402). This region (1400) has labels in all locations except for the (3,2), (2,3), (3,3), and (3,4) locations. The template matrix and its superposition over the image is best described by FIG. 14. The template (1400) is superimposed around each label group in the image until a match is found. FIG. 38 describes this matching process (3800). The process starts with the first label in the list (3801). A loop is entered, pretending that the label in question is located at position (1,1) of the template (3802). Each region in the template is checked for the presence or absence of a label (3803). If a non-match is detected (3804), the system then checks to see if any more labels exist on the list (3807). If there are more, processing continues with the next label on the list (3802). If there are not any more labels on the list (3807), the system returns a bad match (3808). If a good match was detected, the system checks to see if the entire matrix has been processed (3805). If all regions have been checked (3805), the system returns with a good match (3806). If not all the regions have been checked (3805), the system then checks the next region (3803).

Figure 31:
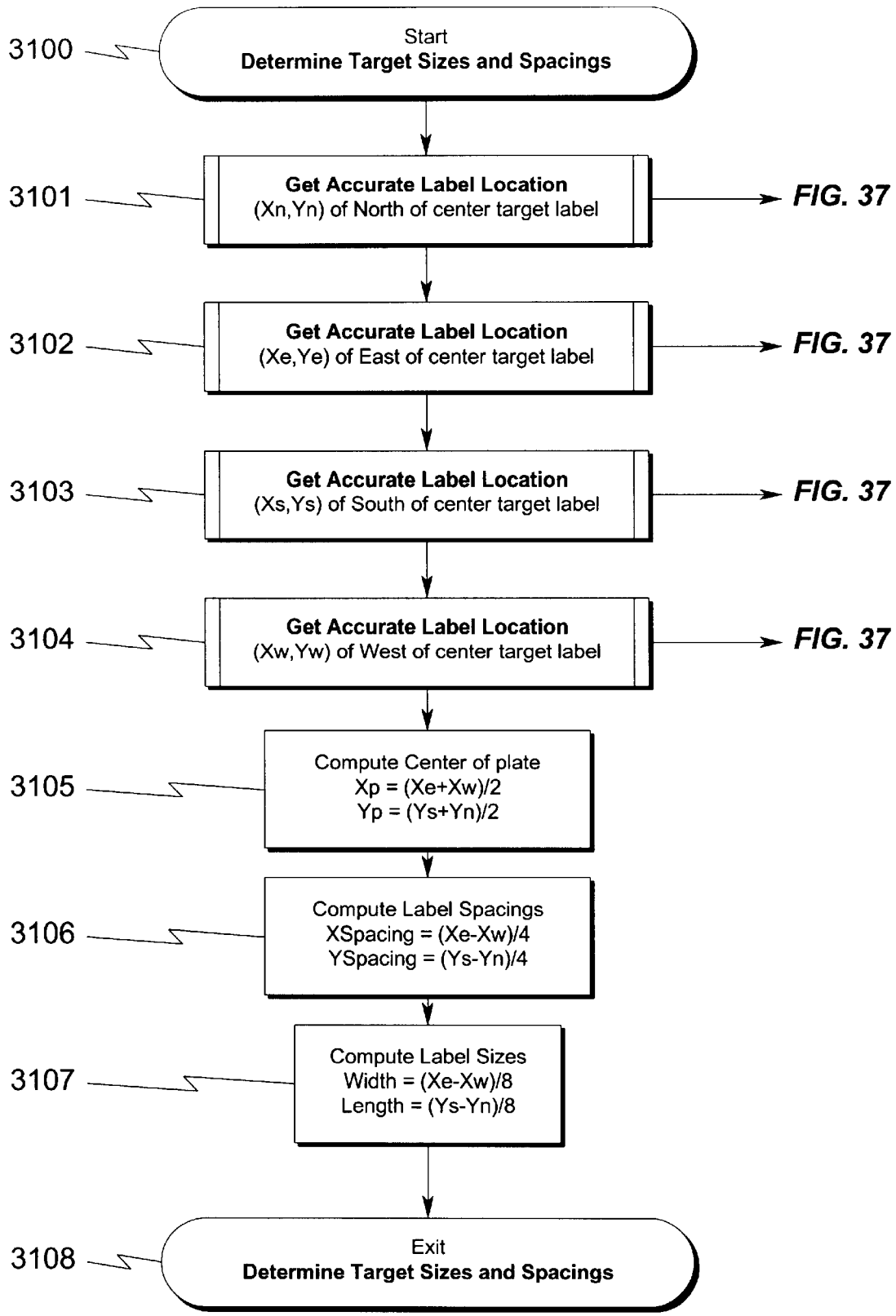

Processing continues (3011) and returns the status of the recognized center of the geometric calibration plate. Back in FIG. 29, the successfulness of finding the center target is checked (2902). If the target is not found (2902), the system aborts and cannot display any alignment data (2909). If the target was successfully located (2902), the system then sets out to determine the accurate center of the geometric calibration plate as well as the accurate white target sizes and spacings between the targets (2903). FIG. 31 describes this process (3100). There are four label locations that are responsible for generating this data. These are referred to as the North label (position 3,1 in the matrix), the East label (position 5,3 in the matrix), the South label (position 3,5 in the matrix), and the West label (position 1,3 in the matrix).

In order to get accurate results, each label has its accurate center determined (3101, 3102, 3103, 3104). The returned label centers are (Xn,Yn) for the North label, (Xe,Ye) for the East label, (Xs,Ys) for the South label, and (Xw,Yw) for the West label. Each determination is accomplished by examining a region containing the label. This region is chosen to be 20% larger than the actual label region and is processed as described in FIG. 37 (3700).

First the label center coordinates and X/Y sizes are determined (3701). The analysis rectangle is computed to be 20% larger than the label (3702). The number of samples and weighted sums are initialized (3703). The system then computes a weighted sum based on coordinates and intensities at the coordinates for each pixel in the analysis rectangle (3704). The sums are calculated over the entire region (3705). When the sums are complete, the accurate X,Y center of the label is computed (3706). The system returns this data (3707). By repeating this process for each of the North, East, South, and West labels (3101, 3102, 3103, 3104), the accurate centers can then be used to compute the center of the plate (3105). The center of the plate is computed (3105), the label spacings are computed (3106), and the label sizes are computed (3107). The system then returns back to FIG. 29 for further processing (3108).

Figure 32:
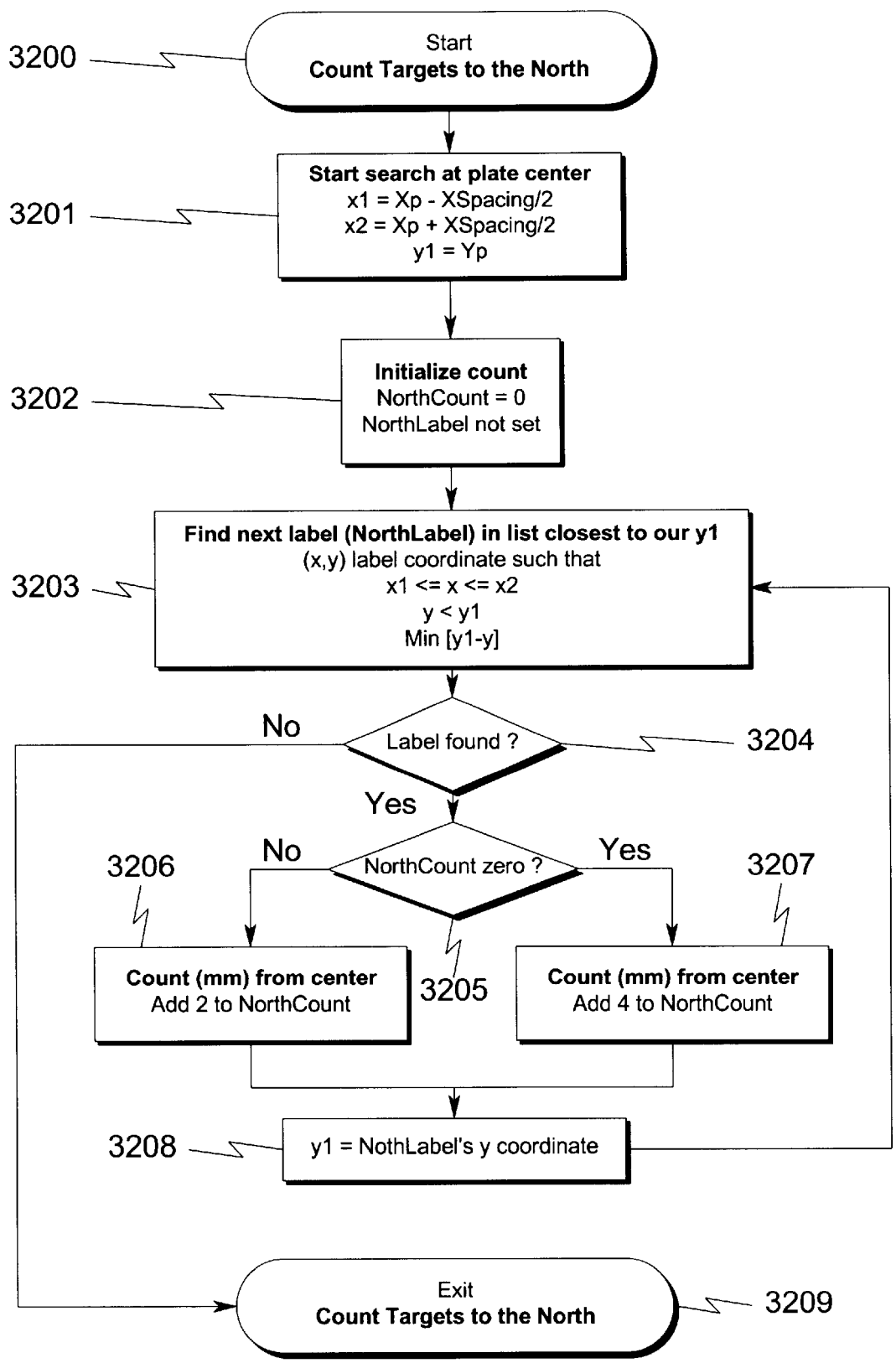
Figure 33:
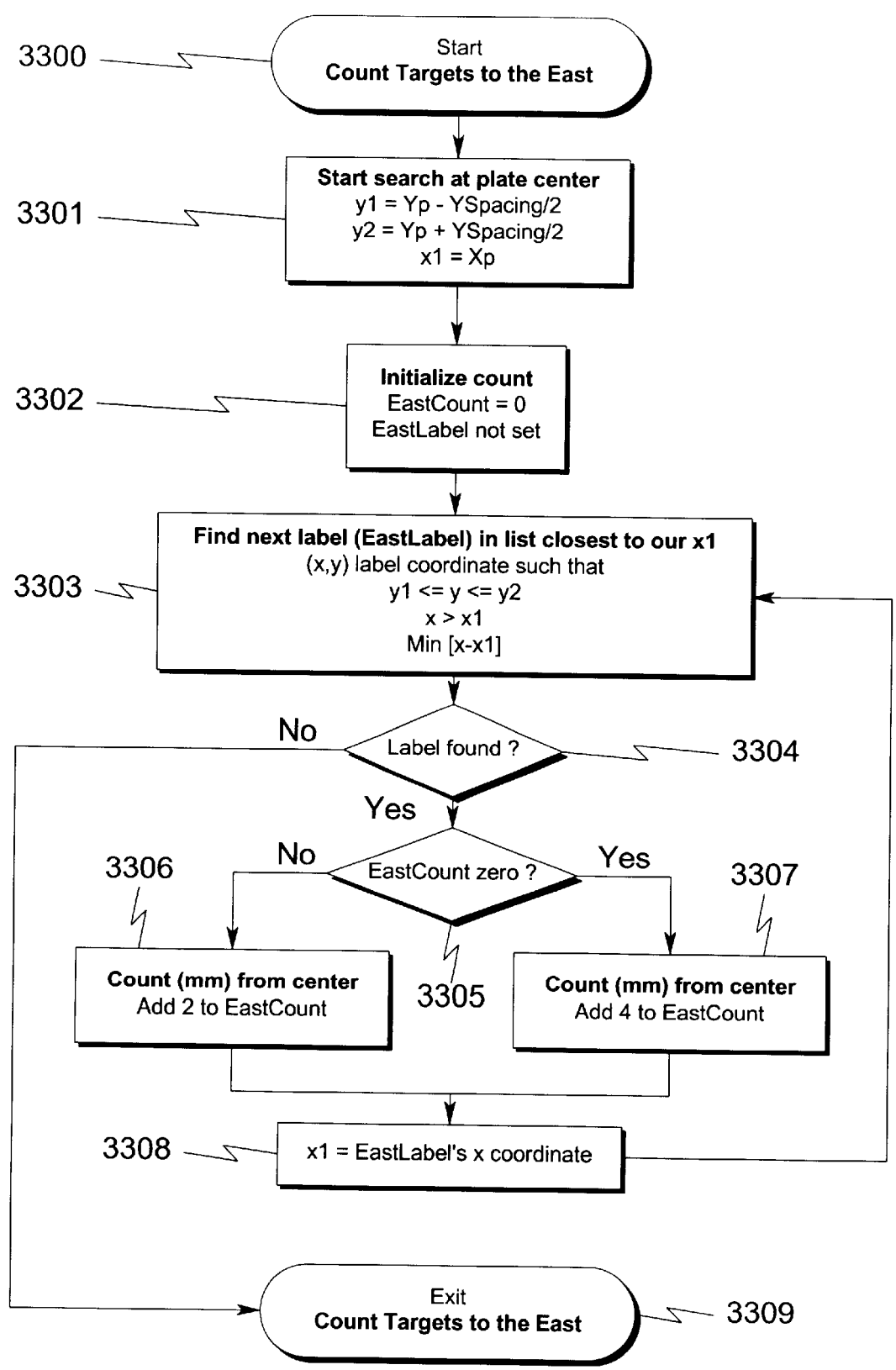
Figure 34:
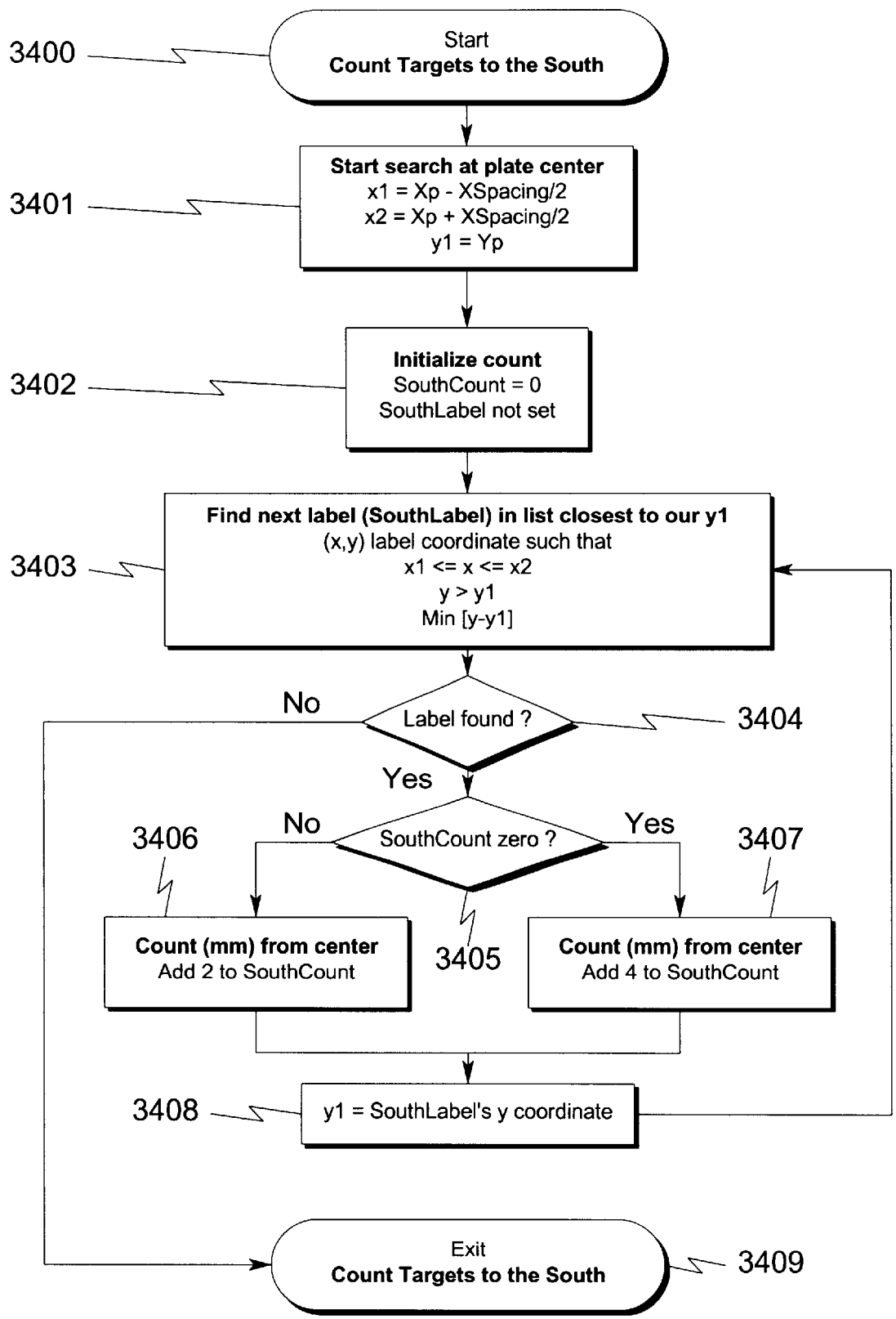
Figure 35:
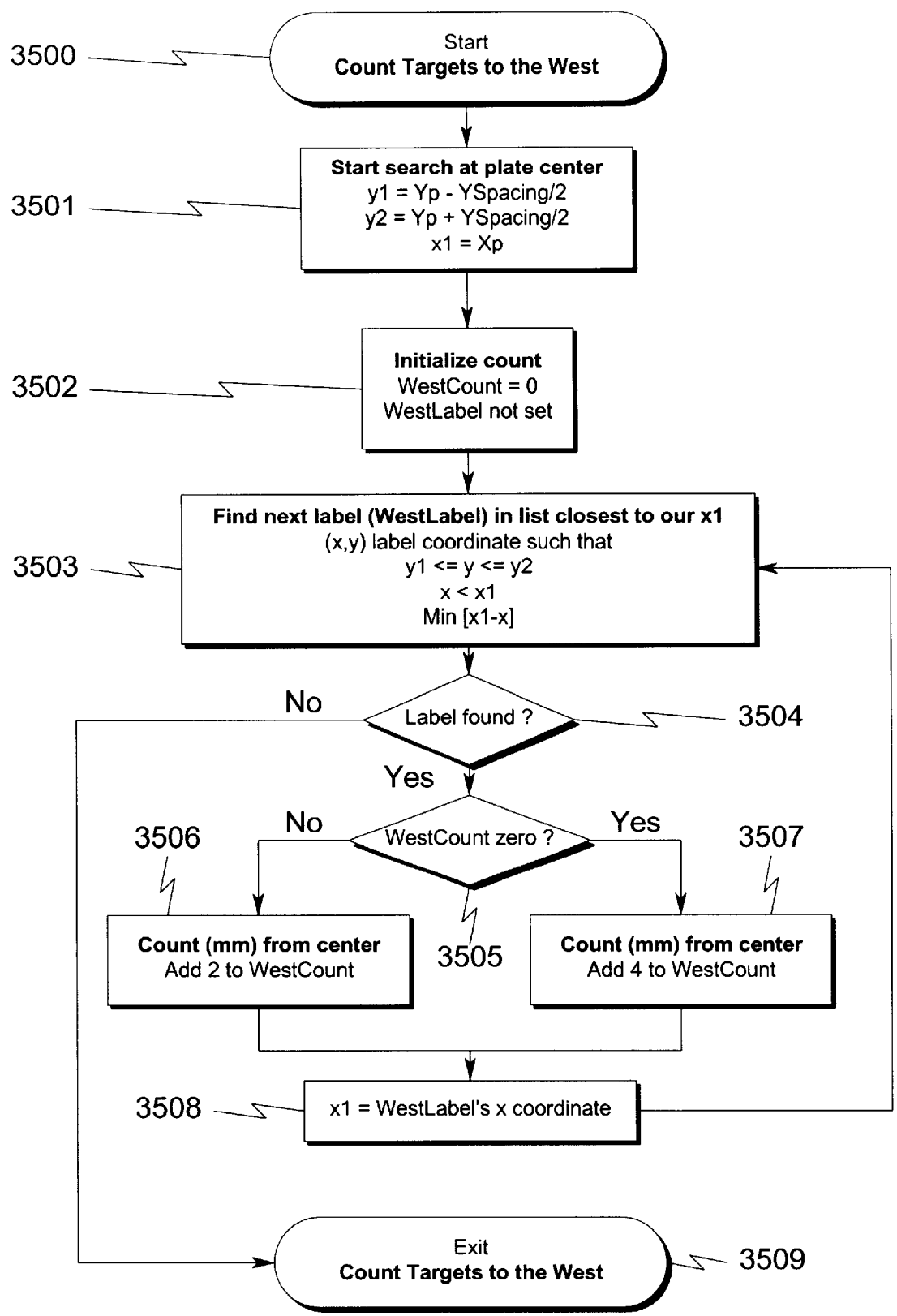

With an accurate plate center and target sizes and spacings determined (2903), the system then sets out to locate other important labels. These labels are those on the extreme periphery of the image in the North, East, South, and West directions from the center of the plate. The procedure for locating these labels takes place in FIG. 32 for the North label (2904), FIG. 33 for the East label (2905), FIG. 34 for the South label (2906), and FIG. 35 for the West label (2907). FIG. 32 illustrates how the North label is found (3200). The search is started at the center of the plate and proceeds in a northerly direction one label at a time (3201). The North Millimeter (mm) Count is initialized to zero (3202). The system finds the closest label due North from the starting location (3203). If a label was not found (3204), the system assumes completion and returns (3209). If a label was found, the Millimeter (mm) Count is updated by the number of millimeter advanced (3205, 3206, 3207). After this count is updated, the starting location is updated (3208) and processing continues looking for the next label (3203). When this routine is exited (3209), the Northernmost label has been found as well as the number of millimeter it is from the center of the plate. The East, South, and West labels are found in a similar manner (3300, 3400, 3500).

Figure 36:
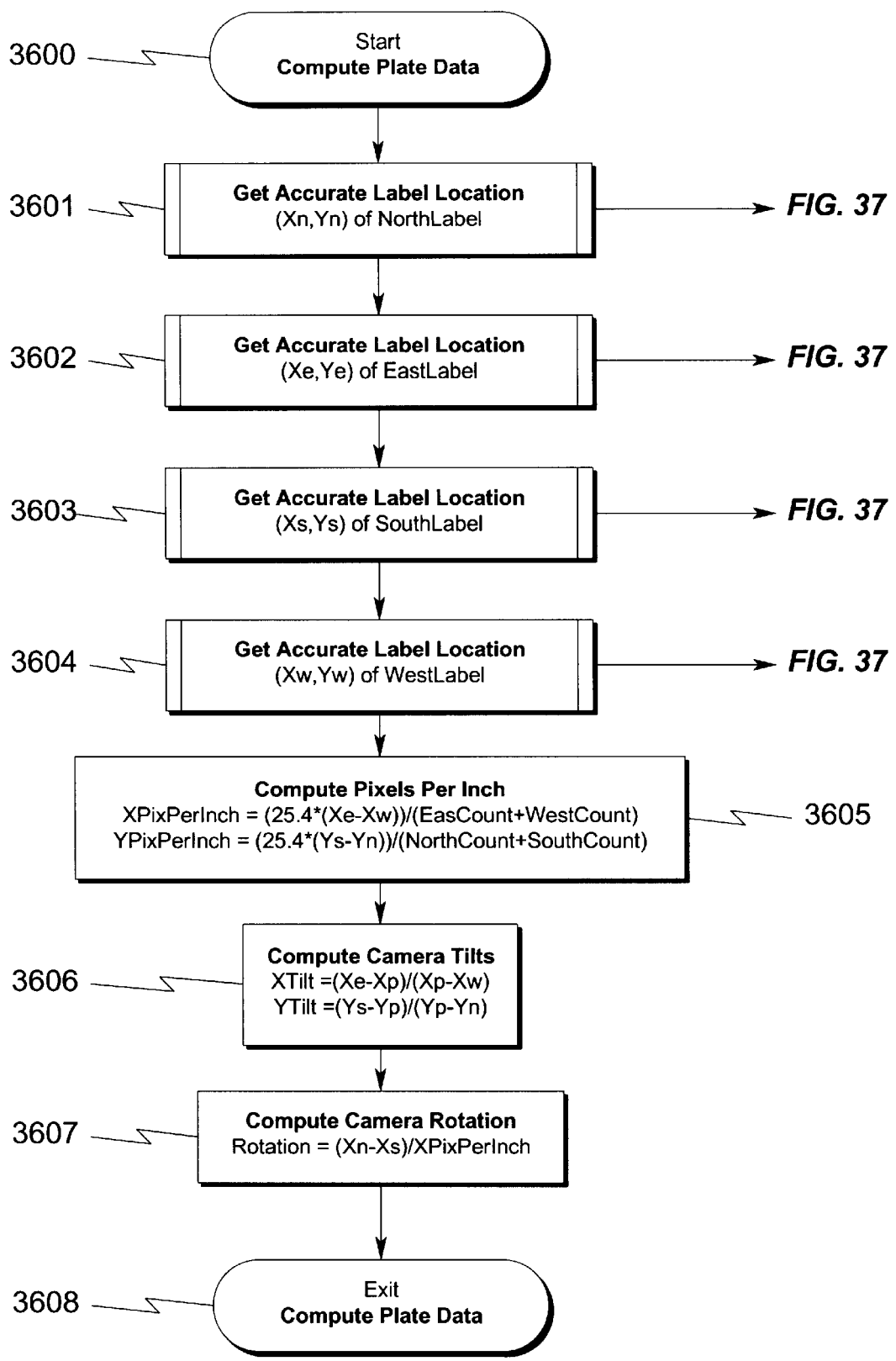
Figure 37:
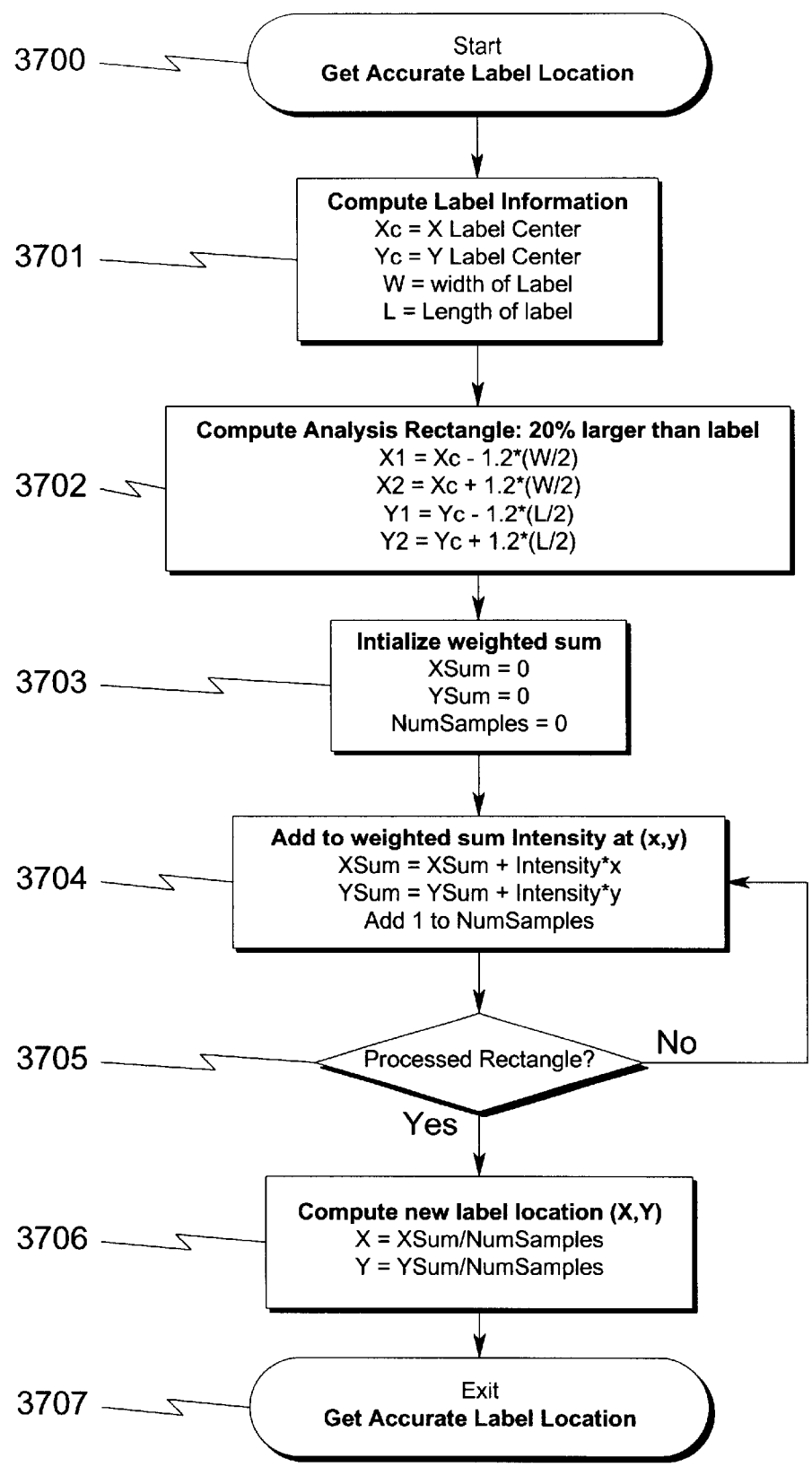

With all extreme labels detected, the system resumes processing in FIG. 29 (2908). It is now time to compute all the plate alignment parameters. FIG. 36 illustrates how this is accomplished (3600). The first step is to get the accurate centers of each of the North, East, South, and West labels (3601, 3602, 3603, 3604). This is performed exactly as was done when calculating the center of the calibration plate. FIG. 37 describes how the accurate center is determined (3700). With these centers computed, the Pixels per Inch parameters are calculated (3605). The camera tilt (3606) and rotation (3607) information are also calculated. The tilt information gives an indication of how much a camera is non-perpendicular and rotation information gives an indication of how much the camera is rotated relative to the plate. After computing this data, processing returns (3608) to FIG. 29 (2909) that returns to FIG. 28 (2802). This concludes the analysis of the camera's geometric calibration plate information.

Given the exemplary system embodiment, it is necessary to check to see if there is an opposing camera (2802). if so, it will be necessary to repeat the whole process for this camera (2803). With all the data compiled, the system then displays all the information on the viewing monitor (2804) and exits (2805). This calculation of data and display on the monitor continues until the operator cancels it. In this manner, the system can be adjusted while readings are being produced.

Compute Camera Center

Another important concept for the distortion-free system to function properly is the concept of a camera centerline. The camera centerline is defined as the (X,Y) coordinate of the CCD imaging pixel which falls on the same image position regardless of magnification. Due to the fact that the lenses are not perfect and the mounting of the CCD imaging devices is not perfect, the centerline pixel is not always the center of the imaged memory. It is important to determine this pixel location relative to the CCD devices and consequently to image memory in order to scale images and compare them to other images produced from other sources. Sometimes the CCD image size is larger than the image memory size, and so the region that is stored in memory from the CCD can be moved relative to the CCD. This has the effect of centering the camera centerline pixel with the center of image memory. Not all imaging systems can accomplish this, so in the very least, the camera centerline pixel relative to image memory must be stored for later use. In the exemplary system embodiment the CCD devices employed have an image size of 768 by 582. The size of the image actually stored in the exemplary system embodiment is 768 by 512. Due to this fact, the frame-grabber can have its region-of-interest modified somewhat in the Y direction to center the camera centerline pixel in memory.

Figure 15:
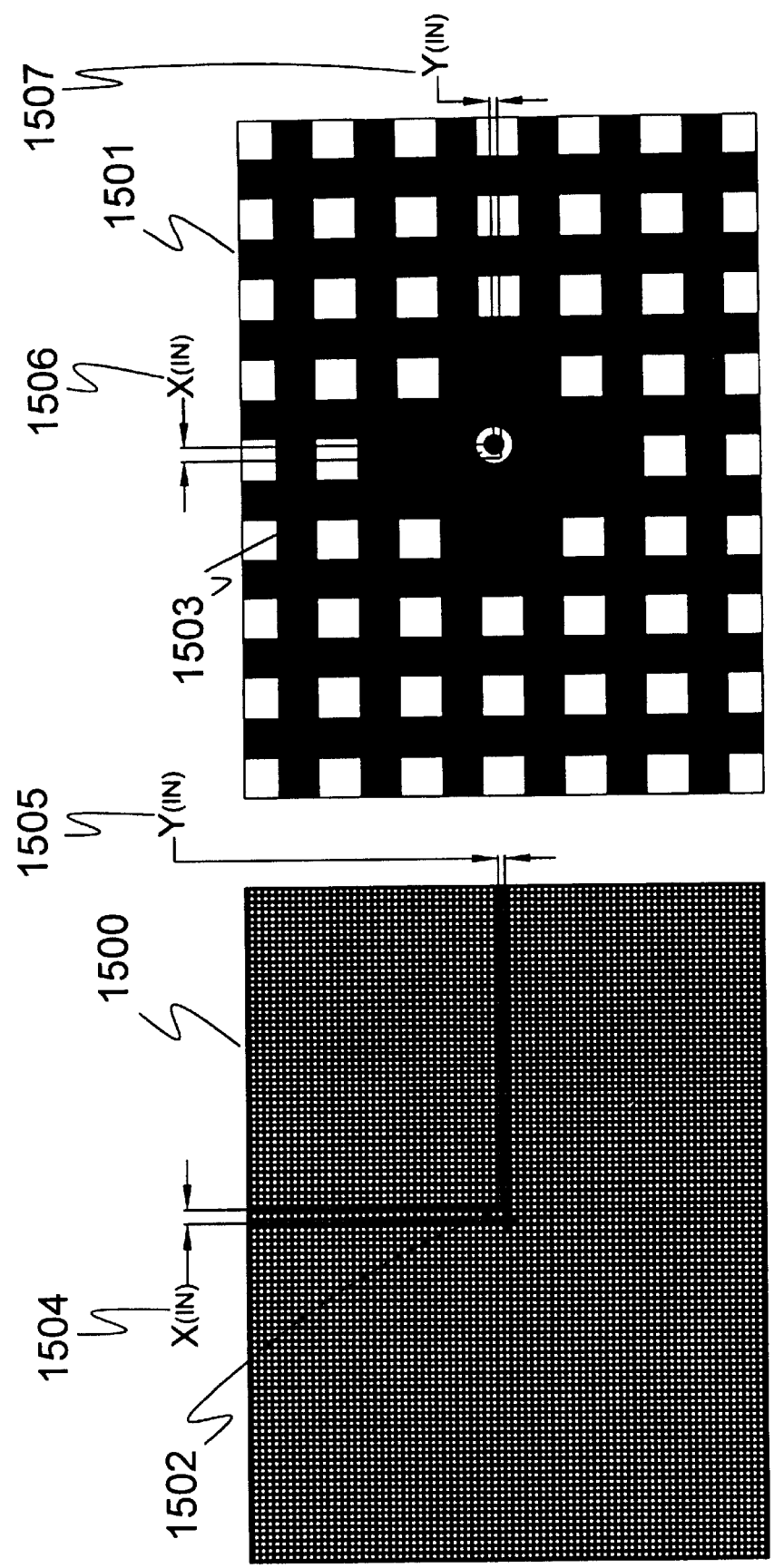
FIG. 15 illustrates positioning of the exemplary camera center crosshair detailed in FIG. 14.
Figure 39:
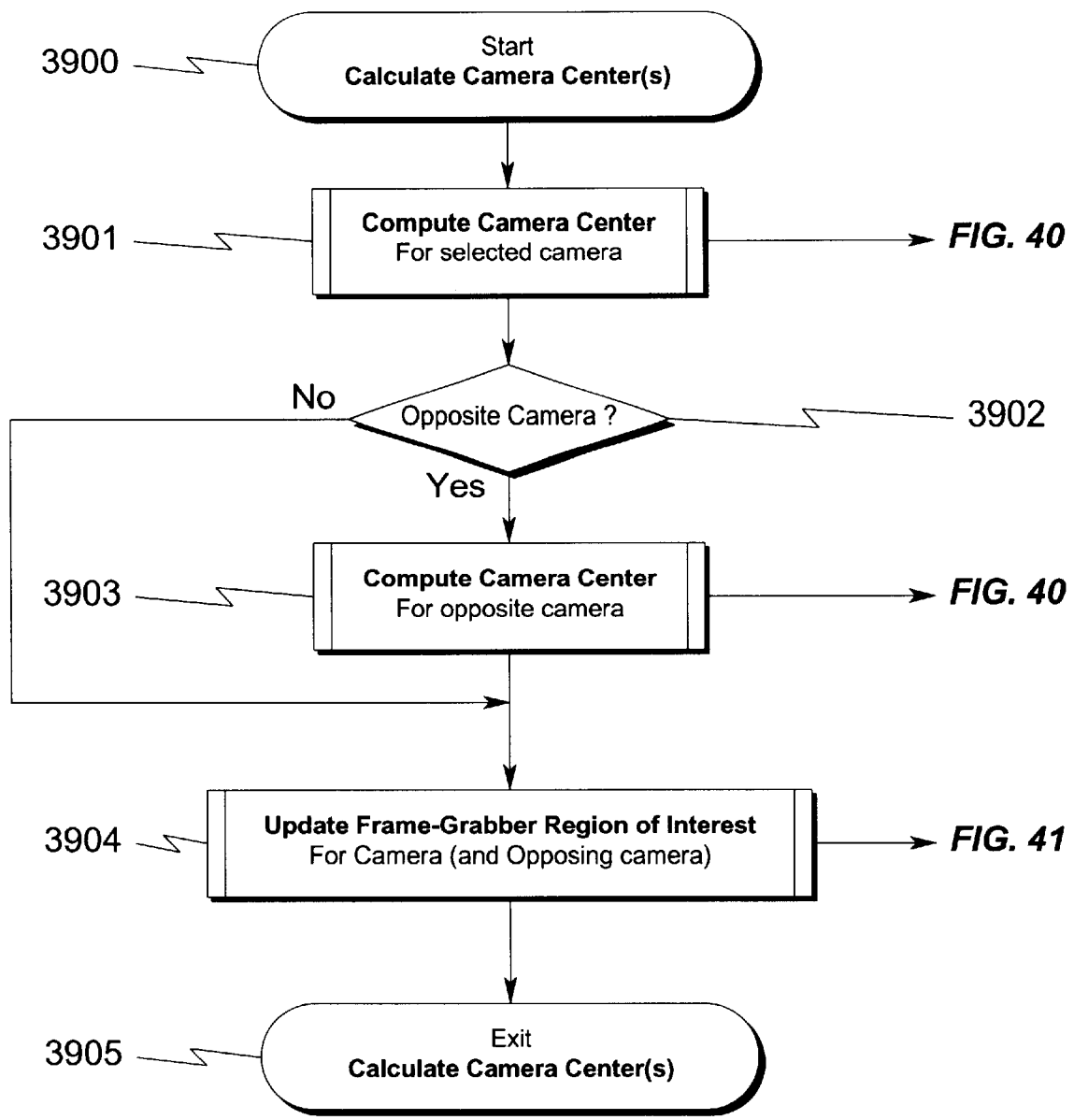
Figure 40:
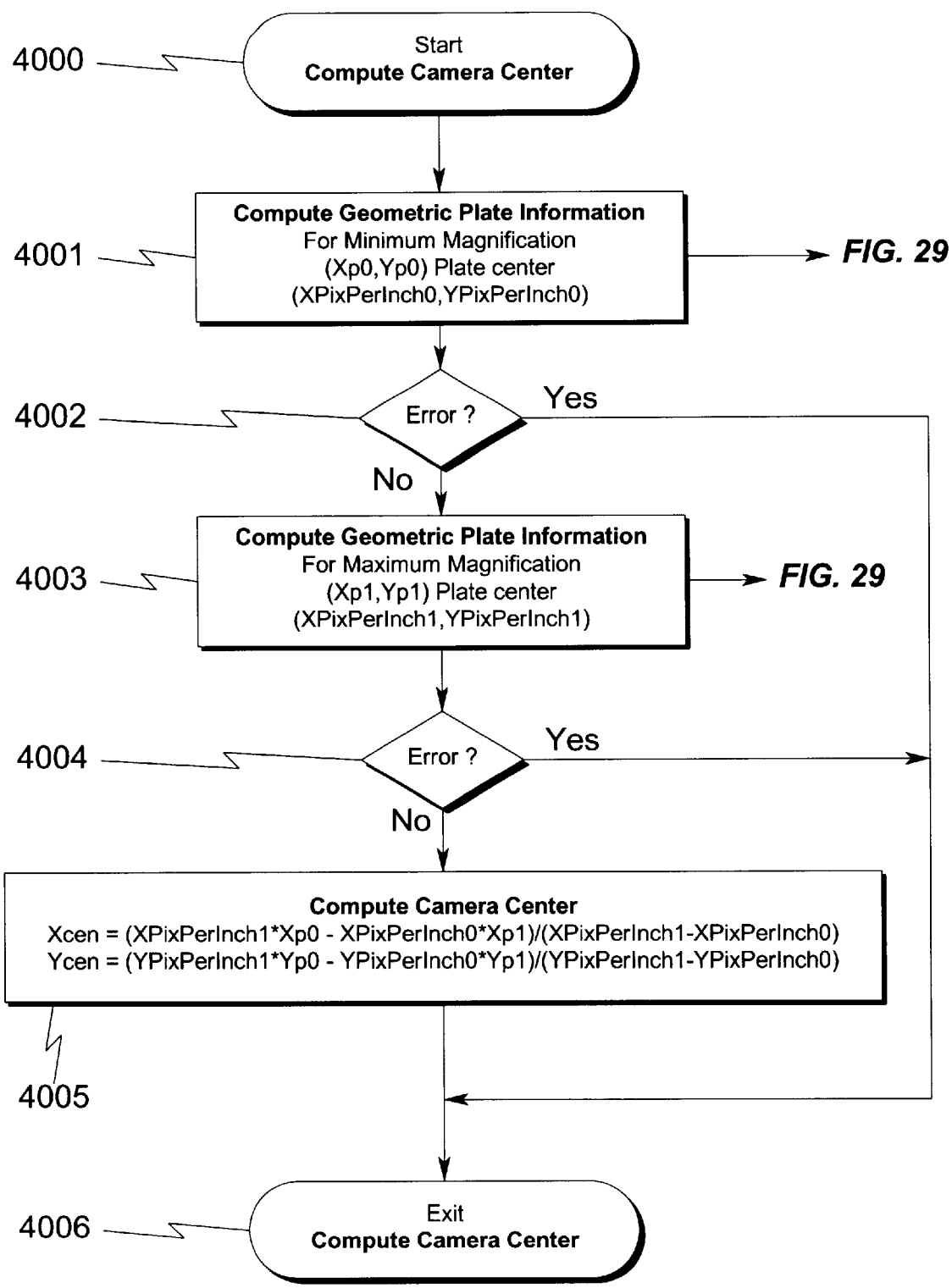
Figure 41:
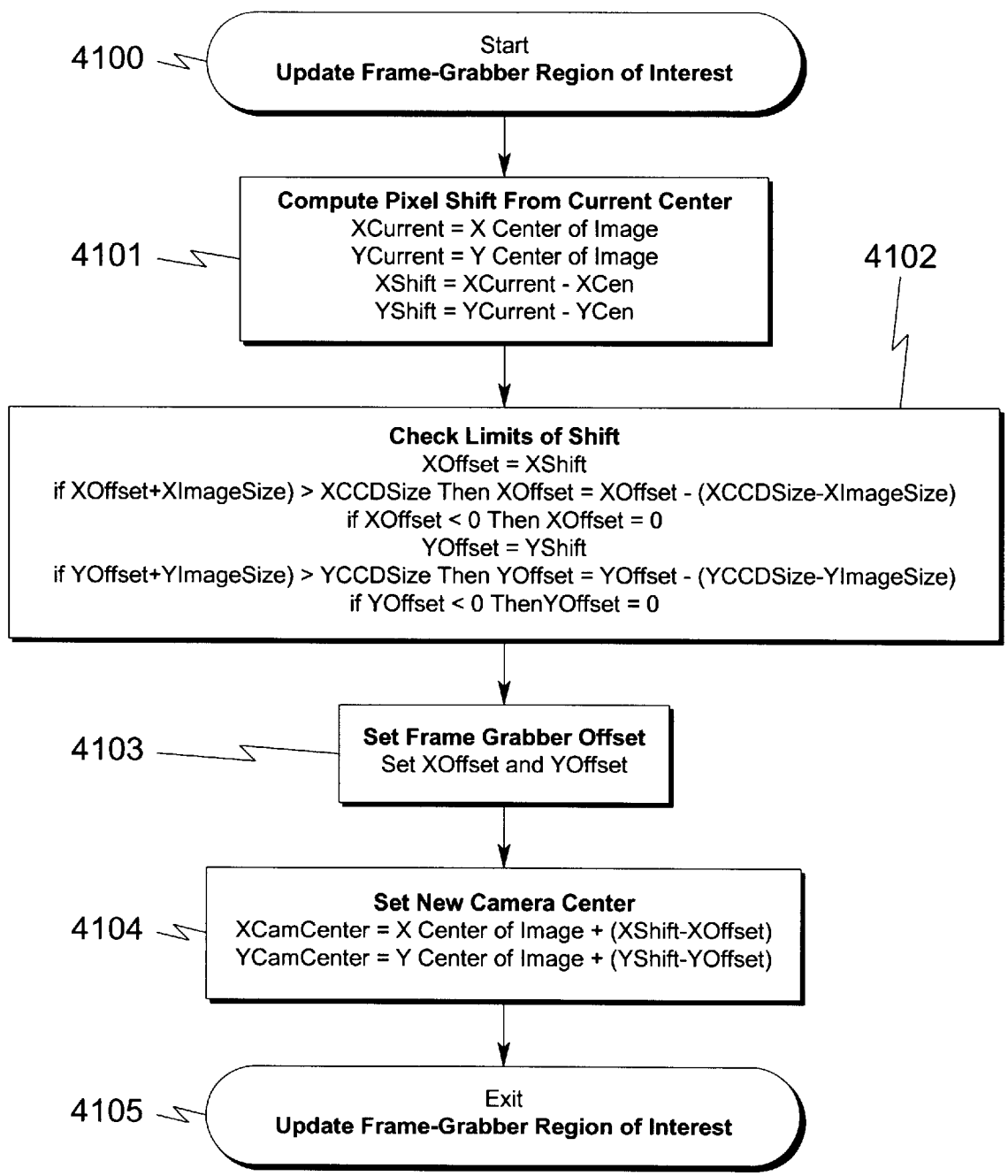

To calculate and compensate for the camera centerline pixel location, a software program as described in FIGS. 39–41 was devised. FIG. 15 illustrates the zoomed-out image (1501) and the zoomed-in image (1502), which are acquired in order to determine the centerline pixel location. This has the ability to take images from a camera and calculate the camera centerline pixel relative to image memory. The program attempts to center this pixel in image memory if the imaging system allows it. FIG. 39 starts the procedure (3900). First the centerline pixel for the main camera is computed (3901). FIG. 40 illustrates this procedure (4000). The program makes use of the same software that was used to align the geometric calibration plate with the camera, FIG. 29. This software was responsible for taking a picture of the calibration plate at a desired magnification and calculating various parameters. The system takes a picture of the plate at minimum magnification (1500) and calculates (Xp0,Yp0), the center of the plate, and (XpixPerInch0,YpixPerInch0), the magnification parameters (4001). If the operation is unsuccessful, the system aborts the function (4002, 4006). If the operation is successful, the system will calculate the same data for an image of the plate at maximum (1502) magnification (4003). Again refer to FIG. 29 for the method of calculation. This image gives (Xp1,Yp1), the center of the plate, and (XpixPerInch1, YpixPerInch1), the magnification parameters for maximum magnification. If an error is detected, the system aborts the procedure (4004, 4006). If no error is detected (4004), the camera centerline pixel is calculated relative to image memory (4005).

The calculation is based on the definition of the centerline pixel location. In both the minimum and maximum magnified images (1501, 1502), the centerline pixel must fall on the same image memory pixel (X,Y) (1502, 1503). This pixel in both cases must fall on an imaged part of the plate that is the same absolute distance (Xin,Yin) from the center of the calibration plate (1504, 1505, 1506, 1507). Due to these facts, the following equations result:

$$X - Xp0 = Xin * XpixPerInch0 \qquad (1)$$

$$X - Xp1 = Xin * XpixPerInch1 \qquad (2)$$

and $$Y-Yp0=Yin*YpixPerInch0 \quad (3)$$

$$Y-Yp1=Yin*YpixPerInch1 \quad (4)$$

To solve for X, first solve equation (1) for Xin and plug the result into equation (2):

$$X - Xp0 = \frac{(XpixPerInch0*(X-Xp1))}{XpixPerInch1} \quad (5)$$

Solving equation (5) for X the result is:

$$X = \frac{(XpixPerInch1*Xp0 - XpixPerInch0*Xp1)}{(XpixPerInch1 - XpixPerInch0)} \quad (6)$$

Similarly, solving for Y yields:

$$Y = \frac{(YpixPerInch1*Yp0 - YpixPerInch0*Yp1)}{(YpixPerInch1 - YpixPerInch0)} \quad (7)$$

FIG. 40 exits with the calculated centerline pixel of (Xcen=X,Ycen=Y) (4006). Following the logic in FIG. 39 for the exemplary system embodiment, it is necessary to do the same processing for the opposing camera (3902, 3903). After these successful operations, the next step is to attempt to center these pixel locations in frame-grabber memory (3904). FIG. 41 gives the logic behind this function (4100). First the amount of shift needed (Xshift,Yshift) to accomplish the centering is computed (4101). The amount of X and Y shift must be checked against the operating limits of the imaging system (4102). Offsets for the frame-grabber (Xoffset,Yoffset) are computed which reflect any shift, if any, that the frame-grabber can compensate for (4102). With the offsets computed, they are set on the frame-grabber (4103). Realizing that some of the shift might be taken out by the frame-grabber, the new camera centerline pixel locations (XcamCenter,YcamCenter) are computed relative to image memory (4104). These values are stored permanently on the system and the program completes (4105, 3905).

Adjust Calibration Plate to Camera(s)

After computing and compensating for the camera(s) centerline pixel locations. It is possible that the frame-grabber was modified to compensate for some of the shift to center these pixels in image memory. Due to this fact, the center of the geometric calibration plate (0900) might no longer be centered accurately with the camera(s). In order to compensate for this and to prepare for subsequent calibration procedures, the adjustment of the plate to the cameras is repeated as described earlier. Only X/Y shifts should have occurred, so there is no need to compensate for any rotation.

Adjust Camera to Camera Tracking

The Camera-to-Camera tracking error refers to how well both cameras are aligned to each other as they traverse the length of the traversing unit (0700). This error is specific to the exemplary system embodiment of two cameras coupled together. It would be desirable to seek to minimize this error just as was done with other errors before performing the final calibration. To minimize this error, first would adjust the opposing camera's extrusion (0706) in FIG. 7. This effectively pivots one end of the extrusion in order to make it more parallel to the main camera's extrusion. As an aid to this adjustment, another software program was designed.

Figure 42:
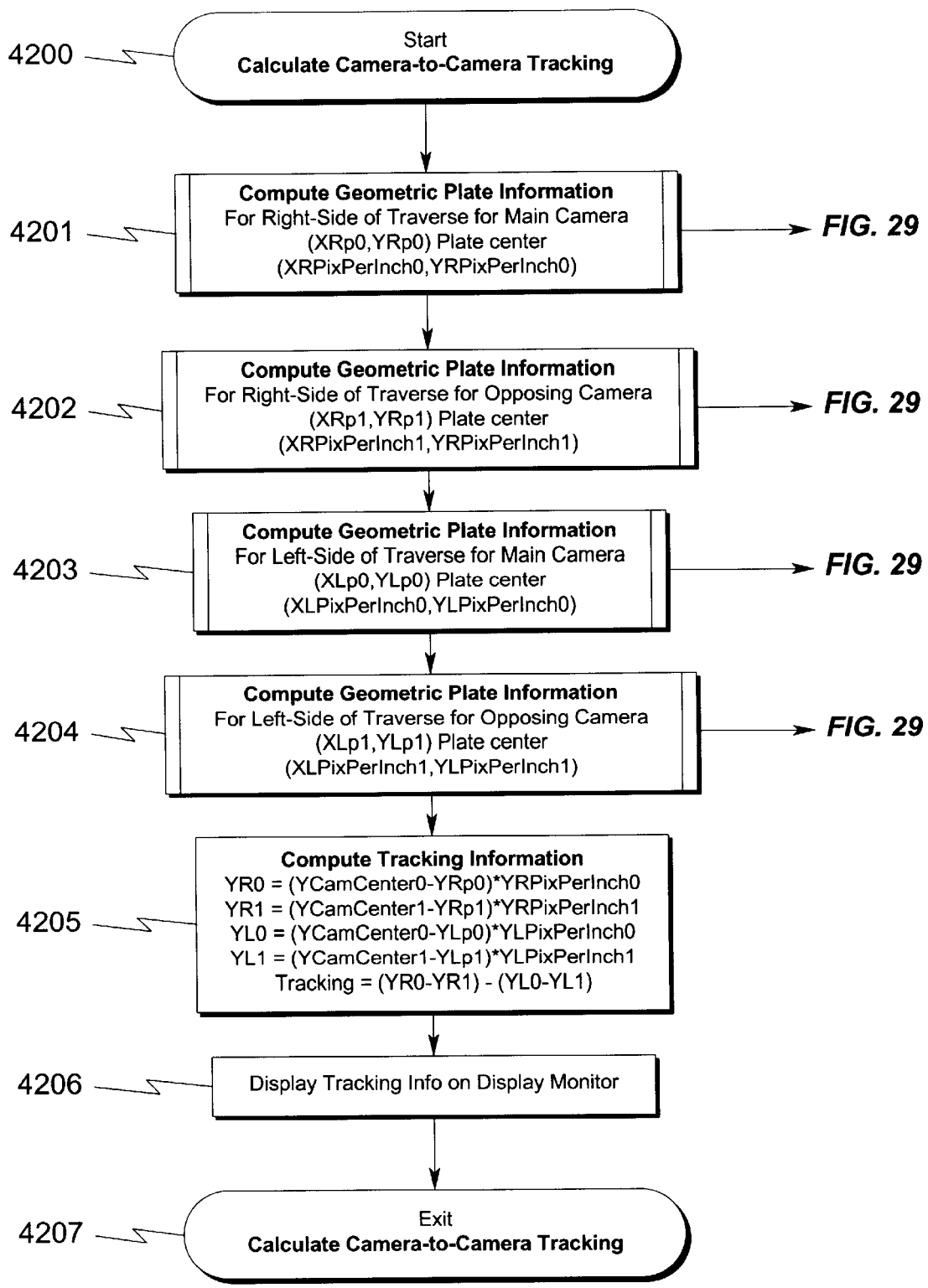

This program is illustrated in FIG. 42 and is used to get a reading on how big the tracking error is from one side of the traverse to the other (4200). First the cameras are positioned via the traversing mechanism (0700) to the right-side extreme of the traverse. At this location an image of the geometric calibration plate (0900) is taken and analyzed for the center of the plate and magnification for the main camera (4201). FIG. 29 illustrates the process of obtaining an image and the accompanying analysis (2900). The same thing is done for the opposing camera (4202). At this point read-outs for the right side of the traverse are available. The plate (0900) centers are (XRp0,YRp0) for the main camera and (XRp1,YRp1) for the opposing camera. The plate (0900) magnifications are (XRPixPerInch0, YRPixPerInch0) for the main camera and (XRPixPerInch1, YRPixPerInch1) for the opposing camera. With these values obtained, the cameras are positioned to the left side extreme of the traversing mechanism (0700) and plate (0900) readings are taken there (4203, 4204). The plate (0900) centers are (XLp0,YLp0) for the main camera and (XLp1,YLp1) for the opposing camera. The plate (0900) magnifications are (XLPixPerInch0, YLPixPerInch0) for the main camera and (XLPixPerInch1, YLPixPerInch1) for the opposing camera. At this point, the next step is to draw upon each camera's centerline pixel location information to determine camera-to-camera alignment. These values were stored earlier and are (XcamCenter0, YcamCentrer0) for the main camera and (XcamCenter1, YcamCentrer1) for the opposing camera. To compute camera-to-camera alignment, the first step is to compute the Y location of the plate relative to the camera centerline pixel location.

The Y relative locations in inches on the right side of the traverse are (4205):

$$YR0=(YCamCenter0-YRp0)*YRPixPerInch0 \quad (8)$$

$$YR1=(YCamCenter1-YRp1)*YRPixPerInch1 \quad (9)$$

On the left side of the traverse, each camera has the following Y relative locations (4205):

$$YL0=(YCamCenter0-YLp0)*YLPixPerInch0 \quad (10)$$

$$YL1=(YCamCenter1-YLp1)*YLPixPerInch1 \quad (11)$$

With these values calculated, it is now possible to get the tracking error in inches (4205):

$$Tracking=(YR0-YR1)-(YL0-YL1) \quad (12)$$

This value is displayed on the display monitor (4206) and the program completes (4207). At this point the operator would view the error, make the appropriate adjustments, and then run the program again to verify alignment.

Lock Zoom Magnifications

To maintain a consistency in magnifications, some number of desired zoom levels is chosen. For fixed-lens cameras there is only one magnification level. For the exemplary system embodiment, each camera has a motorized zoom lens and a total of nine zoom level magnifications are chosen. This number is dependent on the lens and motor capabilities but is somewhat arbitrary. If the camera images were to be compared to other camera images or to off-line images, it would be prudent to choose magnification levels that were fairly close to the comparison image magnifications. If this became a difficult task, one could choose to have many magnification levels, and chances are one would be close to the comparison image. The reason for this is made clear. The distortion-free system will always produce an output image with a desired magnification as well as removing distortion. If the output magnification is radically different from the input image magnification, the system will be either decimating the image or replicating pixels to a large degree resulting in inaccuracies. If the input magnification is chosen to be close to the output magnification, very little disturbances take place of this kind. When it is desirable to compare images in the exemplary system embodiment, zoom magnification settings are chosen across cameras that are as similar as possible. Then the distortion-free system is activated to process these images to a desired common magnification for comparison purposes. Because the magnifications were chosen to be similar from the start, accurate results prevail.

Figure 43:
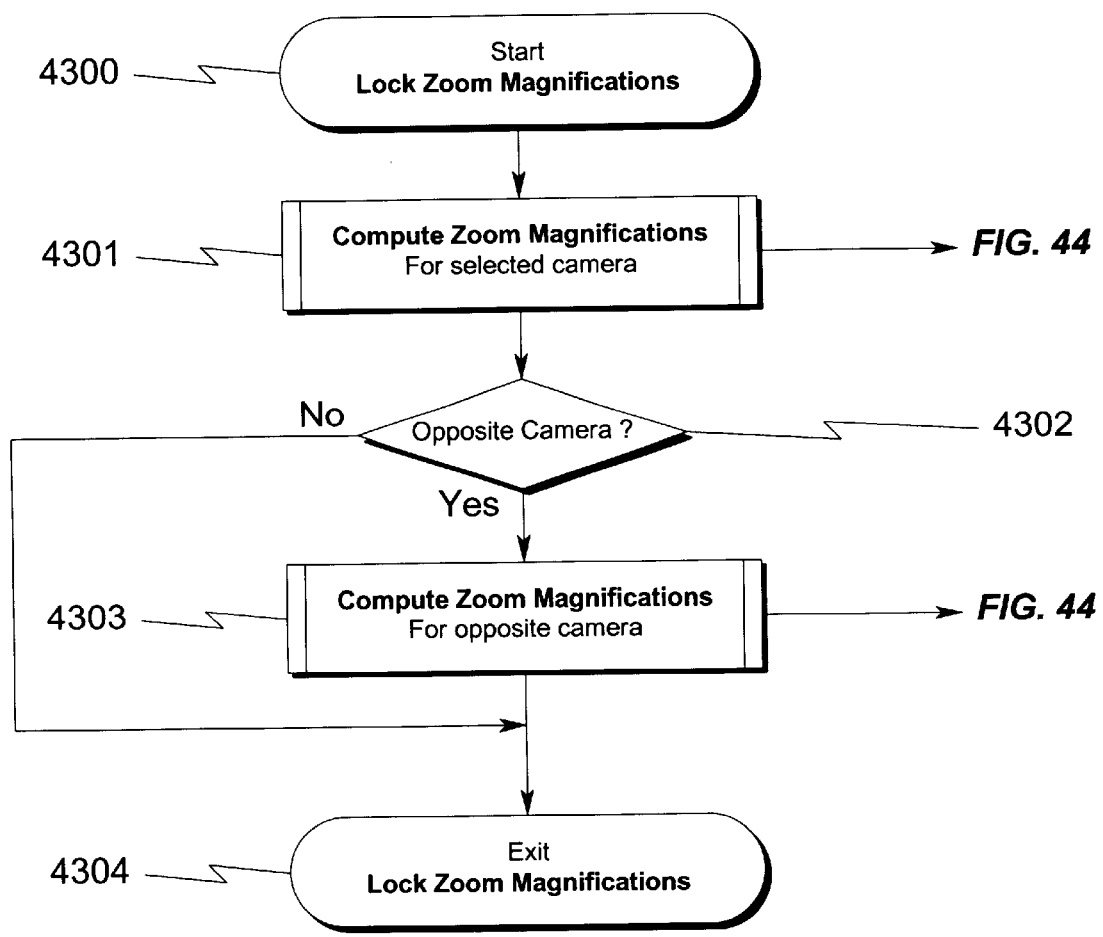
Figure 44:
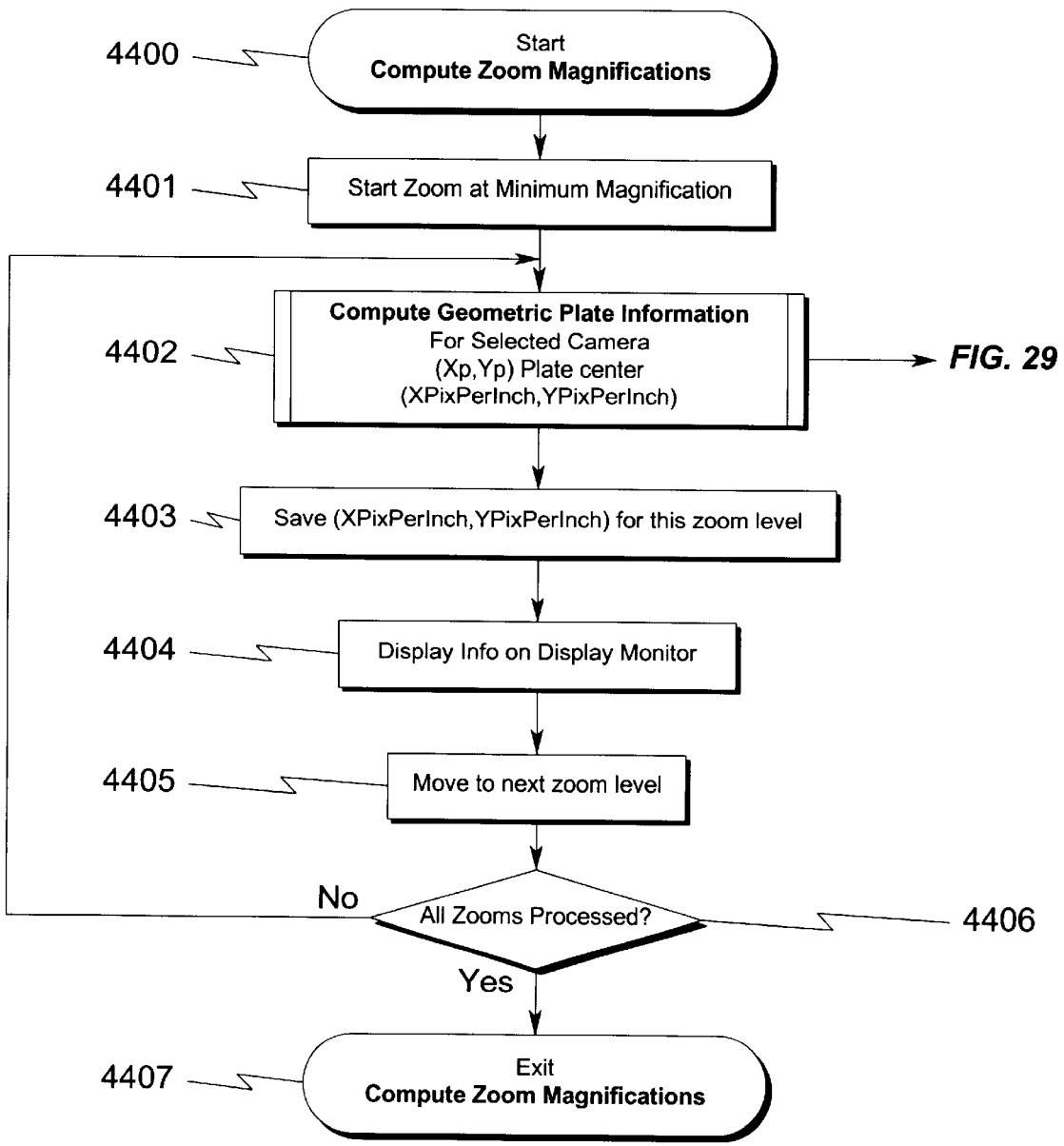

Locking the zoom magnifications means reading and storing permanently the magnifications detected at each desired motorized location of the lens. If a fixed-lens is employed, only one reading need be taken for each camera. If the lens is motorized, then a reading for each magnification level must be stored. To expedite this process, a software program was written. FIGS. 43–44 document this process (4300). First the desired camera has its zoom magnifications locked (4301). FIG. 44 illustrates this process (4400). The system starts at the extreme minimum magnification of the camera (4401). It takes a picture at this magnification and reads the magnification parameters (XpixPerInch,YpixPerInch) off of the geometric (0900) calibration plate (4402). FIG. 29 illustrates this process. These values are then saved permanently (4403) and the values are displayed on the display monitor for viewing purposes (4404). Processing continues with the next higher magnification level (4405). If all the levels have been processed (4406), the program completes (4407). If there are more levels, processing continues (4402). This brings us back to FIG. 43, where the existence of an opposing camera is checked (4302). If it exists, the magnification levels are locked for this camera (4303). With the completion of this, the program completes (4304).

The system now has magnification information available to it for each zoom magnification level that will be used for each camera.

Store Calibration Points

Storing calibration points marks another big step toward preparing the distortion-free system. Essentially a number of images of the geometric calibration plate (0900) will be stored at different magnification and traverse settings for each camera. For fixed-lens cameras, only one magnification is stored. For stationary cameras, only one traverse location is stored. The exemplary system embodiment was chosen to illustrate the most complex scenario of multiple magnifications and multiple traverse locations. Because these images will be rather large and possibly numerous, they are stored as files on a mass storage device for later processing.

Each magnification level, which was chosen earlier, will receive a corresponding file. If the camera rides a traversing mechanism (0700), the situation is more complex. Depending on how inaccurately the traverse tracks the camera, some number of traverse locations will have to be explored. In the exemplary system embodiment, the traverse has a width of 48 inches and was observed to be accurate to about 0.02 inches from one end of its travel to the other. This was determined after adjustment in the "Adjust Camera to Camera Tracking" calibration procedure. Due to this inaccuracy, a total number of 20 evenly spaced locations across the traverse are designated for point storage. This gives points that profile the traverse in 0.001 inch increments. Given the nine zoom levels in this system, a total number of 9×20 calibration image files are stored. As will be seen later these files will be processed down to Data Calibration files at each location. These files form the core of distortion-free image processing. Some time later, as will be seen, an image will be acquired at some magnification level and traverse location. The distortion-free system will be run using the Data Calibration file which most-closely matches the magnification and traverse location chosen.

As mentioned earlier, the calibration image files are stored on the mass storage system. These files have the following configuration:

Camera
Magnification
Traverse Location
Strobe Illumination Flags
[Red component Image of Geometric Calibration Plate]
[Green component Image of Geometric Calibration Plate]
[Blue component Image of Geometric Calibration Plate]
[Illumination Image Data]

The camera, magnification, and traverse location uniquely describe this calibration position. In the exemplary system embodiment, there is a possible four different strobe illumination schemes that can be chosen. The "Strobe Illumination Flags" indicate which strobe illumination scenarios have corresponding illumination data stored. The "Illumination Image Data" section gives illumination images at each stored strobe scenario. The illumination images are stored in a later calibration procedure step and will be explained later.

Figure 45:
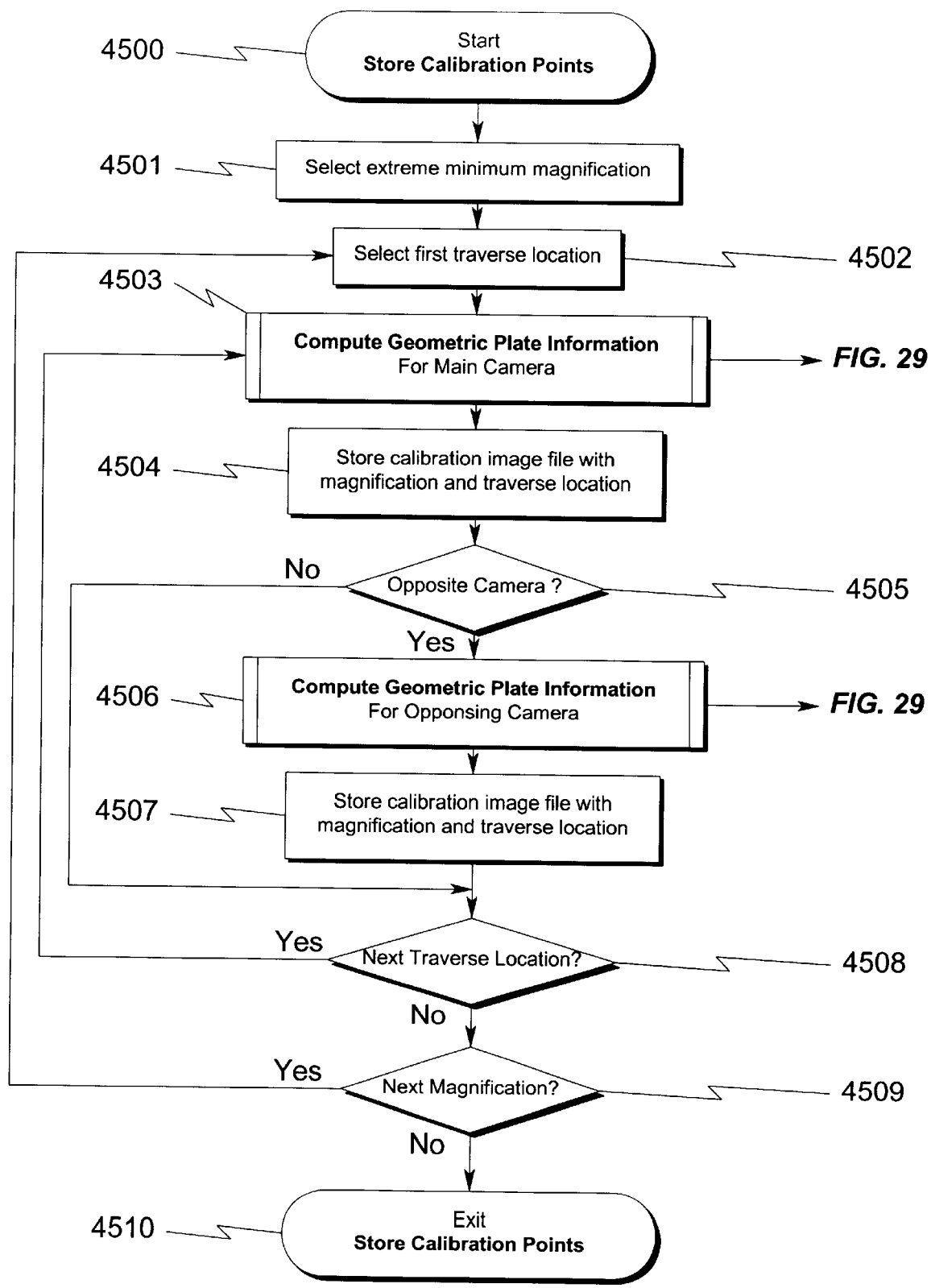

Due to the sometimes numerous locations that are required, a software program was designed to expedite this storage process. FIG. 45 outlines this process (4500). As a starting point, the extreme minimum magnification level is chosen as a starting point (4501). The first calibration traverse location is chosen (4502). The system positions the camera(s) to the desired magnification and traverse location, and the geometric calibration plate (0900) image is acquired and analyzed (4503). FIG. 29 illustrates this process (2900). The calibration image file is stored for this camera (4504). If an opposing camera exists (4505), the system acquires and analyzes a geometric calibration plate (0900) image for this camera (4506). This calibration image file is also stored on the mass storage device (4507). The system then selects the next traverse location and checks for completion of all traverse locations (4508). If there are more (4508), the system goes to the next traverse location and continues the storing process (4503). If all traverse locations have been processed (4508), the system then selects the next magnification level and checks for completion of all desired magnifications (4509). If there are more magnifications requiring storage (4509), the system continues storing with the new magnification and first traverse location (4502). If all magnifications have been processed (4509), the system completes the storing process (4510).

At this point in the calibration procedure, all geometric attributes of the cameras have been stored on the mass storage device for subsequent processing. The usefulness of the geometric calibration plate (0900) has now drawn to a close and illumination calibration will now commence.

Install Illumination Calibration Plate

The geometric calibration storage of the distortion-free system has been completed up this point and it is now time to store illumination attributes. The geometric calibration plate (0900) is removed from the calibration bracket assembly (1100) as shown in FIG. 11 and the illumination calibration plate (1000) is installed in its place. This plate (1000) is illustrated in FIG. 10. As mentioned earlier, this plate (1000) is made of a solid white color to allow for the analysis of illumination profiles of a strobe lighting system. Although strobing systems are used in the exemplary system embodiment, the distortion-free illumination system can be employed just as easily on continuous lighting systems. Effectively the system will be attempting to analyze the unevenness of lighting and compensating for it in the distortion-free system.

Calibrate Camera Digitization System

As was performed for the geometric calibration plate (0900), the camera digitization system must be re-calibrated now for the illumination calibration plate (1000). With the illumination calibration plate (1000) firmly in place, it is now time to optimize the picture for contrast. During this phase of calibration, a special program is run on the system. This program will manipulate the iris and frame-grabber electronics to achieve the highest contrast image possible. This program has already been discussed and is illustrated in FIGS. 20–27.

Enable Strobes for Illumination Calibration

Before the storing of illumination calibration data, the system needs to know which strobe scenarios, if any will need calibration data. In the exemplary system embodiment, there are a maximum of four strobing scenarios. Each scenario is enabled or disabled through a user interface. If a strobe scenario is enabled, it will have illumination data stored for it in the calibration image file.

Store Illumination Points

As was performed for the geometric data, illumination information will also be gathered and stored on the mass storage device for each desired magnification level and traverse location. Depending on the strobe scenarios selected for calibration the calibration image files take on additional information.

Camera

Magnification

Traverse Location

Strobe Illumination Flags

[Red component Image of Geometric Calibration Plate]

[Green component Image of Geometric Calibration Plate]

[Blue component Image of Geometric Calibration Plate]

[Strobe 1 Scenario: RED Illumination Image Data]

[Strobe 1 Scenario: GREEN Illumination Image Data]

[Strobe 1 Scenario: BLUE Illumination Image Data]

[Strobe 2 Scenario: RED Illumination Image Data]

[Strobe 2 Scenario: GREEN Illumination Image Data]

[Strobe 2 Scenario: BLUE Illumination Image Data]

[Strobe 3 Scenario: RED Illumination Image Data]

[Strobe 3 Scenario: GREEN Illumination Image Data]

[Strobe 3 Scenario: BLUE Illumination Image Data]

[Strobe 4 Scenario: RED Illumination Image Data]

[Strobe 4 Scenario: GREEN Illumination Image Data]

[Strobe 4 Scenario: BLUE Illumination Image Data]

If a strobe illumination scenario is not enabled, its image data will be omitted from the calibration file.

Figure 46:
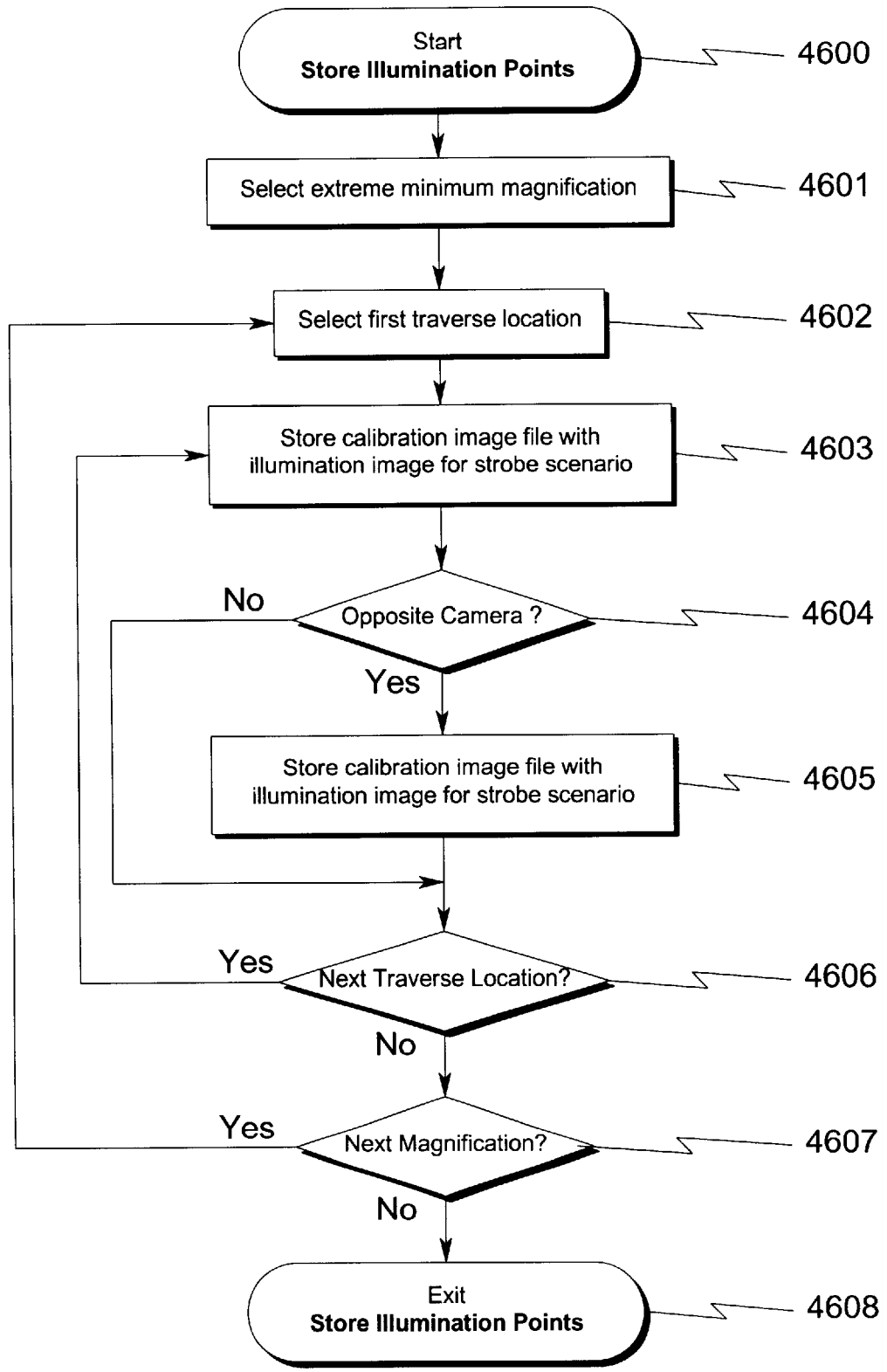

As was done for the storage of the geometric calibration data, the storage of the illumination data is also performed under program control. This is done to expedite the somewhat lengthy process. FIG. 46 outlines this process (4600). As a starting point, the extreme minimum magnification level is chosen as a starting point (4601). The first calibration traverse location is chosen (4602). The system positions the camera(s) to the desired magnification and traverse location, a picture is taken of the illumination calibration plate (1000) and stored for this camera (4603). If an opposing camera exists (4604), the system acquires and stores an illumination calibration plate (1000) image for this camera (4605). The system then selects the next traverse location and checks for completion of all traverse locations (4606). If there are more (4606), the system goes to the next traverse location and continues the storing process (4603). If all traverse locations have been processed (4606), the system then selects the next magnification level and checks for completion of all desired magnifications (4607). If there are more magnifications requiring storage (4607), the system continues storing with the new magnification and first traverse location (4602). If all magnifications have been processed (4607), the system completes the storing process (4608).

At this point in the calibration procedure, all geometric attributes as well as illumination attributes of the cameras have been stored on the mass storage device for subsequent processing. The usefulness of the illumination calibration plate has now drawn to a close and it is time to complete the calibration process.

Remove Calibration Assembly

This concludes the calibration procedure for the distortion-free system. The mass storage device now contains all the necessary files for geometric and illumination anomalies in the exemplary system embodiment. It is at this point that the calibration bracket assembly (1100) is removed from the camera enclosure (0800). The system can now progress to the next phase of distortion-free image processing.

Calculation of Data Point Files from Calibration Image Files

Overview of Files and Processing

At this point the system has numerous calibration image files residing on the mass storage device. In this form, these files are not very useful to the distortion-free system. They must be further processed and reduced to a series of Data Point files on the mass storage device. The Data Point files give the absolute minimum description of distortion anomalies and the means of correcting for them. These files contain geometric and illumination information needed by the distortion-free system in order to produce distortion-free images. During this phase of initializing the distortion-free system, a lengthy background program will run on the system. This program is the essence of producing the Data Point files. After the completion of this program, the distortion-free system will be ready for use.

Figure 47:
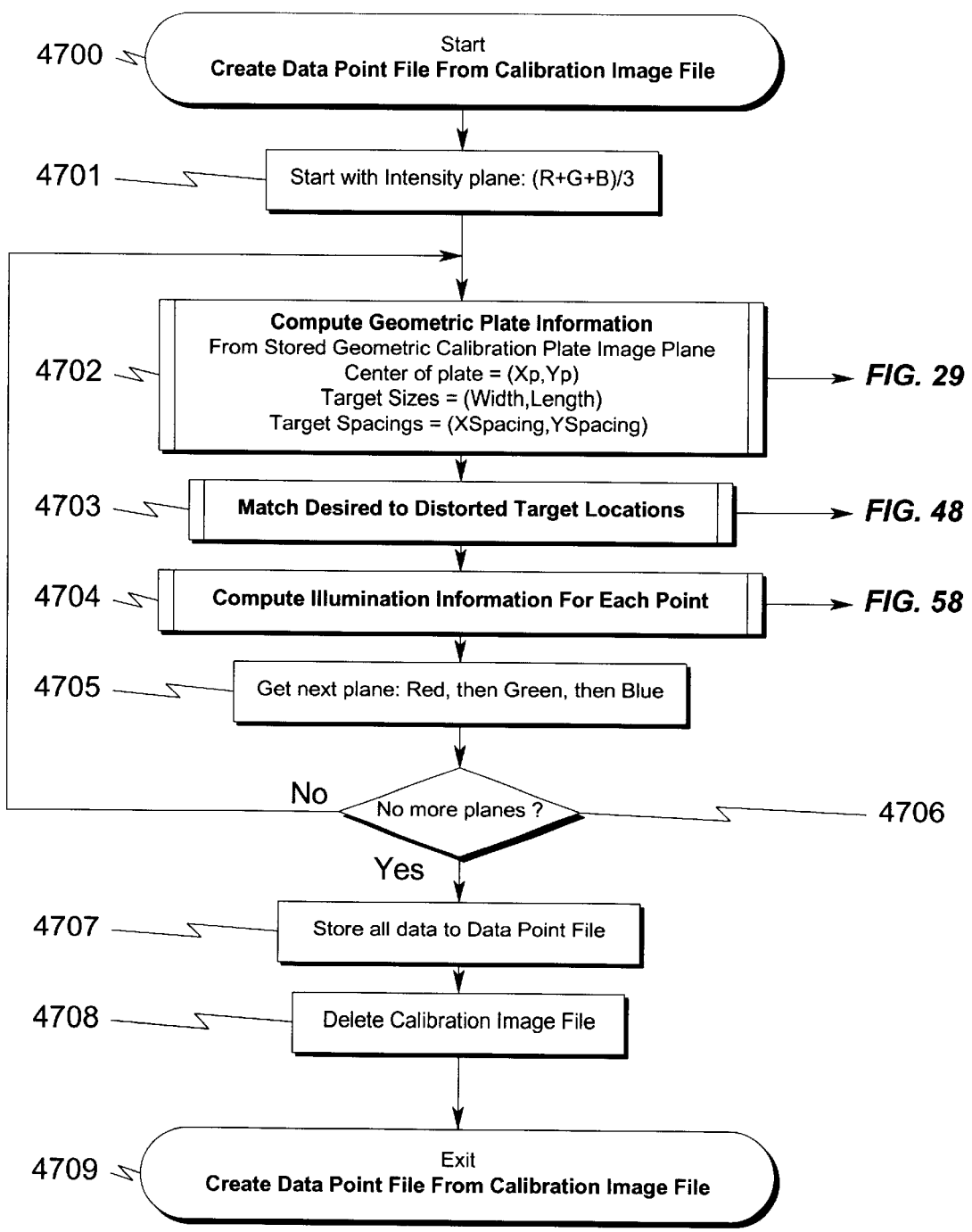

The background program runs an analysis on each of the calibration image files and produces as an output a Data Point File. FIG. 47 gives an illustration of the processing which occurs for each calibration image file (4700). A total of four image planes are processed in an identical manner. These planes are the Intensity plane ((R+G+B)/3), the RED plane, the GREEN plane, and the BLUE plane. Data Points are stored in the Data Point file separately for each plane. As will be seen later, the Intensity points are used for single-plane distortion correction and the RED, GREEN, BLUE planes will be used for three-plane distortion correction. Using three-plane versus single-plane distortion correction is an issue of accuracy versus processing time.

Processing starts using the Intensity plane (4701). First the accurate center and magnification of the geometric calibration plate (0900) image plane must be determined (4702) With this completed, the system enters a point-matching phase (4703). During this phase desired target locations are paired-up with their distorted counterparts (4703). The third and final phase produces illumination data for each of the stored points and strobe scenarios (4704). As discussed, this process is repeated for each plane, and the Data Points are stored in the file after completion (4705, 4706, 4707). Once the Data Point file is created, the system can free up mass storage space by deleting the calibration image file (4708). Processing is now complete (4709) and the system begins the process all over again with the next calibration image file. This continues until all files have been processed. The following sections describe the files processed and the processing in detail.

Calibration File

This file is the raw imaging file containing images of the geometric calibration plate (0900) and multiple images of the illumination calibration plate (1000). As was described earlier, this file takes on the following format:

Camera

Magnification

Traverse Location

Strobe Illumination Flags

[Red component Image of Geometric Calibration Plate]

[Green component Image of Geometric Calibration Plate]
[Blue component Image of Geometric Calibration Plate]
[Strobe 1 Scenario: RED Illumination Image Data]
[Strobe 1 Scenario: GREEN Illumination Image Data]
[Strobe 1 Scenario: BLUE Illumination Image Data]
[Strobe 2 Scenario: RED Illumination Image Data]
[Strobe 2 Scenario: GREEN Illumination Image Data]
[Strobe 2 Scenario: BLUE Illumination Image Data]
[Strobe 3 Scenario: RED Illumination Image Data]
[Strobe 3 Scenario: GREEN Illumination Image Data]
[Strobe 3 Scenario: BLUE Illumination Image Data]
[Strobe 4 Scenario: RED Illumination Image Data]
[Strobe 4 Scenario: GREEN Illumination Image Data]
[Strobe 4 Scenario: BLUE Illumination Image Data]

As was indicated earlier, if a strobe illumination scenario is not enabled, its image data will be omitted from the calibration file.

The mass storage device contains a series of these files, one for each magnification level and traverse location desired. These files are very large and will be further processed to produce Data Point Files. Upon completion of the conversion, these files are discarded and the distortion-free system is ready for use.

Data Point File

This file is the essence of the distortion-free system. It contains camera, magnification, traverse, and strobe scenarios enabled similar to the calibration image files. They also contain the accurate center of the geometric calibration plate (0900) as seen when the picture was taken. The image files are removed and reduced to a series of points. These points contain the desired (distortion-free) geometric locations of the targets paired up with their actual locations. Each point also includes illumination data for each strobe scenario at these locations. Points for the intensity, RED, Green, and BLUE components are compiled separately. The file has the following format:

Camera

Magnification

Traverse Location

Strobe Illumination Flags

Geometric Calibration Plate Center Location (X,Y)

Number of Points

[Intensity component Geometric and Illumination Points]
[Red component Geometric and Illumination Points]
[Green component Geometric and Illumination Points]
[Blue component Geometric and Illumination Points]

The great feature of this file is that it can quickly be scaled or translated into any image space. That is, it can easily be magnified, de-magnified, or translated for conversion of any source image to a desired distortion-free output image.

Finding Center Target of Geometric Calibration Image

The first step in producing a Data Point file from a calibration image file plane is to locate the center target within the stored geometric calibration plate (0900) image plane (4702). While determining this accurate center point, the system also computes the magnification of the image and other important parameters. FIG. 29 describes this first step in the production of the Data Point File. The algorithm and flowchart was described in detail in the "Calibrate Procedure" section sub-heading "Adjust Calibration Plate to Camera(s)".

With the center of plate (0900) located relative to the image plane in question, the system can now beginning producing Data Points (4703, 4704).

Matching Desired to Distorted Target Locations

Matching target locations is one of the most difficult and important procedures that must be carried out before the distortion-free system can function. A target is the small 1-millimeter white square on the geometric calibration plate (0900). If the imaging system were perfect, the centers of these targets would line up perfectly on an evenly spaced matrix across the image. Due to all geometric anomalies, their actual centers are misplaced and it is the job of the distortion-free system to correct for this problem. The problem here is to match the centers of all the targets with the desired grid locations. This can be a difficult task because the amount of distortion is unknown.

Figure 16:
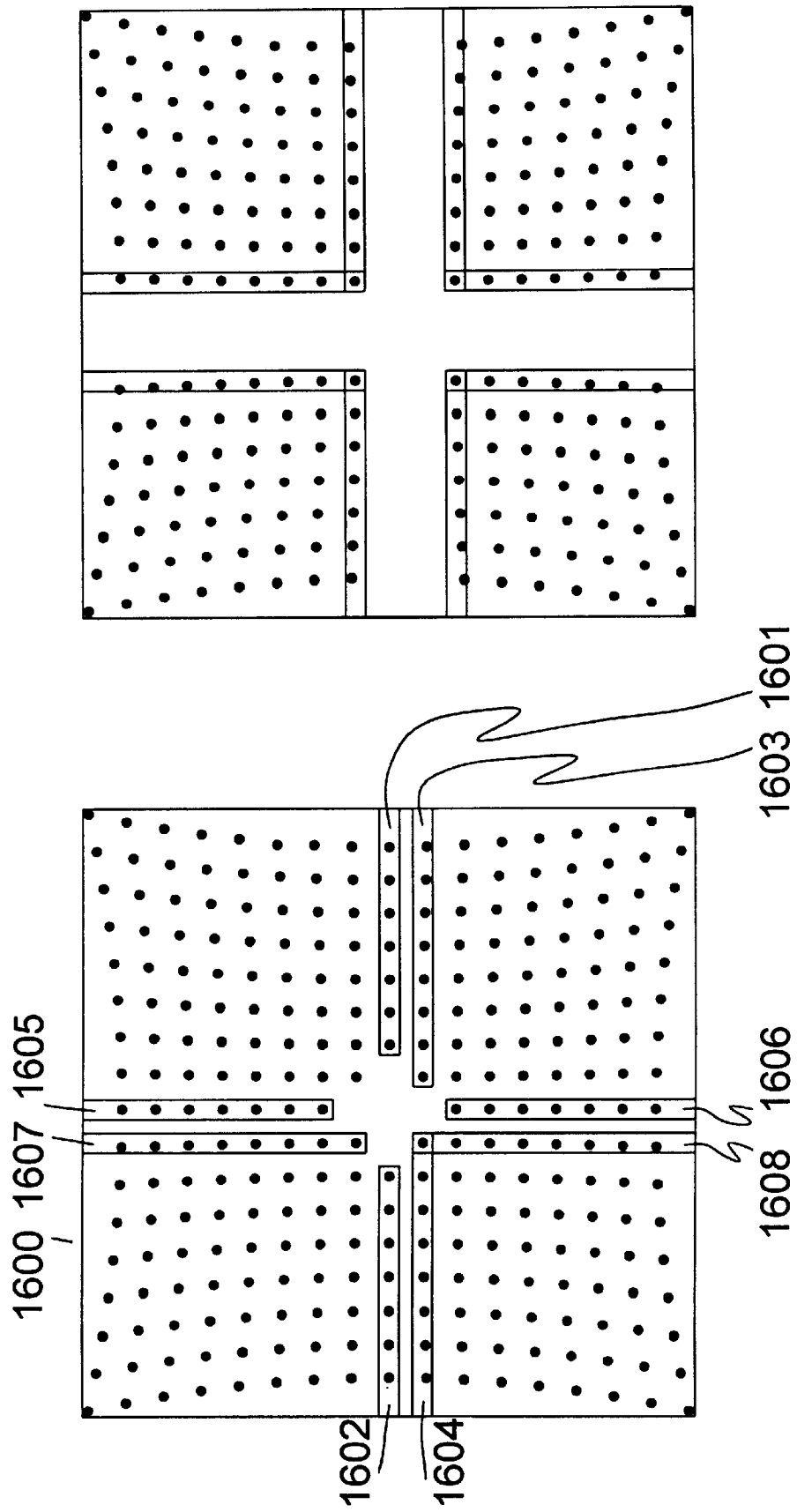
FIG. 16 illustrates pixel processing routes utilized by the disclosed exemplary calibration system and method.
Figure 48:
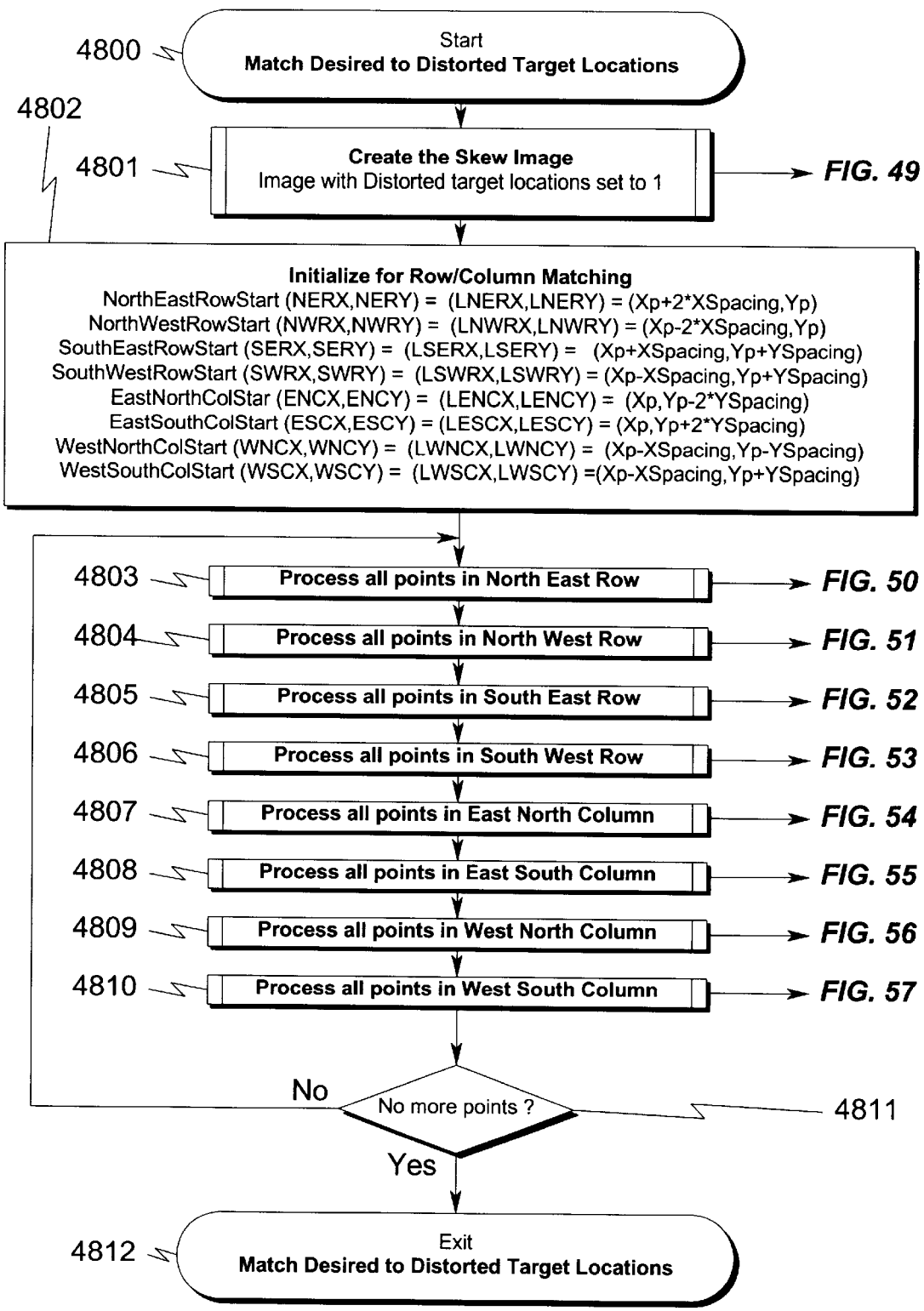
Figure 49:
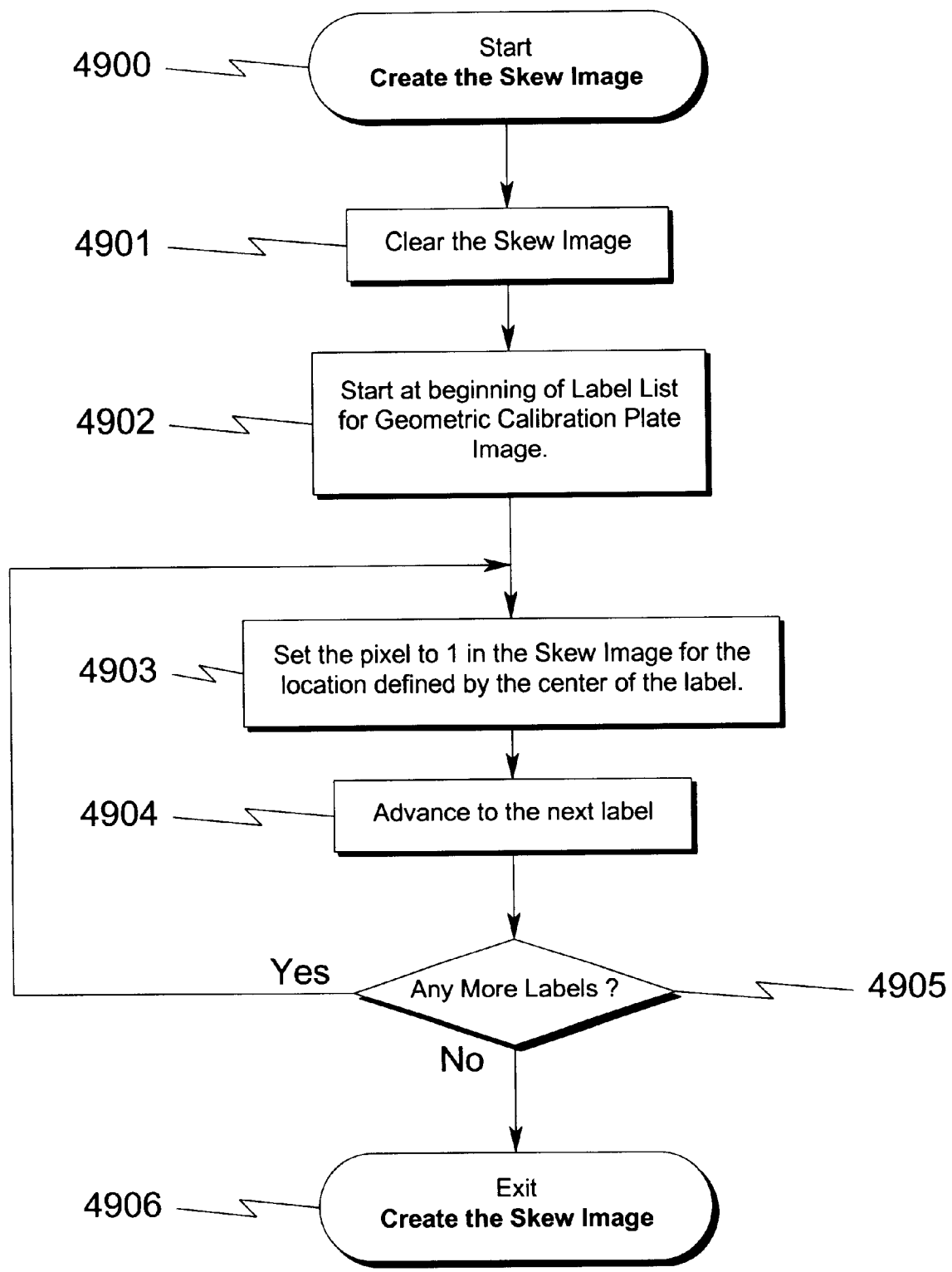

FIG. 48 describes the process that performs this matching of locations (4800). In order for this matching algorithm to work, an assumption is made about the imaging system distortion. The assumption is that distortion is at a minimum at the center of the image with it getting arbitrarily worse as matching approaches the image boundary. This is a solid assumption, as all lens exhibit this property. The matching process begins by producing a special image plane called the "Skew Image" (4801). This image has zeroes everywhere except for 1's where the center of targets exists. FIG. 16 illustrates a sample "Skew Image" and some important designations for the matching process. FIG. 49 illustrates the procedure for producing the "Skew Image" (4900). First the image is cleared to all zeroes (4901). The system then starts at the beginning of the label list of white targets produced from the image plane in question (4902). The center of each labeled target is computed, and the corresponding (x,y) location in the "Skew Image" is set to one (4903). This continues until all labels have been processed (4904, 4905). The system then exits (4906).

With the "Skew Image" produced (4801), the system initializes starting coordinates for eight examining rectangular regions (4802). FIG. 16 gives an illustration of the starting locations of each of the eight examination rectangles. These rectangles are scanned for a row/column of points at a time in a round robin fashion. The idea is that points are matched at the center of the image out to the periphery, one row/column at a time. Each examination rectangle will now be explained in detail.

Figure 50:
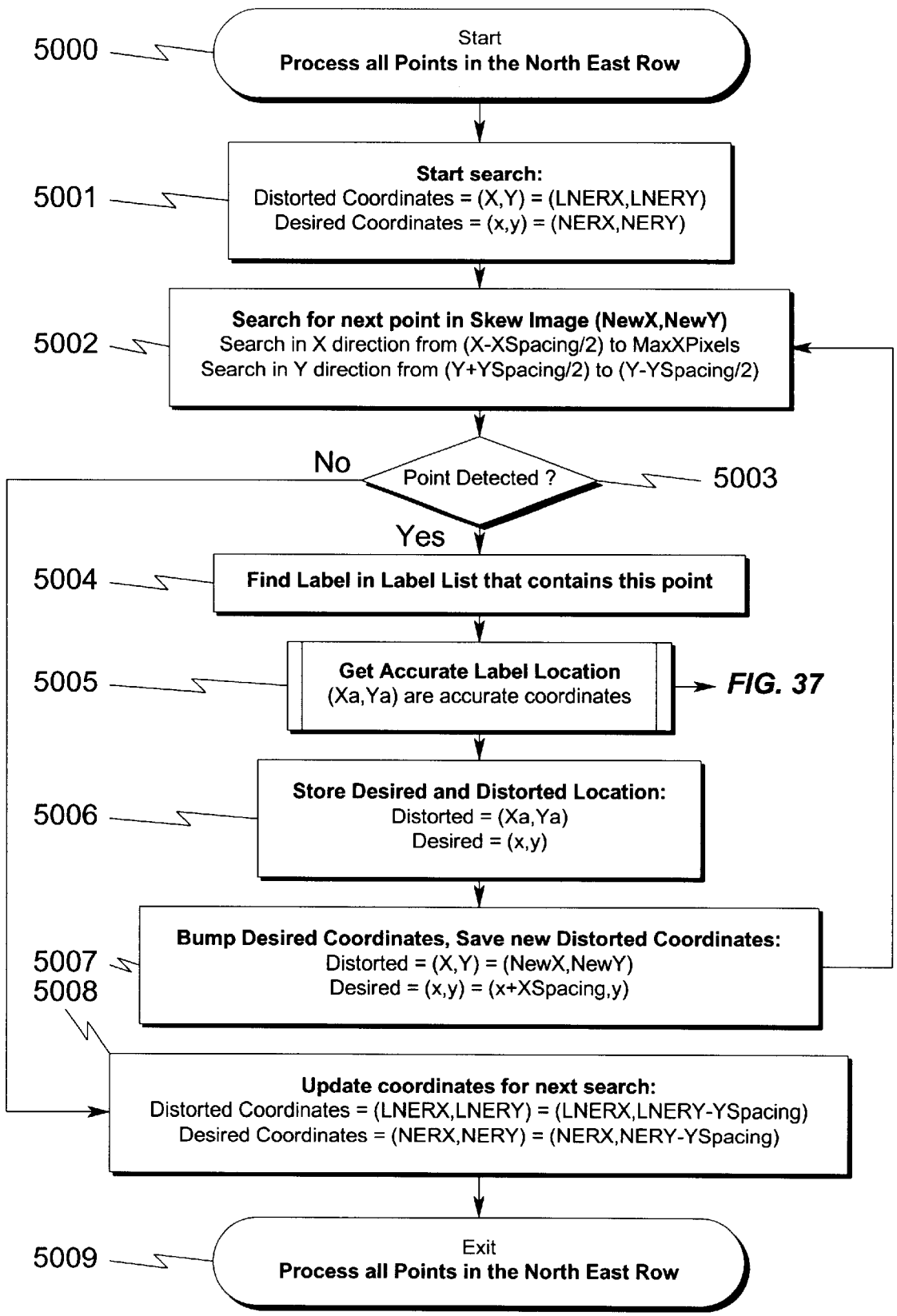

Referencing FIG. 16, the first examination rectangle (1601) is the "North of Center in Easterly Direction" (4803). FIG. 50 shows how points are matched in an easterly horizontal progression rectangle that moves in the North direction one line of targets at a time after processing a row (5000). The search starts at the last distorted and desired coordinates stored (5001). The next target location point is searched for in the skew image (5002). The direction of search is very specific. For this rectangle, the search goes from South to North with an Easterly progression. If a point was detected (5003), the label is found in the label list that contains this point (5004). The accurate location of this label is determined (5005). FIG. 37 illustrates this process. The desired and accurate distorted coordinates are stored in the Data Points (5006). The desired coordinates are then bumped in the easterly direction and the distorted coordinates are updated to the newly detected point (5007). If a point was not detected (5003), it means a row of points have been completed. The system will then advance the row in the northerly direction for next time (5008). The system exits back to FIG. 48 (5009).

Figure 51:
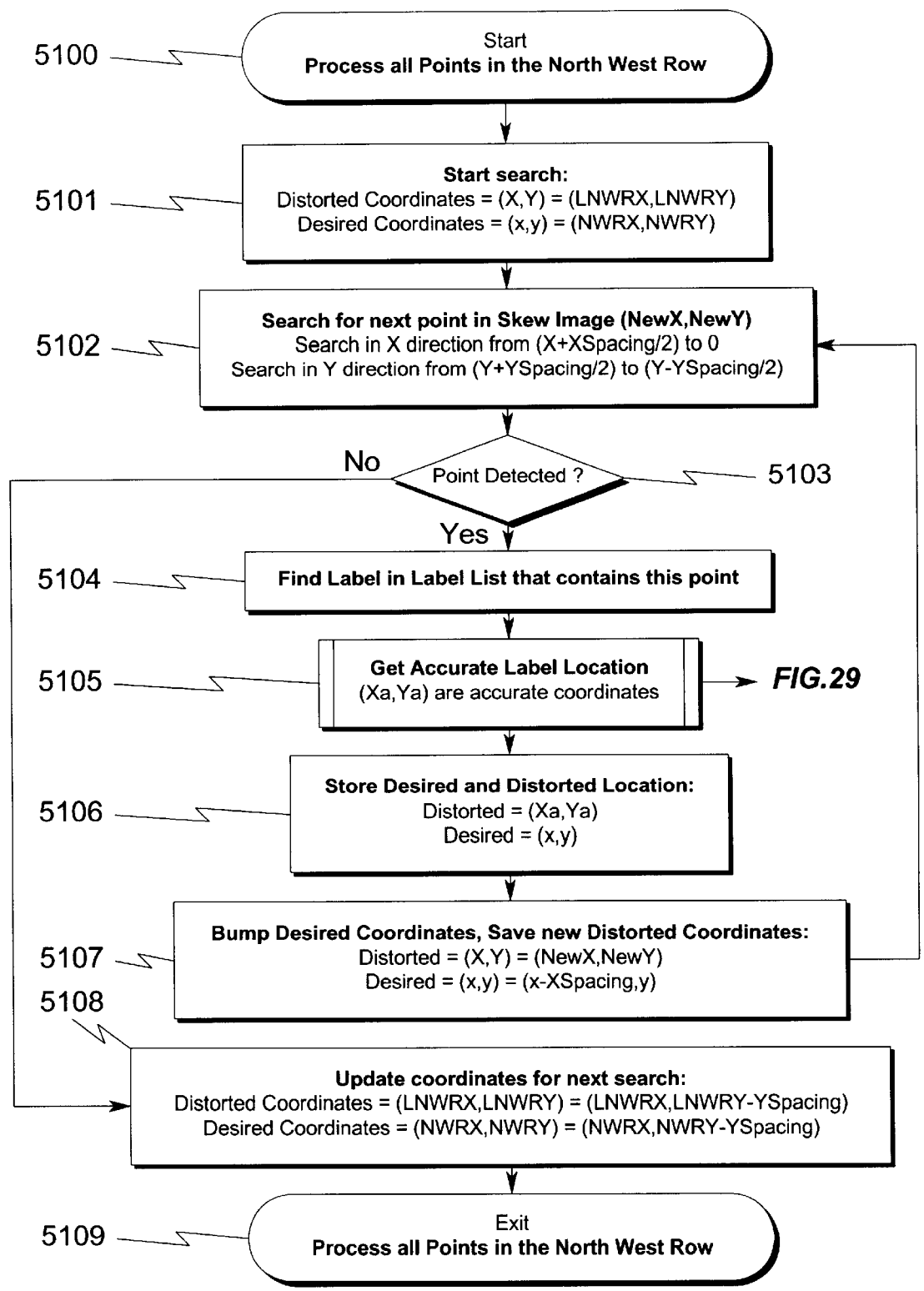

Referencing FIG. 16, the next examination rectangle (1602) is the "North of Center in Westerly Direction" (4804). FIG. 51 shows how points are matched in a westerly horizontal progression rectangle that moves in the North direction one line of targets at a time after processing a row (5100). The search starts at the last distorted and desired coordinates stored (5101). The next target location point is searched for in the skew image (5102). The direction of search is very specific. For this rectangle, the search goes from South to North with a Westerly progression. If a point was detected (5103), the label is found in the label list that contains this point (5104). The accurate location of this label is determined (5105). FIG. 37 illustrates this process. The desired and accurate distorted coordinates are stored in the Data Points (5106). The desired coordinates are then bumped in the westerly direction and the distorted coordinates are updated to the newly detected point (5107). If a point was not detected (5103), it means a row of points have been completed. The system will then advance the row in the northerly direction for next time (5108). The system exits back to FIG. 48 (5109).

Figure 52:
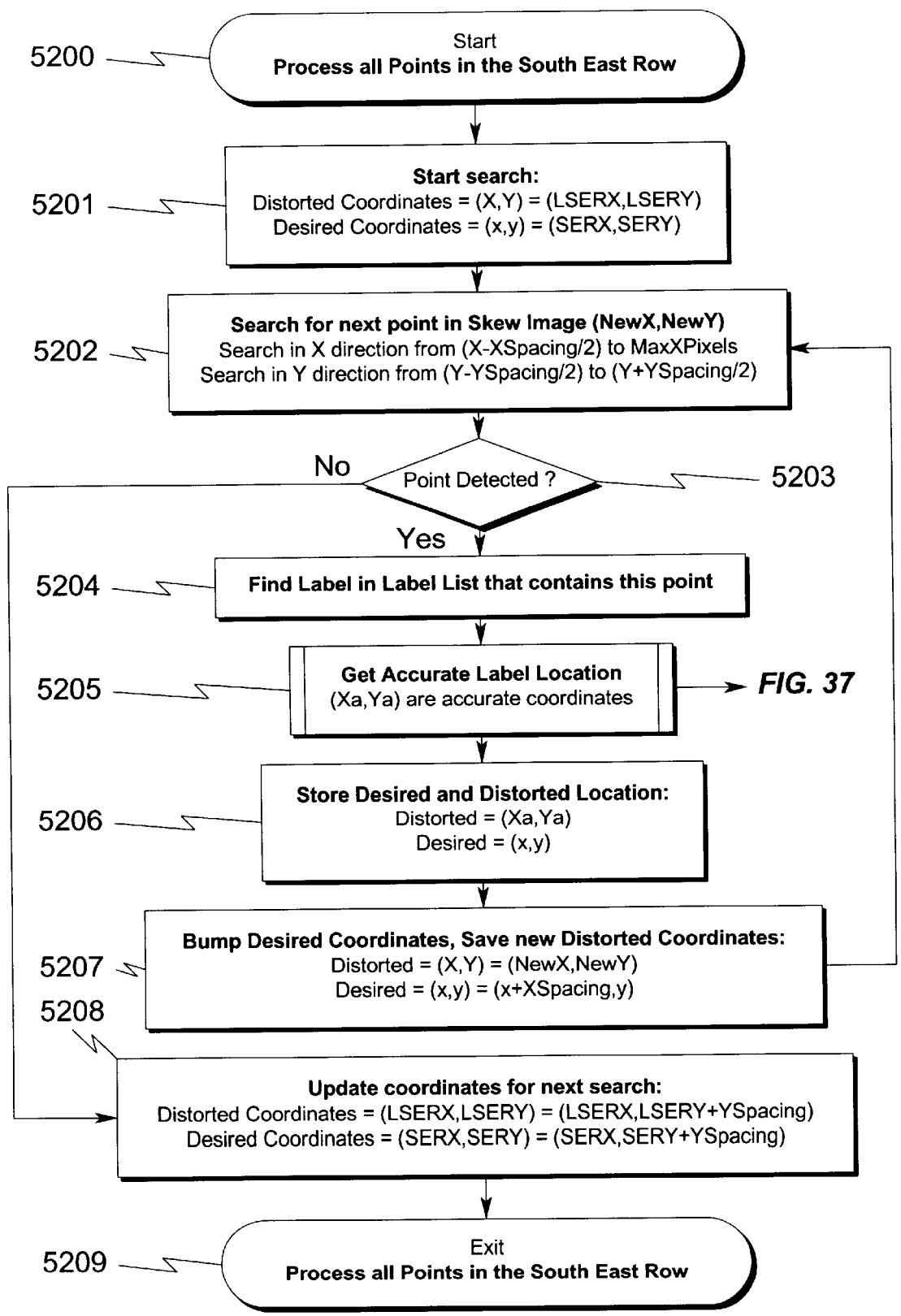

Referencing FIG. 16, the next examination rectangle (1603) is the "South of Center in Easterly Direction" (4805). FIG. 52 shows how points are matched in a easterly horizontal progression rectangle that moves in the South direction one line of targets at a time after processing a row (5200). The search starts at the last distorted and desired coordinates stored (5201). The next target location point is searched for in the skew image (5202). The direction of search is very specific. For this rectangle, the search goes from North to South with an Easterly progression. If a point was detected (5203), the label is found in the label list that contains this point (5204). The accurate location of this label is determined (5205). FIG. 37 illustrates this process. The desired and accurate distorted coordinates are stored in the Data Points (5206). The desired coordinates are then bumped in the easterly direction and the distorted coordinates are updated to the newly detected point (5207). If a point was not detected (5203), it means a row of points have been completed. The system will then advance the row in the southerly direction for next time (5208). The system exits back to FIG. 48 (5209).

Figure 53:
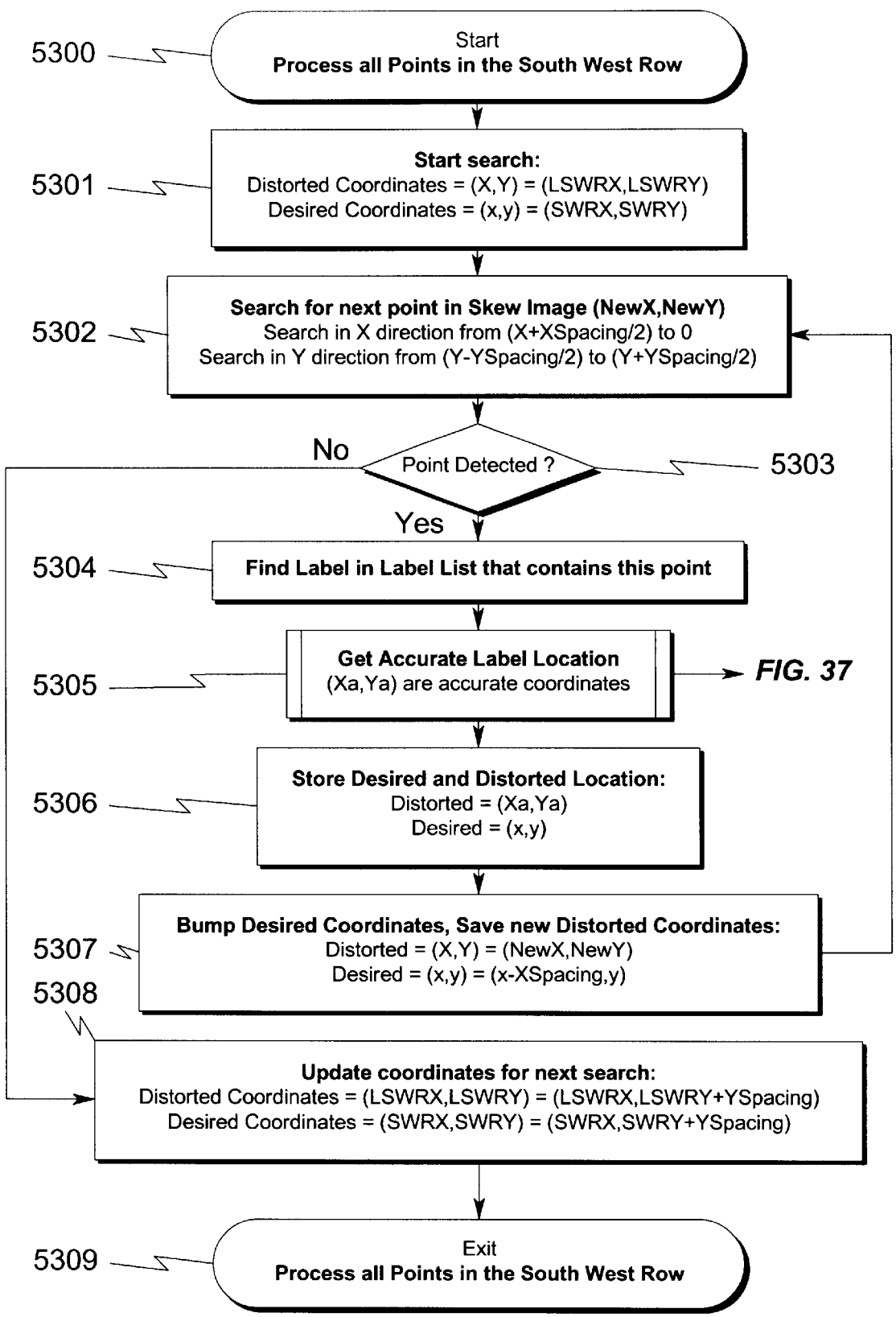

Referencing FIG. 16, the next examination rectangle (1604) is the "South of Center in Westerly Direction" (4806). FIG. 53 shows how points are matched in a westerly horizontal progression rectangle that moves in the South direction one line of targets at a time after processing a row (5300). The search starts at the last distorted and desired coordinates stored (5301). The next target location point is searched for in the skew image (5302). The direction of search is very specific. For this rectangle, the search goes from North to South with a Westerly progression. If a point was detected (5303), the label is found in the label list that contains this point (5304). The accurate location of this label is determined (5305). FIG. 37 illustrates this process. The desired and accurate distorted coordinates are stored in the Data Points (5306). The desired coordinates are then bumped in the westerly direction and the distorted coordinates are updated to the newly detected point (5307). If a point was not detected (5303), it means a row of points have been completed. The system will then advance the row in the southerly direction for next time (5308). The system exits back to FIG. 48 (5309).

Figure 54:
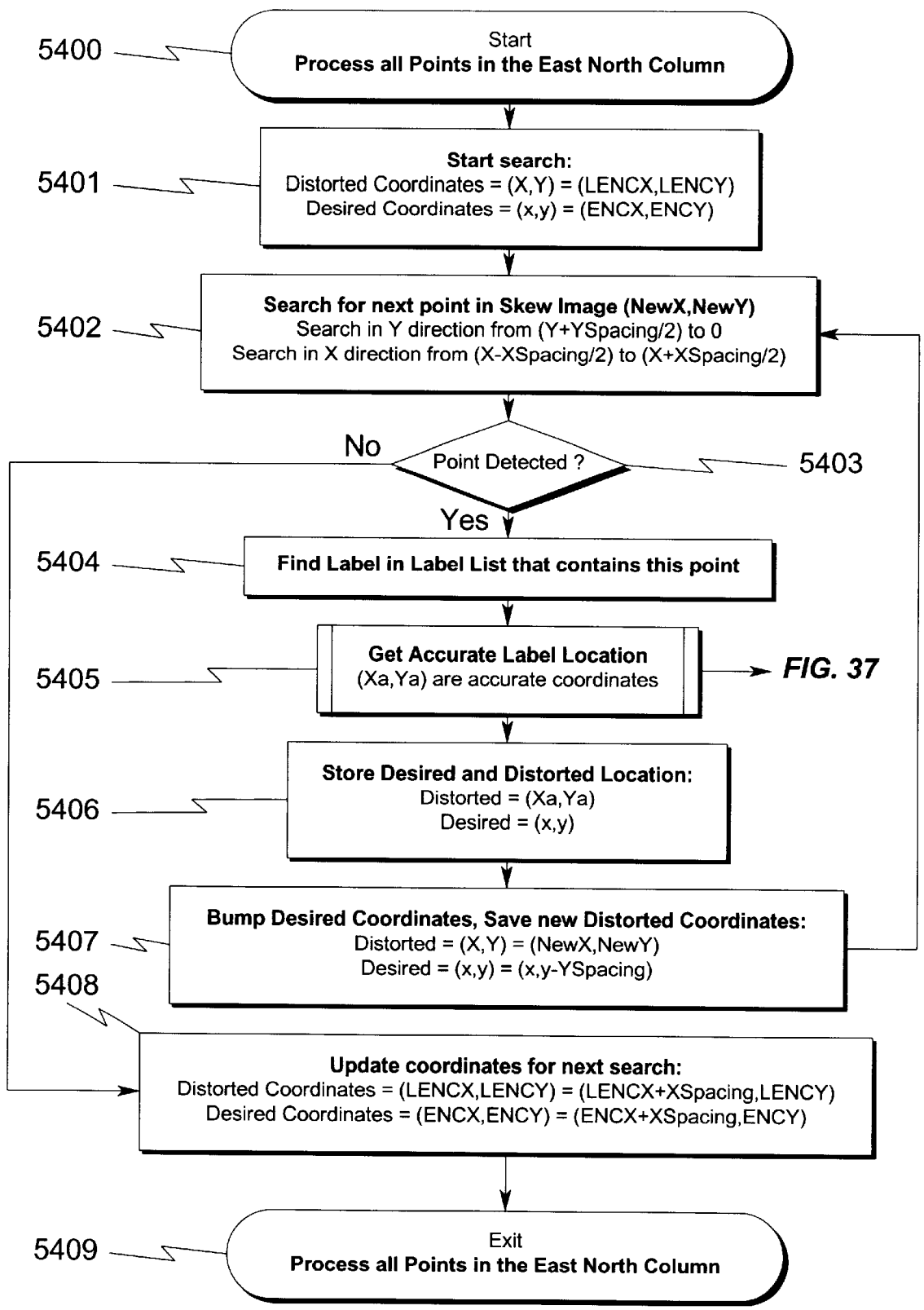

Referencing FIG. 16, the next examination rectangle (1605) is the "East of Center in Northerly Direction" (4807). FIG. 54 shows how points are matched in a northerly vertical progression rectangle that moves in the East direction one line of targets at a time after processing a column (5400). The search starts at the last distorted and desired coordinates stored (5401). The next target location point is searched for in the skew image (5402). The direction of search is very specific. For this rectangle, the search goes from West to East with a Northerly progression. If a point was detected (5403), the label is found in the label list that contains this point (5404). The accurate location of this label is determined (5405). FIG. 37 illustrates this process. The desired and accurate distorted coordinates are stored in the Data Points (5406). The desired coordinates are then bumped in the northerly direction and the distorted coordinates are updated to the newly detected point (5407). If a point was not detected (5403), it means a column of points have been completed. The system will then advance the column in the easterly direction for next time (5408). The system exits back to FIG. 48 (5409).

Figure 55:
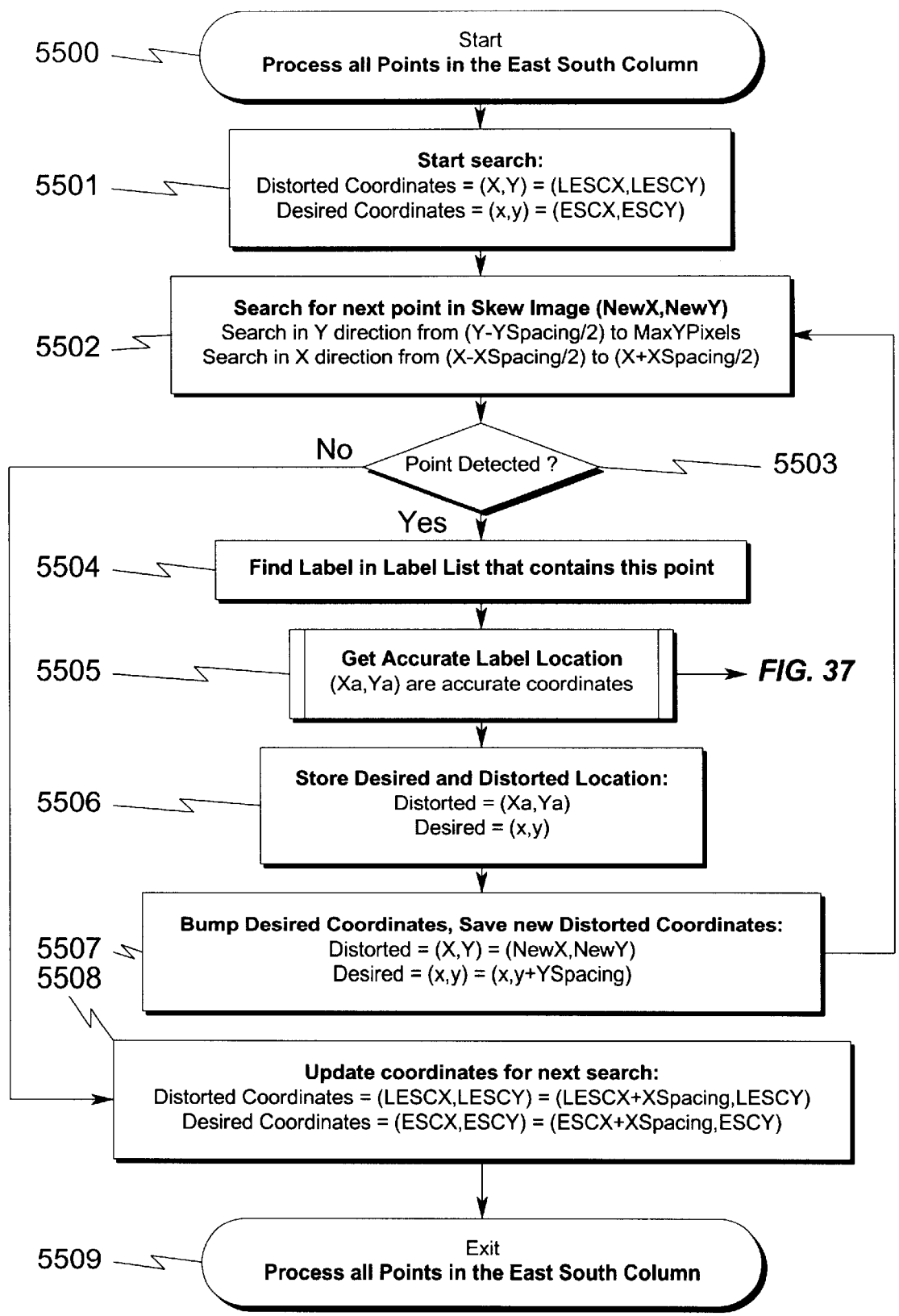

Referencing FIG. 16, the next examination rectangle (1606) is the "East of Center in Southerly Direction" (4808). FIG. 55 shows how points are matched in a southerly vertical progression rectangle that moves in the East direction one line of targets at a time after processing a column (5500). The search starts at the last distorted and desired coordinates stored (5501). The next target location point is searched for in the skew image (5502). The direction of search is very specific. For this rectangle, the search goes from West to East with a Southerly progression. If a point was detected (5503), the label is found in the label list that contains this point (5504). The accurate location of this label is determined (5505). FIG. 37 illustrates this process. The desired and accurate distorted coordinates are stored in the Data Points (5506). The desired coordinates are then bumped in the southerly direction and the distorted coordinates are updated to the newly detected point (5507). If a point was not detected (5503), it means a column of points have been completed. The system will then advance the column in the easterly direction for next time (5508). The system exits back to FIG. 48 (5509).

Figure 56:
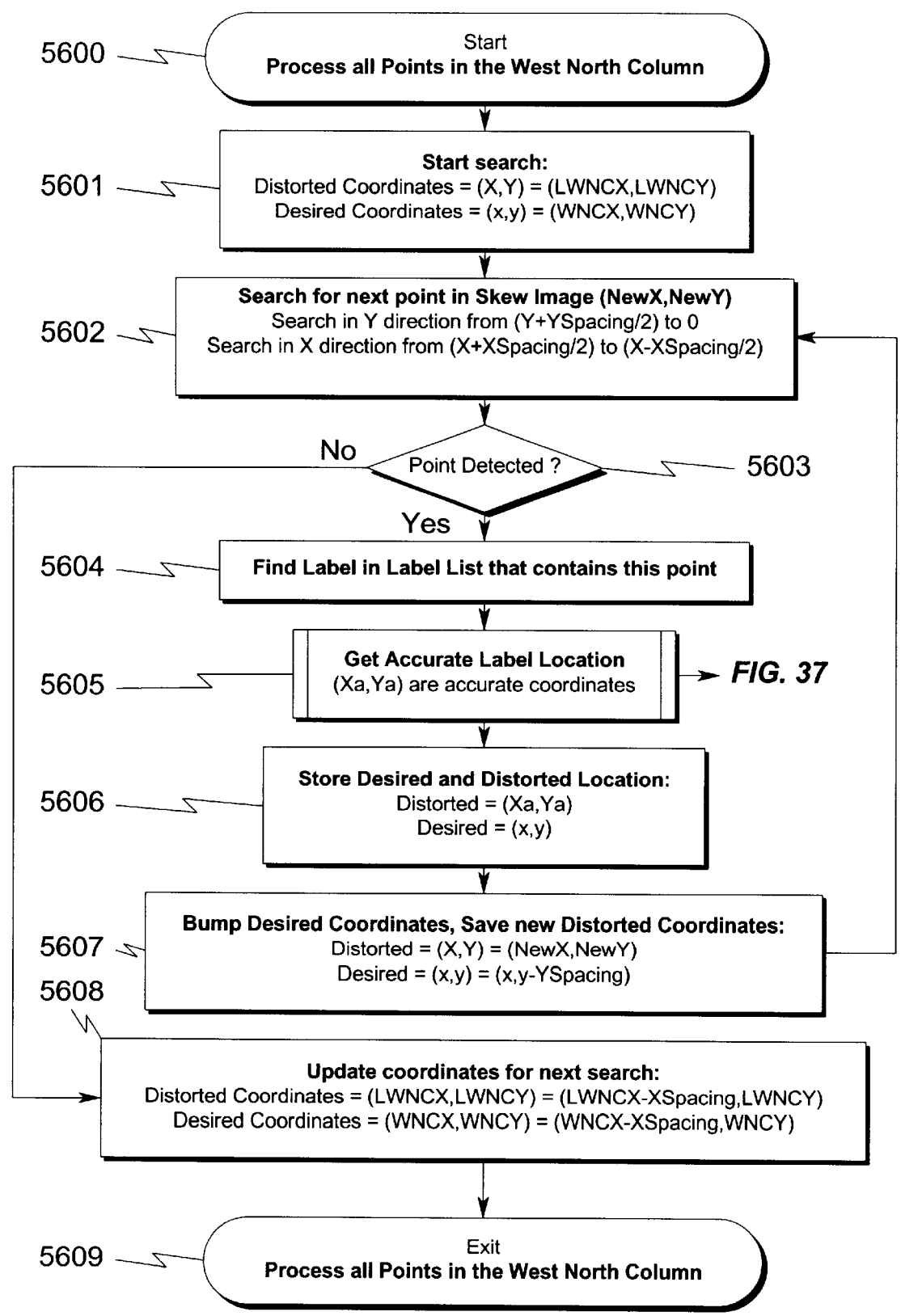

Referencing FIG. 16, the next examination rectangle (1607) is the "West of Center in Northerly Direction" (4809). FIG. 56 shows how points are matched in a northerly vertical progression rectangle that moves in the West direction one line of targets at a time after processing a column (5600). The search starts at the last distorted and desired coordinates stored (5601). The next target location point is searched for in the skew image (5602). The direction of search is very specific. For this rectangle, the search goes from East to West with a Northerly progression. If a point was detected (5603), the label is found in the label list that contains this point (5604). The accurate location of this label is determined (5605). FIG. 37 illustrates this process. The desired and accurate distorted coordinates are stored in the Data Points (5606). The desired coordinates are then bumped in the northerly direction and the distorted coordinates are updated to the newly detected point (5607). If a point was not detected (5603), it means a column of points have been completed. The system will then advance the column in the Westerly direction for next time (5608). The system exits back to FIG. 48 (5609).

Figure 57:
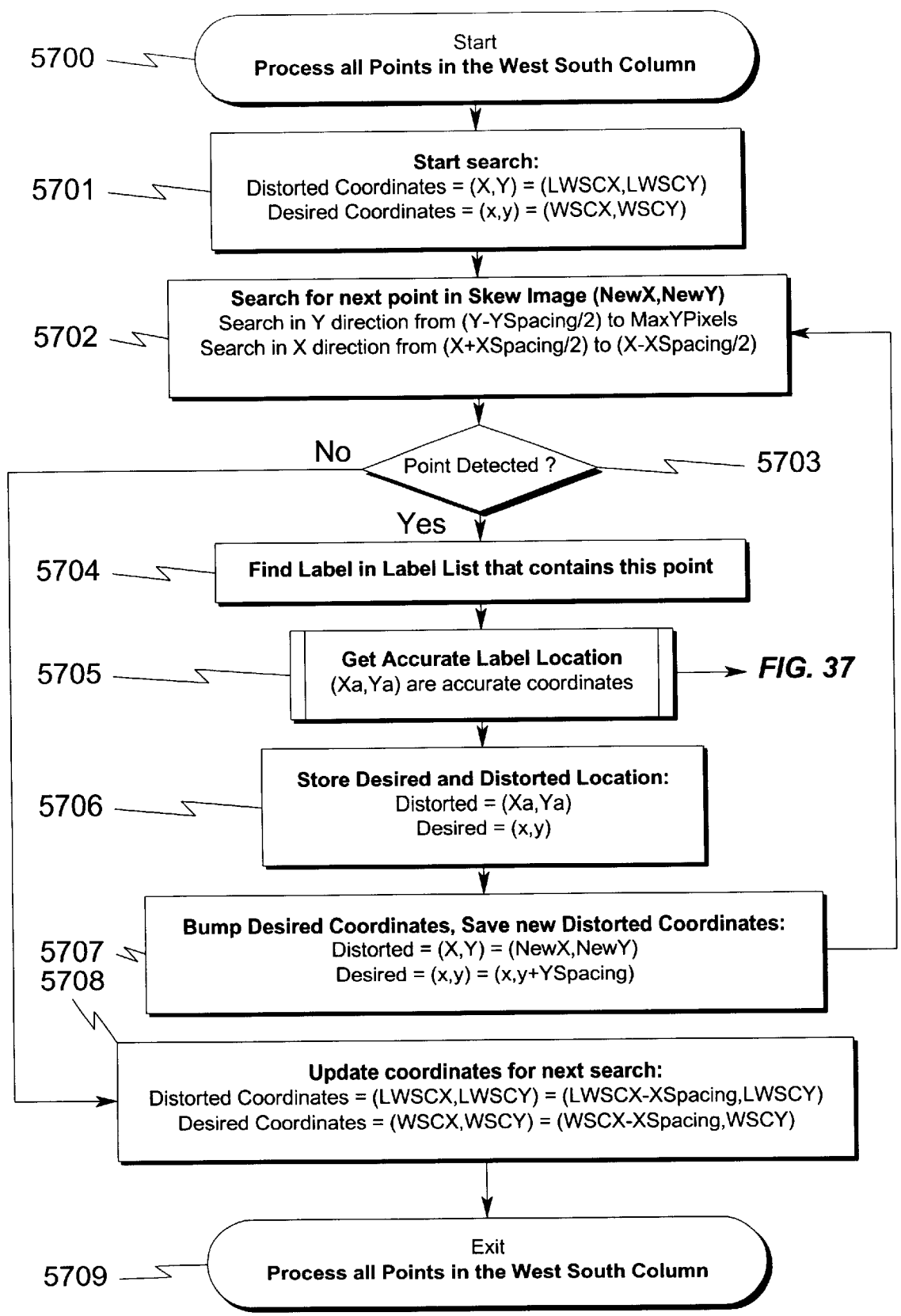

Referencing FIG. 16, the last examination rectangle (1608) is the "West of Center in Southerly Direction" (4810). FIG. 57 shows how points are matched in a southerly vertical progression rectangle that moves in the West direction one line of targets at a time after processing a column (5700). The search starts at the last distorted and desired coordinates stored (5701). The next target location point is searched for in the skew image (5702). The direction of search is very specific. For this rectangle, the search goes from East to West with a Southerly progression. If a point was detected (5703), the label is found in the label list that contains this point (5704). The accurate location of this label is determined (5705). FIG. 37 illustrates this process. The desired and accurate distorted coordinates are stored in the Data Points (5706). The desired coordinates are then bumped in the southerly direction and the distorted coordinates are updated to the newly detected point (5707). If a point was not detected (5703), it means a column of points have been completed. The system will then advance the column in the Westerly direction for next time (5708). The system exits back to FIG. 48 (5709).

After making a round-robin processing check of all rectangular regions, FIG. 48 continues by checking to see if all target points have been processed (4811). If so the program completes (4812). If there are more points (4811), the system continues the round robin matching of points (4803).

Compute Illumination Information for Each Point

At this point a geometric calibration plate (0900) image plane has been scanned for all target locations (4800). These target centers have been paired-off with their corresponding desired locations in the form of Data Points (4703). It is now time to determine an average intensity for each strobe scenario at each of these Data Points (4704). These readings will also be part of each Data Point and will be responsible for illumination correction of the distortion-free system.

Figure 58:
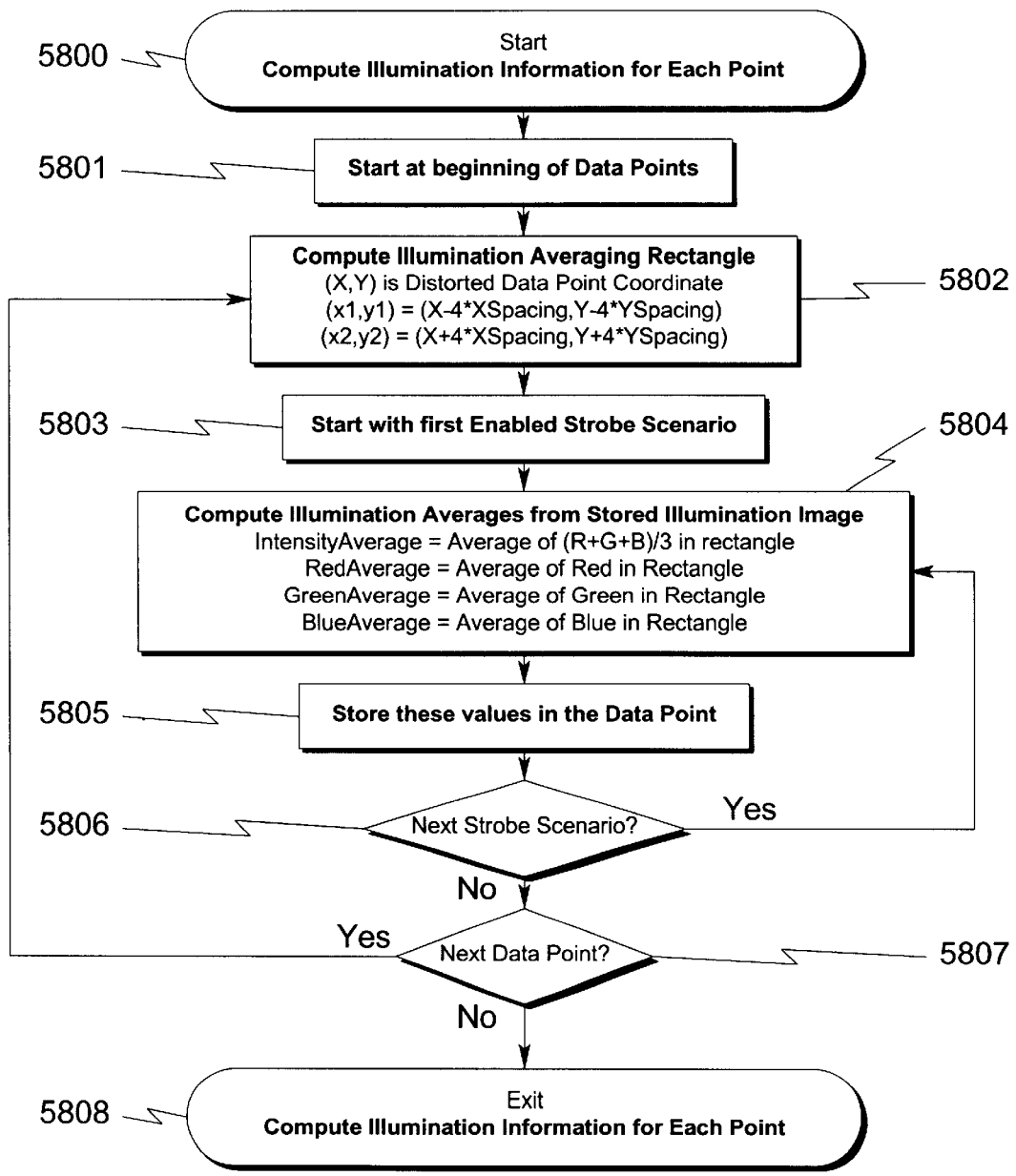

FIG. 58 illustrates how the illumination points are calculated (5800). Processing begins using the first Data Point on the list (5801). From the distorted point location (X,Y) an analysis rectangle is computed (5802). This rectangle is eight times larger than one calibration target. The size is chosen to give a more gradual reading across the image. The system begins the averaging process on the first of the enabled strobe scenario images. An average reading of the pixels in this rectangle for the image plane desired is calculated (5804). This data is stored in the Data Point (5805). The system will process each strobe scenario (5806) and every Data Point (5807). With all this complete, the program exits back to FIG. 47 (5808).

Creating the Distortion-Correction Image

Overview of the Distortion-Correction Image

In order to run the distortion-free system on an input image, a construct known as a distortion-correction image must first be created. This image is essentially the same size as the output image with three values per input pixel (x,y). The first two values (X,Y) are the source image coordinates of the output pixel (x,y), and the third value is the illumination intensity (I) at (x,y). As will be seen later, the distortion-free system will operate on the source image using information in the distortion-correction image to produce a desired distortion-free output image.

There are basically two types of distortion-correction images: single-plane and three-plane. The single-plane version consists of one set of coordinates per output pixel. That is, for every (x,y) there is a (X,Y,I) coordinate in the distortion-correction image. As will be described later, the single-plane system will correct each RED, GREEN, and BLUE source image planes by the same amount as dictated by the single-plane distortion-correction image. The three-plane version of the distortion-correction image, comprises three times the amount of data and consists of three sets of coordinates per output pixel. That is, for every (x,y) there is (RX,RY,RI), (GX,GY,GI), and (BX,BY,BI). In the three-plane distortion-free system, each RED, GREEN, and BLUE source image planes are corrected separately by the separate coordinates. The obvious trade-offs for single versus three-plane correction are speed of processing and accuracy. The single-plane version is faster and the three-plane version has the ability to correct for multi-image sensor applications. An example of a multi-sensor application is an exemplary system embodiment. This system uses three-CCD cameras which have their sensors mounted on a prism. The accuracy of the mounting of these sensors effects the inter-plane (R,G,B) registration. A three-plane correction system can correct for this, a single-plane version cannot.

In order to create either a single or three-plane distortion-correction image, it is necessary to obtain the following information:

Camera Centerline Coordinates

Source Image Magnification (if applicable)

Source Image Traverse Location (if applicable)

Destination Image Magnification

Data Point File

In a system employing fixed-lenses and stationary cameras, the distortion-correction image can be created once for the life of the system. This is due to the fact that magnification and traverse location never changes. In the exemplary system embodiment the cameras move around on a traversing mechanism (0700) and possess a motor-driven zoom lens. Every time the camera or lens moves, the distortion-correction image must be re-created. This is due to the fact that changes in the amount of image distortion occur as things are moved. The following discussion describes how a single-plane distortion-correction image is created. In order to create a three-plane version, the reader must imagine performing the operation a total of three times, each on a different plane (R,G,B). Lastly it is important to note that the application of the distortion-free system on a three-plane image is by no means limited. If commercial cameras were readily available with more planes, the methods discussed could easily be expanded to four or greater planes.

Figure 59:
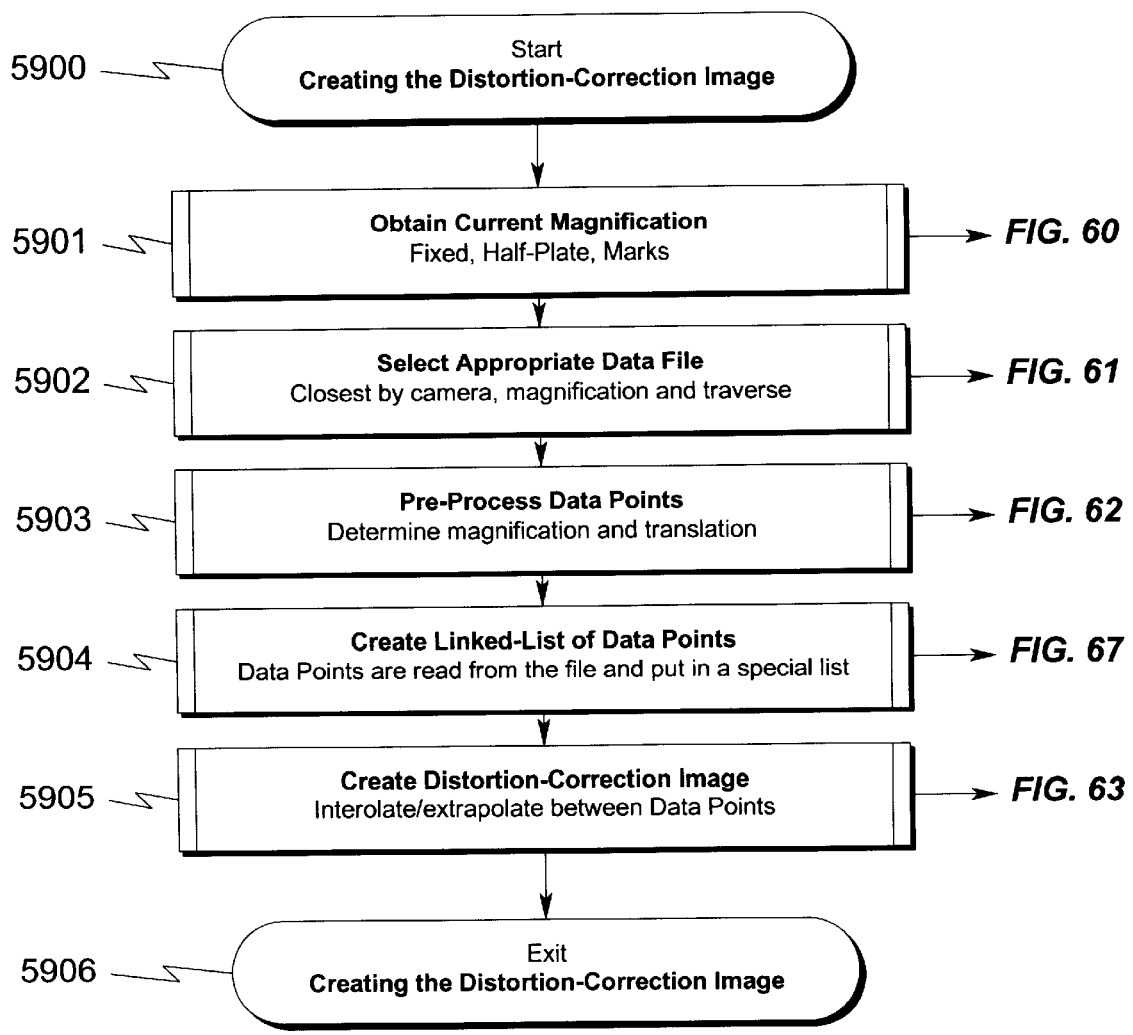
Figure 60:
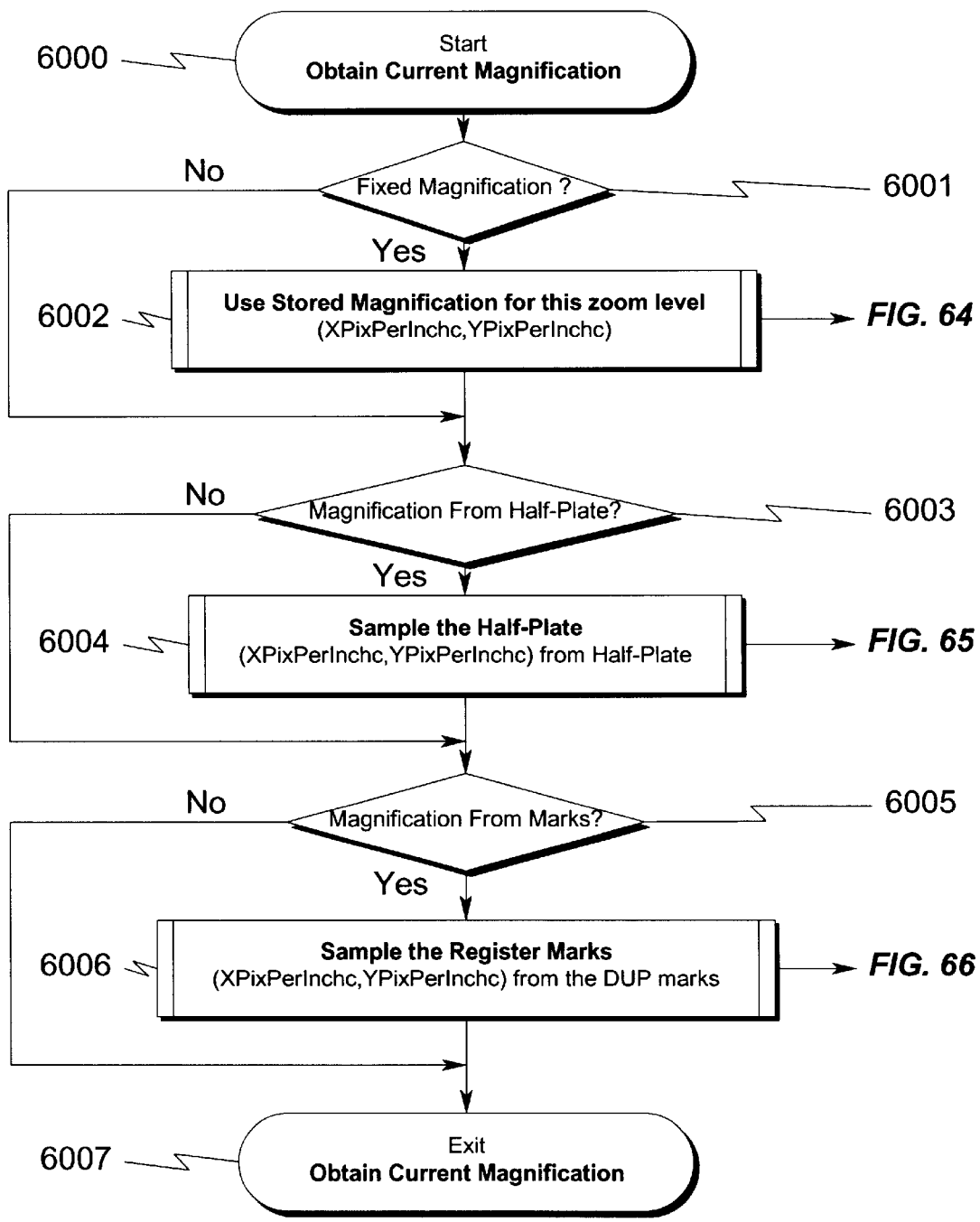
Figure 61:
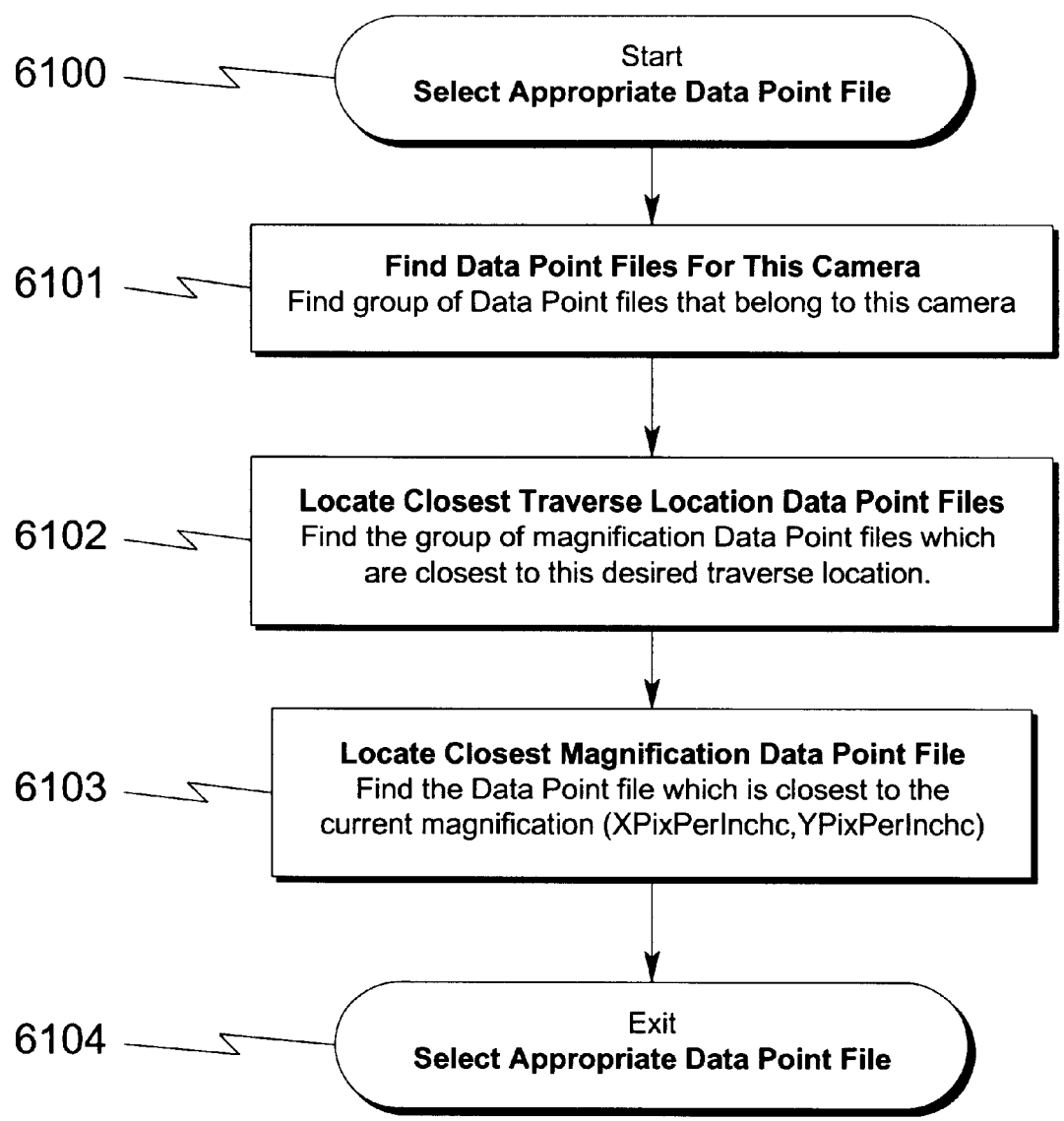
Figure 62:
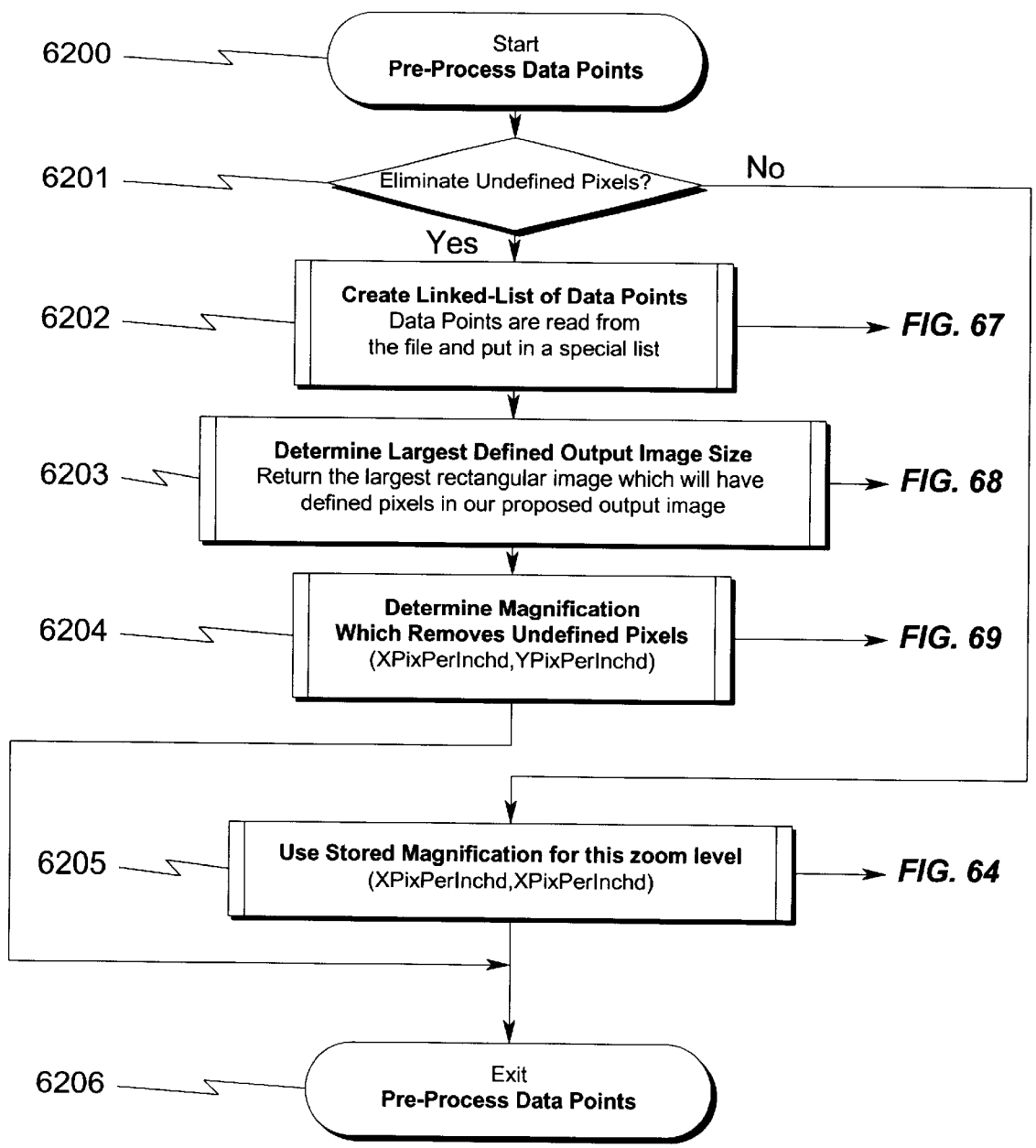
Figure 63:
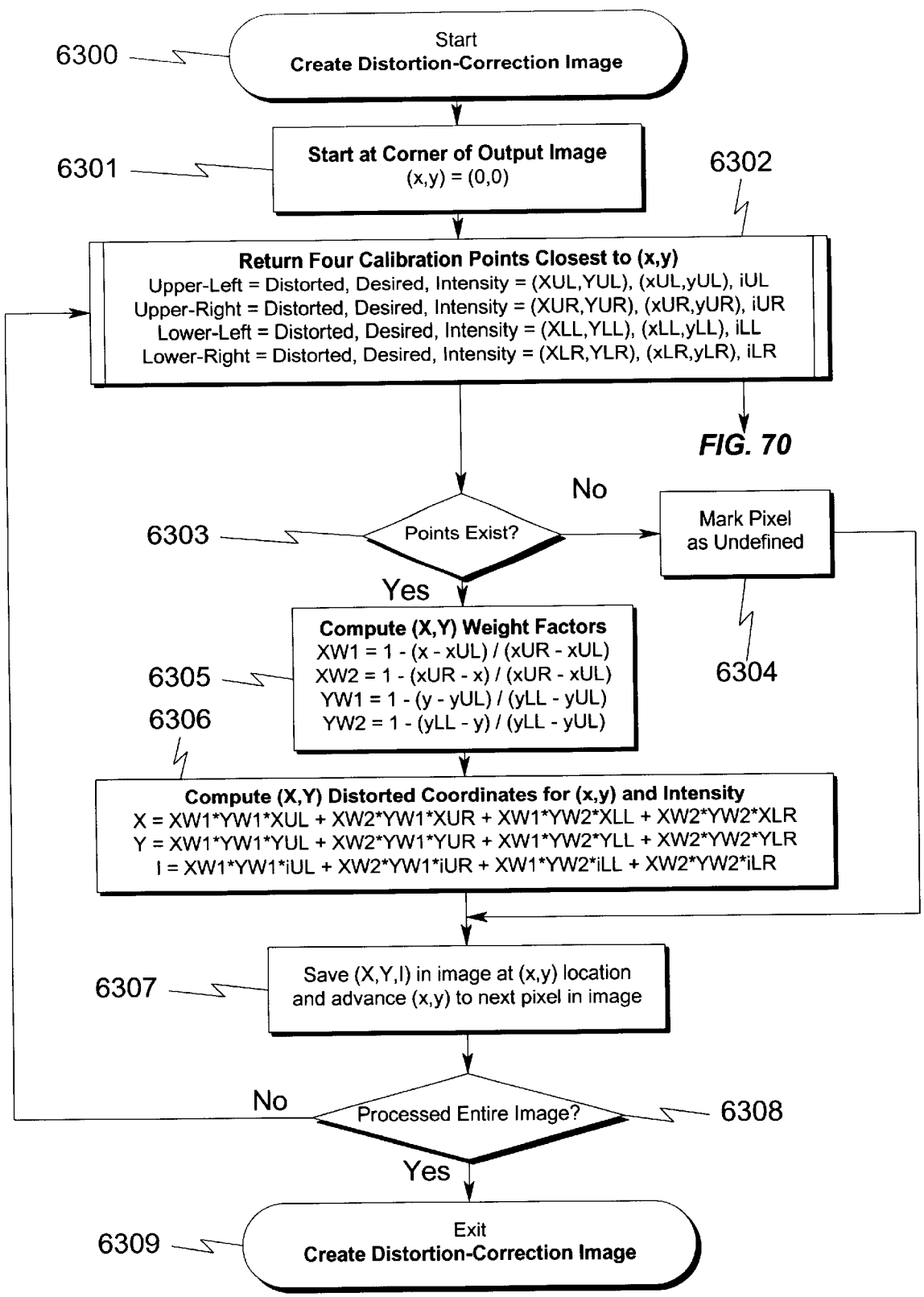

FIG. 59 illustrates the entire creation process of a single-plane version of a distortion-correction image (5900). First it will be necessary to piece together all the information needed. The camera centerline coordinates were calculated and stored permanently on the system as a result of the "Calibration Procedure". They are freely available. The next thing needed is the current magnification of the source image and this information can be obtained in several ways (5901). FIG. 60 illustrates the three ways of calculating this information and will be explained in more detail later. The source image traverse location is obtained from the traversing mechanism (0700) and is freely available if the camera is motor-driven. The Data Point file is located on the mass storage device based on how closely its magnification and traverse location matches the source (5902). FIG. 61 illustrates this process and will be described later. The last piece of information missing is the destination image magnification. This can be obtained from one of two ways. It is either a fixed or desired value, or it can be calculated based on the viewing quality of the output image. FIG. 62 illustrates this process and will be described later. Finally with all the necessary information at hand, the distortion-correction image can be fabricated (5904, 5905). FIG. 63 gives all the detail involved in the creation of the distortion-correction image and will be described below.

With the calculation of either a single or three-plane distortion-correction image, the distortion-free system can now process images. The next major section "The Distortion-Free System in Action", details how images are rid of their distortion and the theory behind this.

Obtaining the Current Magnification

The current magnification is defined as a relationship between the pixels in the image and actual distances viewed. The magnification is expressed in Pixels/Inch values for X and Y. There are three methods of determining the current magnification (XpixPerInchc,YpixPerInchc). If the camera has a fixed lens or the zooming-lens always positions perfectly, it is possible to draw upon the "Locked" magnifications that were calculated in the "Calibration Procedure" section. The "Locked" values were established from the geometric calibration plate (0900) during the calibration procedure for each zoom level. If the "Locked" values can not be used for various reasons, the system will have to examine some sort of pre-set geometric target in the image plane to obtain the current magnification. For this purpose, two systems of obtaining the current magnification on the fly will be described. These methods are by no means limited. Any geometric target could be used for this purpose as long as it lies in the image plane and is distinguishable by standard image processing.

The first on-the-fly method for measurement of the current magnification is a specially designed half-plate (1700). This plate is installed on one extreme of the traversing mechanism (0700). The camera samples this plate in order to determine magnification. This procedure is explained in more detail later. The second method for determining magnification in the exemplary system embodiment is the sampling of registration marks (1800) on the printed substrate. These marks and their geometric capabilities will be described later.

Current Magnification Fixed from Calibration

Figure 64:
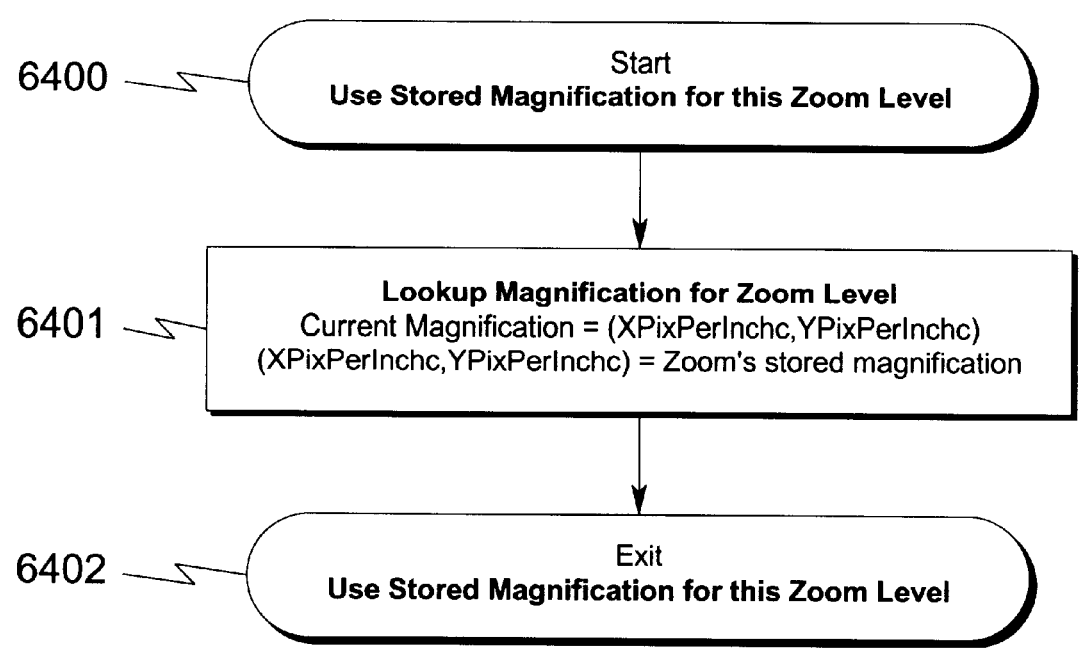

FIG. 59 describes the calculation of the distortion-correction image (5900). The first step in performing this function is to obtain the current magnification (XpixPerInchc,YpixPerInchc) (5901). FIG. 60 illustrates this process (6000). As previously discussed, if the camera has a fixed lens or the zooming-lens always positions perfectly, it is possible to draw upon the "Locked" magnifications that were calculated in the "Calibration Procedure" section (6001). The "Locked" values were established from the geometric calibration plate (0900) during the calibration procedure for each zoom level. FIG. 64 illustrates how these values are obtained (6400). The system looks-up the zoom level for the camera in question in permanent memory and returns the magnification values (6401, 6402).

Current Magnification from Half-Plate

Figure 17:
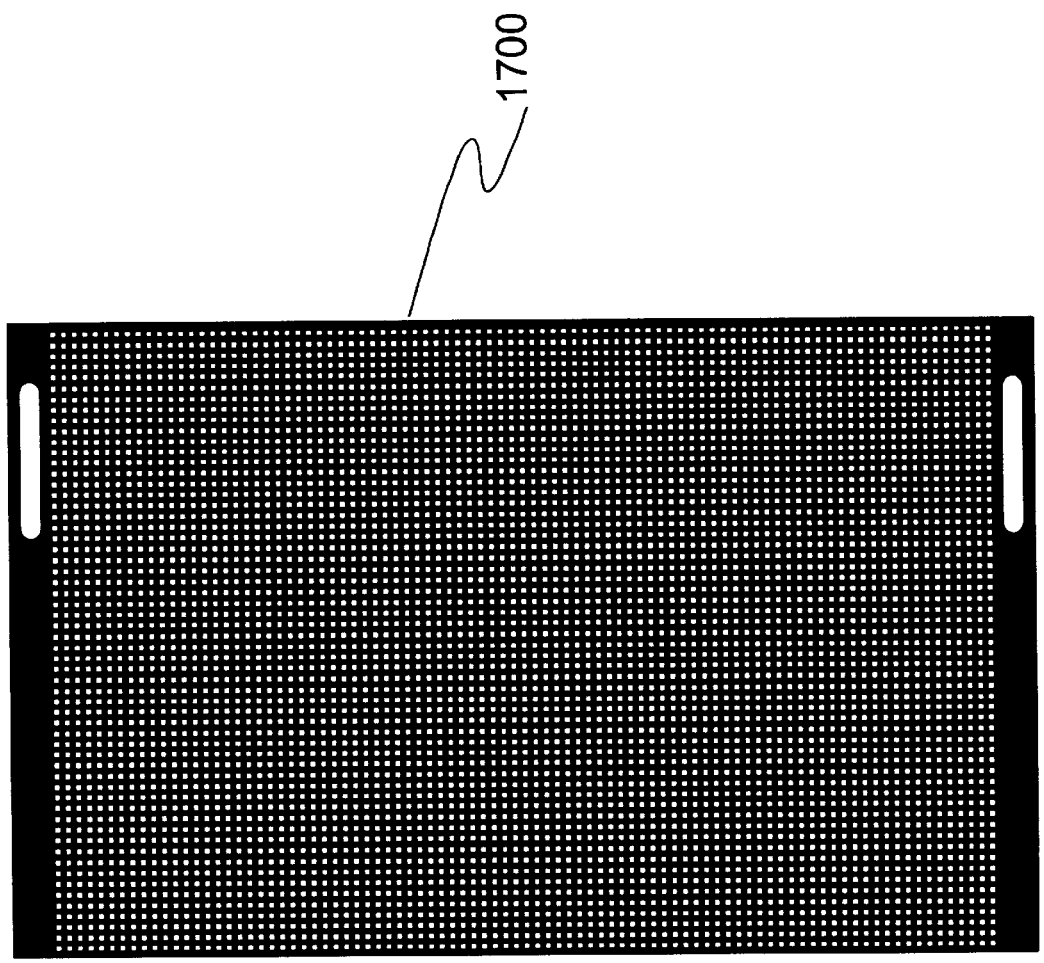
FIG. 17 illustrates an exemplary half-sized geometric calibration plate.
Figure 65:
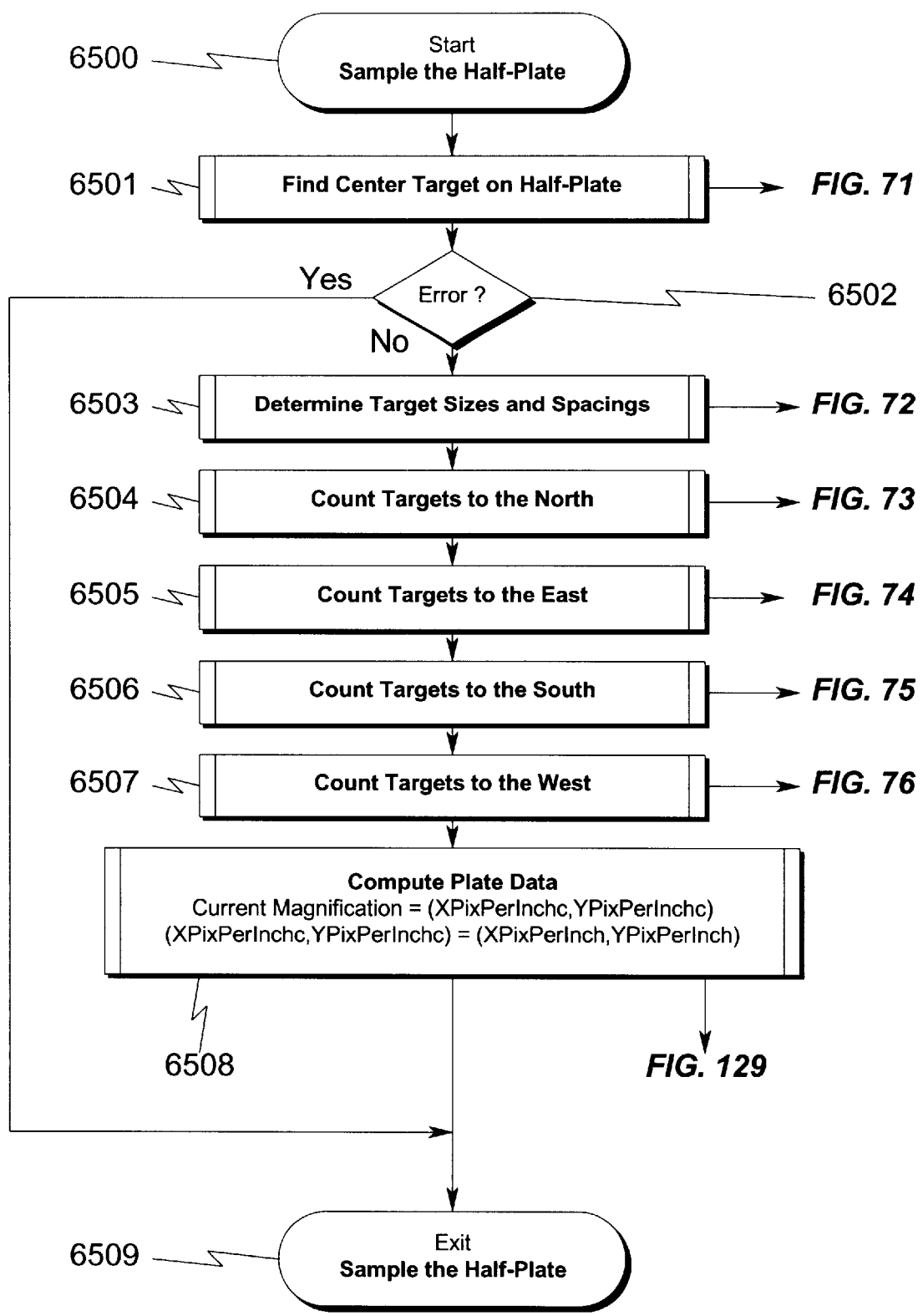

In applications where on-the-fly calculation of the current magnification is required (6003), the system will sample a specially designed (1700) half-plate (6004). FIG. 65 illustrates this procedure (6500). The plate (1700) is installed on one extreme of the traversing mechanism and can be viewed by positioning the camera to the extreme of the traversing mechanism. FIG. 17 is an illustration of the half-plate and FIG. 12 is an illustration of the half-plate installed (1202) on the traversing mechanism (0700).

The plate (1700) itself is comprised of small white squares (1 millimeter in size) separated by 1 millimeter of space in all directions. This plate (1700) is manufactured using printed circuit board (PCB) fabrication technology to give very accurate dimensions. FIG. 17 illustrates the half-plate design. When positioned over the plate, the half-plate targets occupy one-half of the image area. This area is adequate for the determination of magnification and provides for a narrower traversing mechanism.

Figure 71:
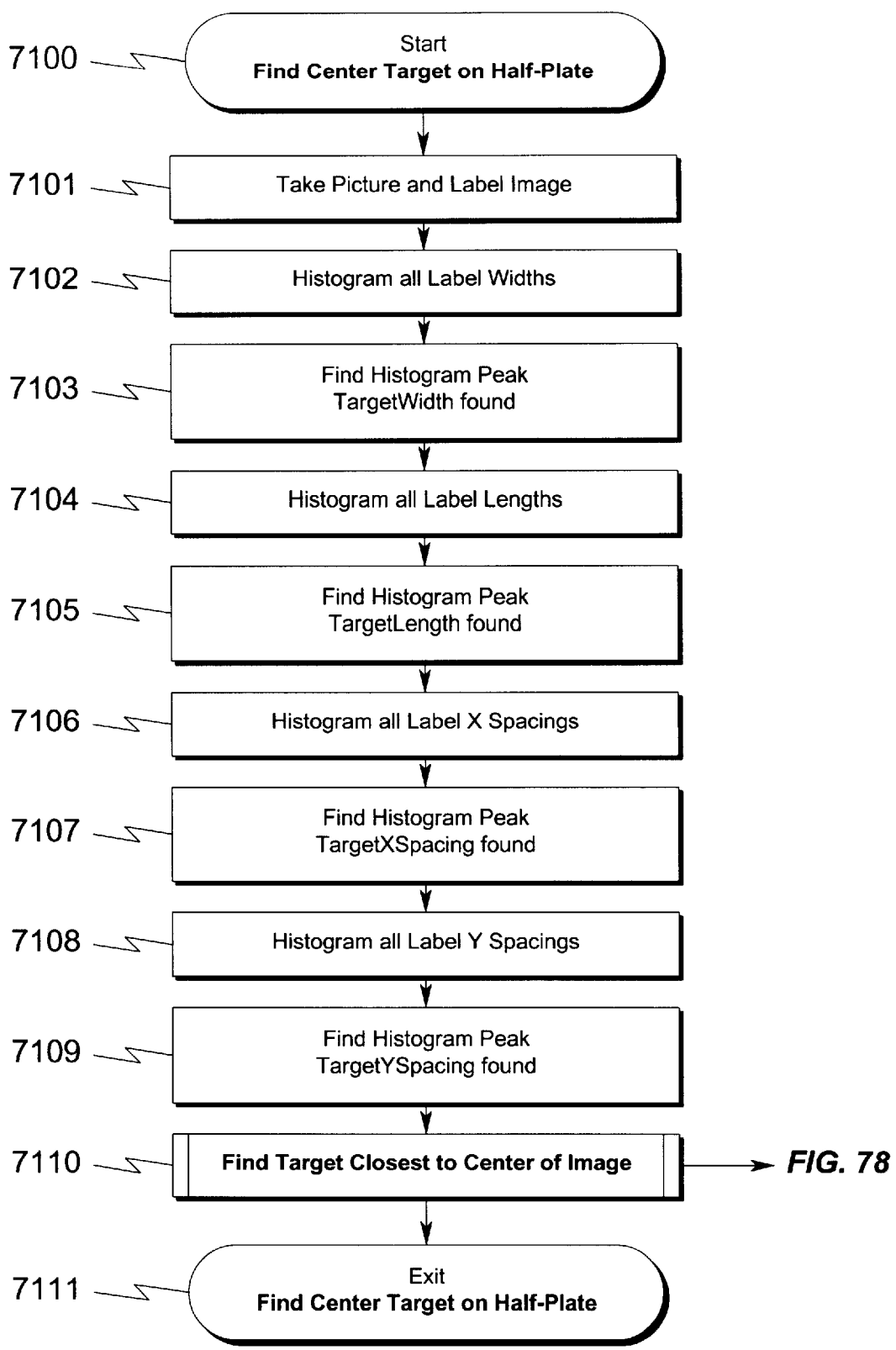

The first step in determining magnification from the half-plate (1700) is to recognize the white targets and find the target that is situated the closest to the image center (6501). FIG. 71 illustrates this process (7100). The camera is driven over to the extreme of the traversing mechanism (0700) and an image is acquired from the half-plate (7101). The image has a label list generated (7101). A label list is a list of all the white squares detected in the image and their locations in the image. This is accomplished by thresholding the image to separate dark background from white targets and then performing a labeling operation. The list is then histogrammed for each of the desired dimensions and a peak or most-predominant dimension is extracted.

Figure 78:
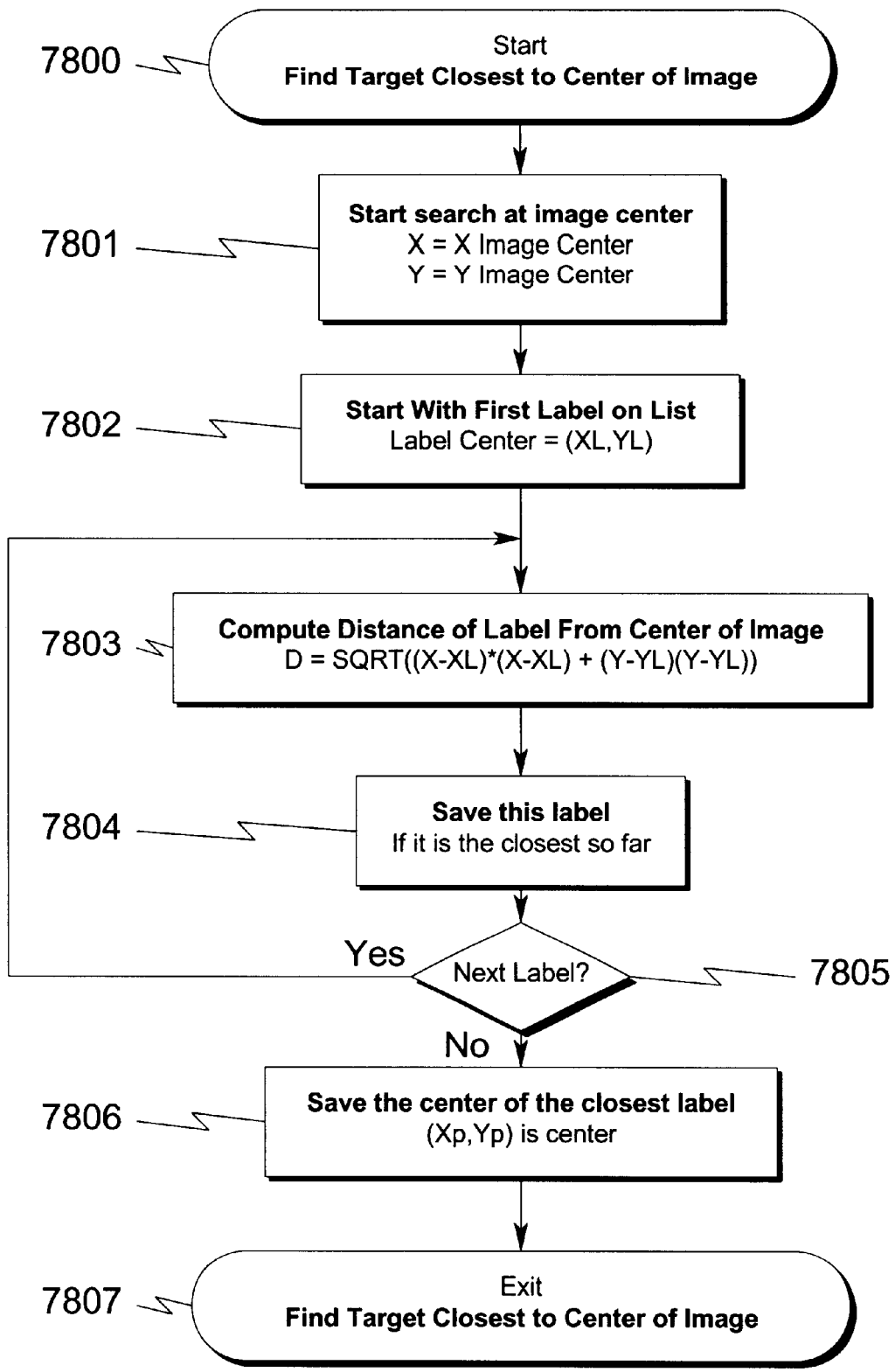

First the label widths are histogrammed (7102) and the most-predominant width (peak in histogram) is determined (7103). The target length is found in a similar manner (7104, 7105) followed by the X spacing of the targets (7106, 7107) and the Y spacing (7108, 7109). After this information is calculated, the white target that is closest to the center of the image is located (7110). FIG. 78 illustrates this process (7800). The center of the image is chosen as the coordinate to match to (7801). The system starts with the first label on the list (7802). It computes the distance of the center of this label to the center of the image (7803). The system stores this label if it is closest so far (7804). It continues this process until it runs out of labels (7805). The closest label has its center saved (7806) and processing continues (7807, 7111).

Figure 72:
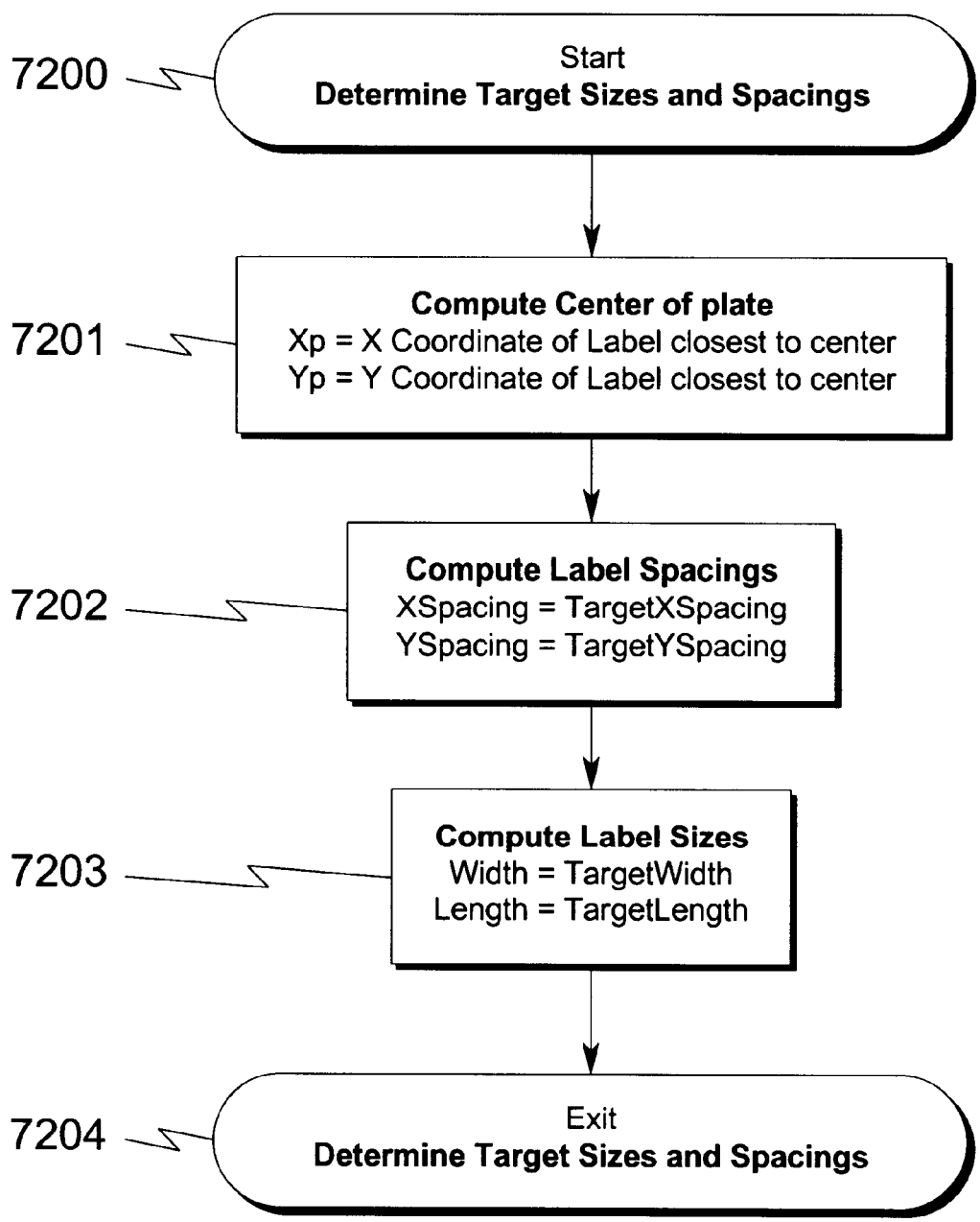
Figure 73:
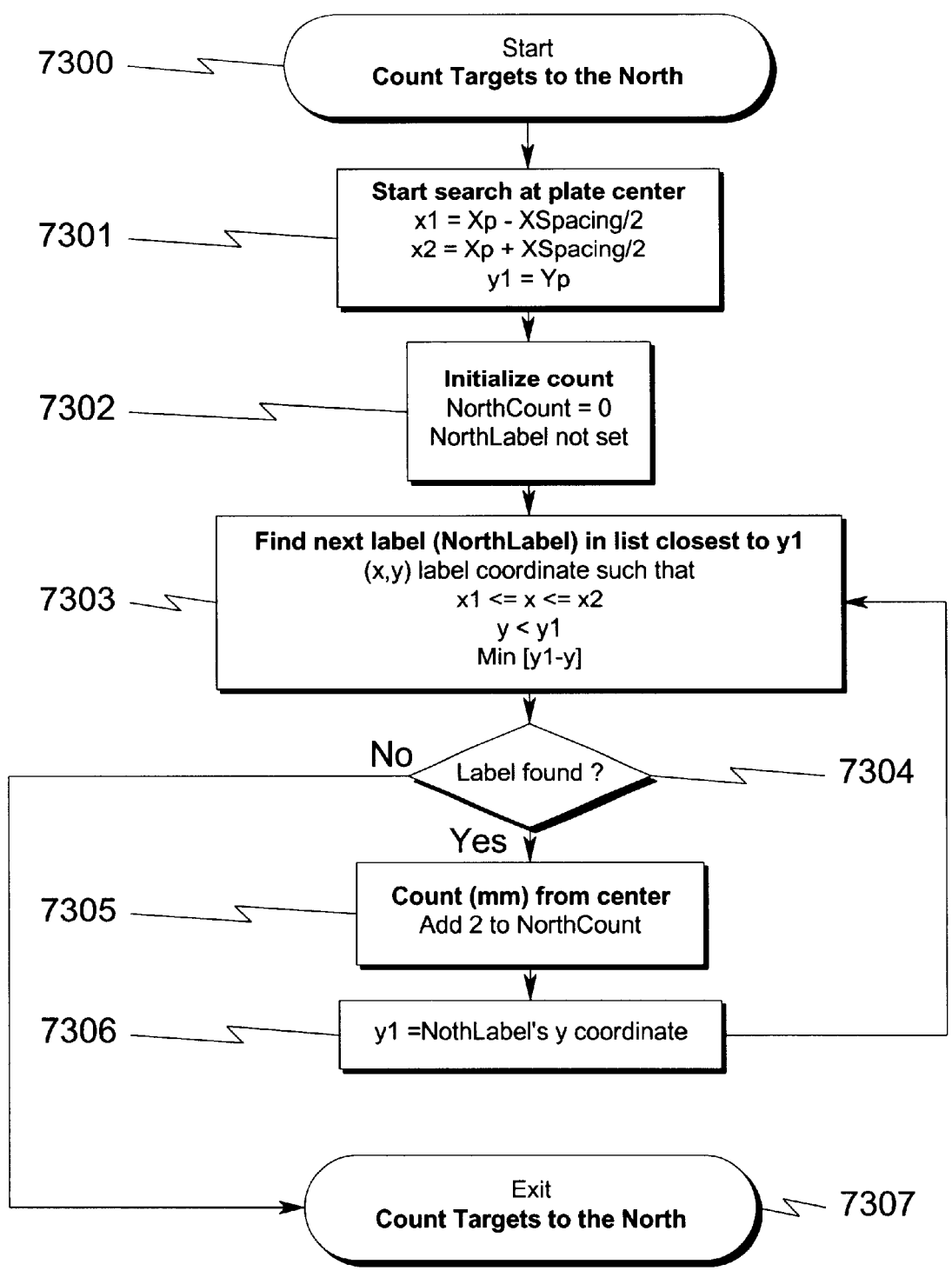

The operation is then checked for the lack of a center label (6502). If no label was found, processing can not continue and the system aborts the procedure (6509). If the center label was found (6502), the next step is to obtain size and spacing information about the targets (6503). FIG. 72 illustrates this process (7200). The center of the plate (1700) (the center label's center) is recalled (7201), the target spacings are recalled (7202), and the target sizes are recalled (7203). The system returns (7203) and the most-northerly white target from the center target is located (6504). FIG. 73 illustrates this process (7300). The search is started at the center of the plate (7301) and the Millimeter (mm) Count is initialized (7302). The next label directly NORTH of the starting position is located (7303). If this label is not found (7304), the system assumes completion and returns with the Millimeter (mm) Count (7307). If a label was detected (7304), the system adds 2 millimeter to the count (7305) and moves the starting search location above this label (7306). The operation continues the search for more labels (7303).

Figure 74:
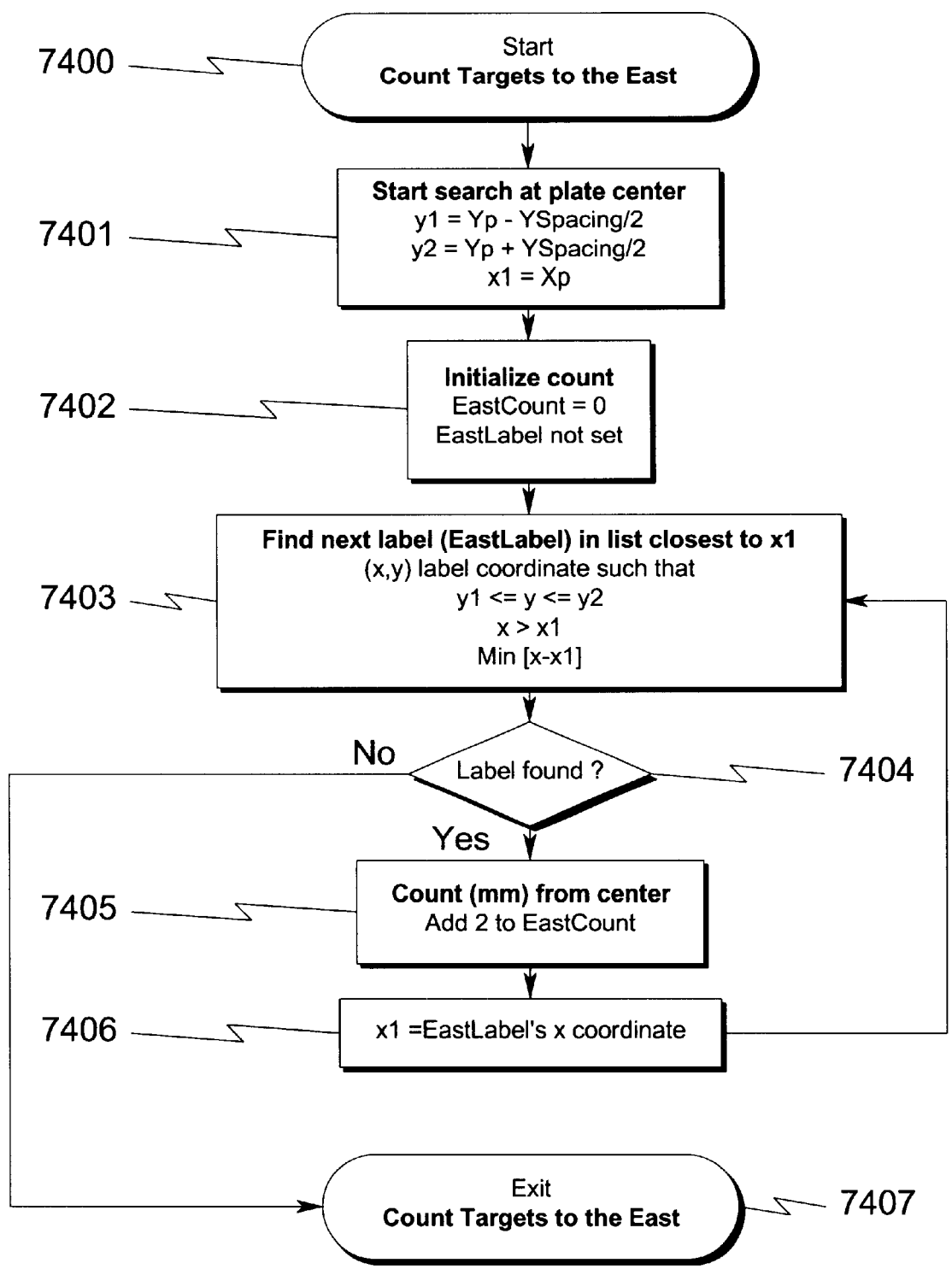
Figure 75:
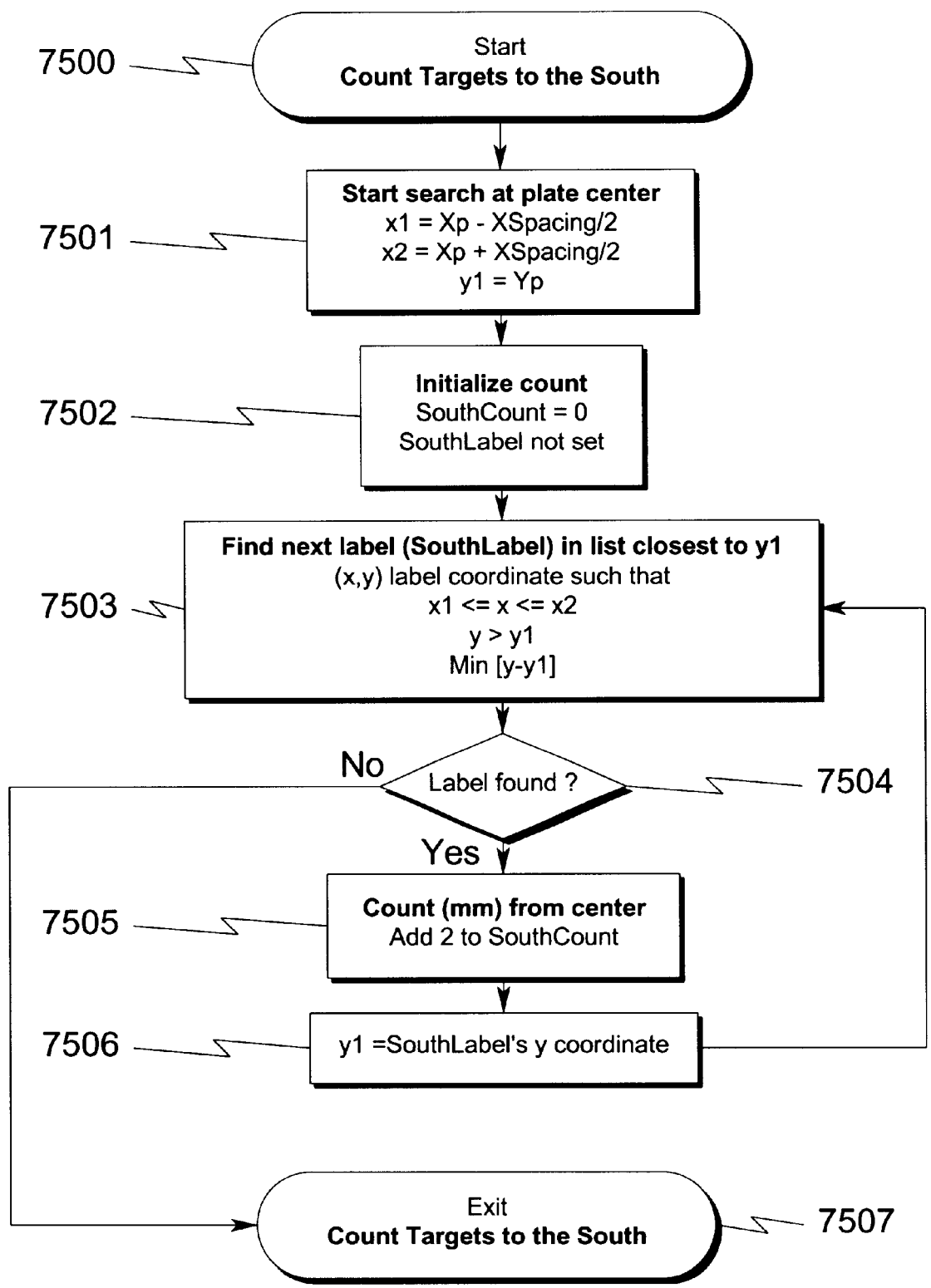
Figure 76:
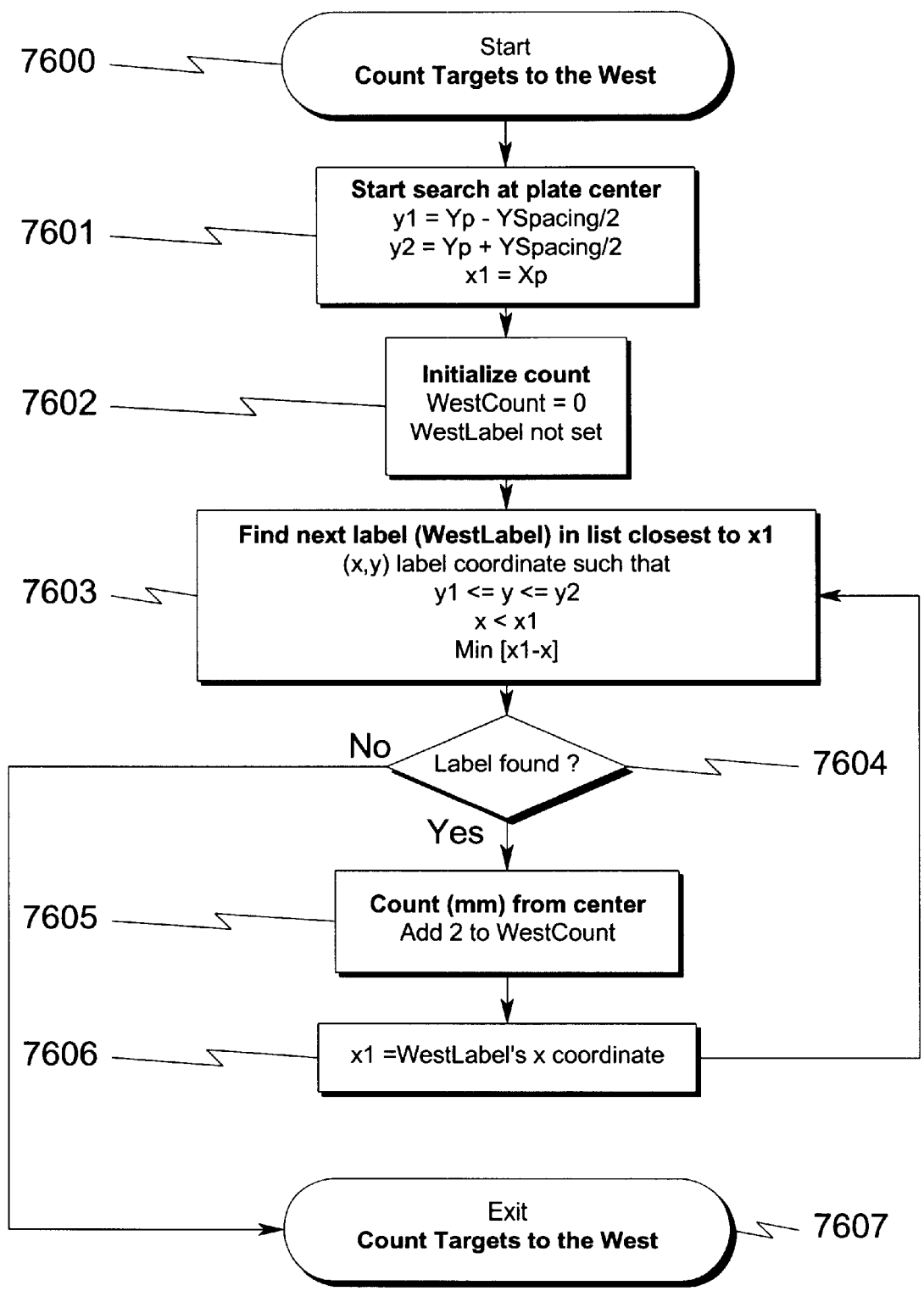
Figure 77:
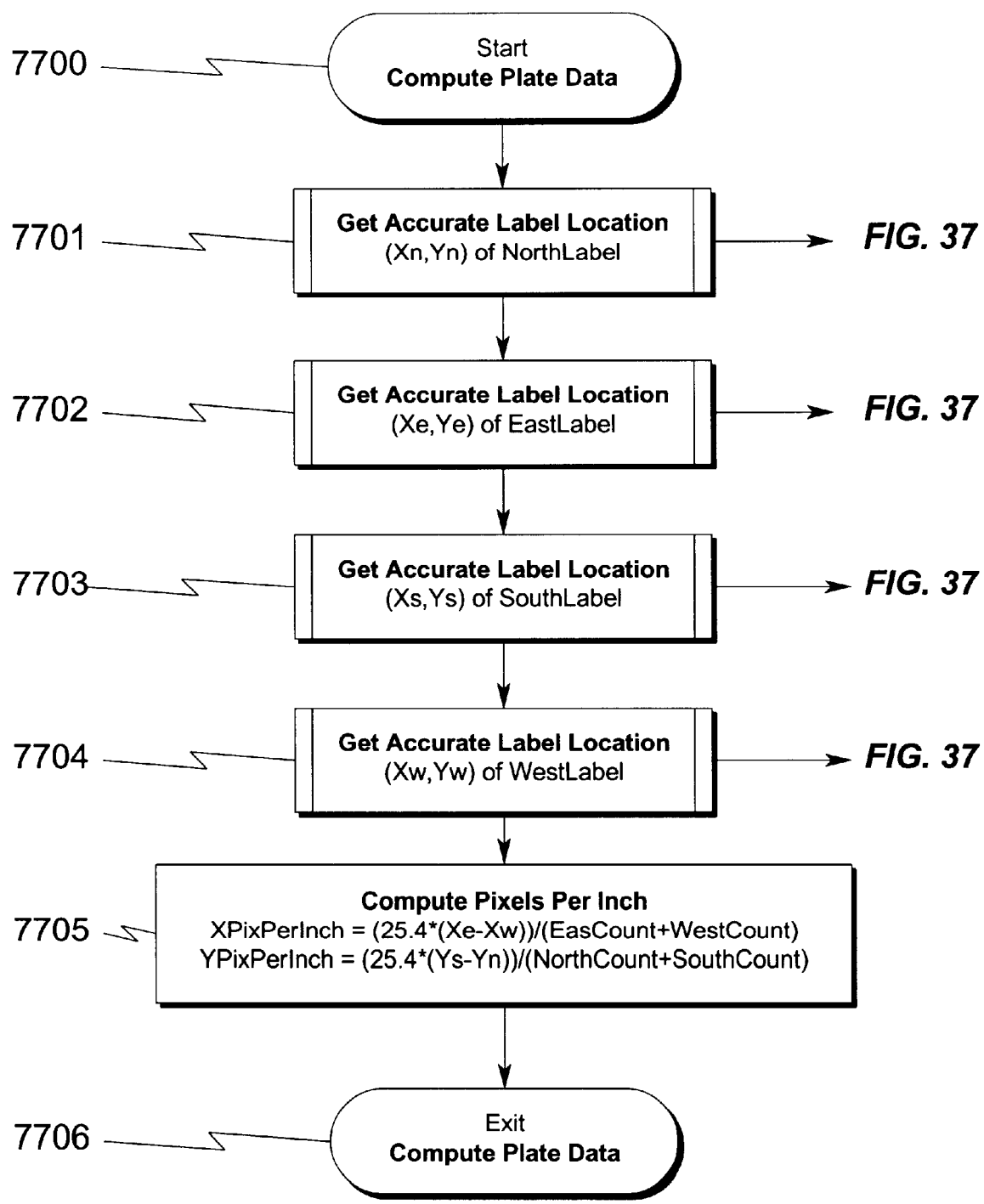

After the program returns (7307), the NORTH-MOST label has been located and the Millimeter (mm) Count from the center label is recorded (6504). A similar process for locating the EAST-MOST (6505), SOUTH-MOST (6506), and WEST-MOST (6507) labels and Millimeter (mm) Counts is performed. FIG. 74–76 illustrate these similar processes. From all the data compiled thus far, it is possible to compute the current magnification from the half-plate (6508). FIG. 77 illustrates these calculations (7700). Each label detected is scanned for its accurate center (7701, 7702, 7703, 7704). FIG. 37, which was described in the "Calibration Procedure" section, is used for these calculations. With these accurate centers located and the Millimeter (mm) Counts computed, it is possible to compute the current magnification (7705). The system returns with the current magnification (7706, 6509, 6007).

Current Magnification from Printed Marks

Figure 18:
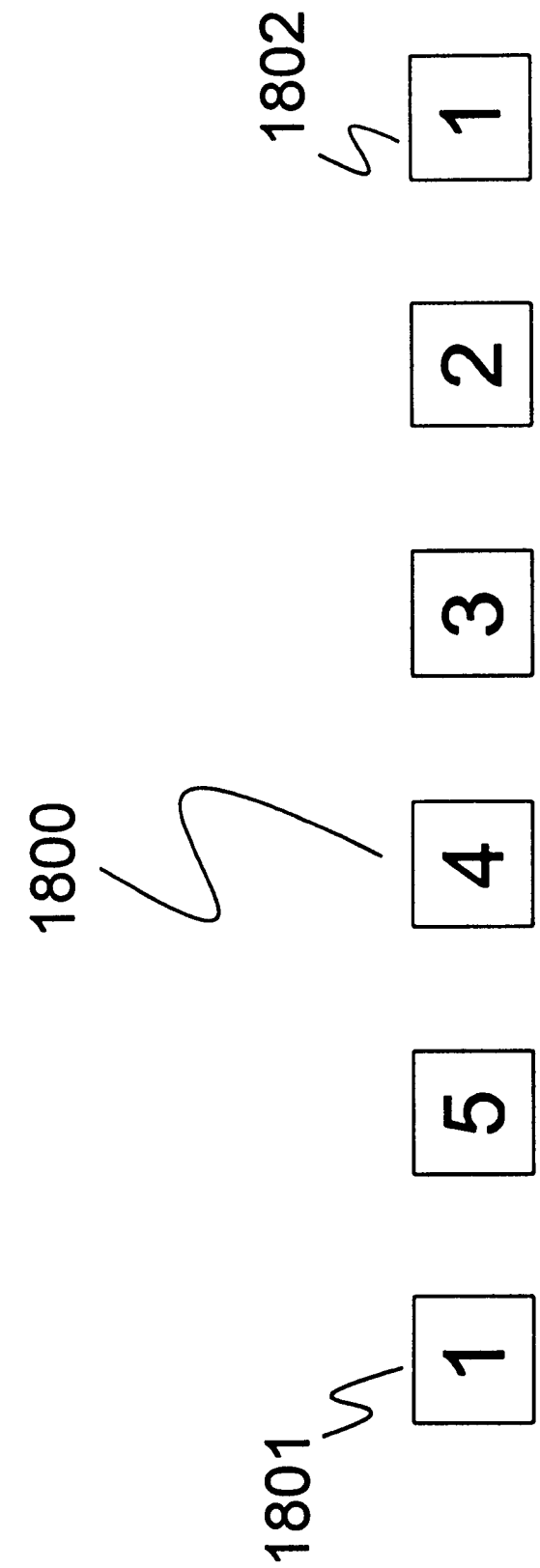
FIG. 18 illustrates exemplary registration marks used in the disclosed system and method.

In the exemplary system embodiment that scans printed substrates, small registration targets (1800) are sometimes printed (6005). FIG. 18 illustrates these targets as they might be printed and viewed by a camera. If this is the case (6005), the system can sample these targets which have pre-defined geometric dimensions. Due to the fact that the registration marks have special marks (Duplicate Marks) printed by one printing station (1801, 1802), the current magnification can be derived from them. The method of register mark recognition and the theory of these registration marks are described in detail in U.S. Utility Patent Application titled SYSTEM AND METHOD FOR REGISTER MARK RECOGNITION, Ser. No. 09/422,720, filed Oct. 22, 1999 and will not be duplicated here.

Figure 66:
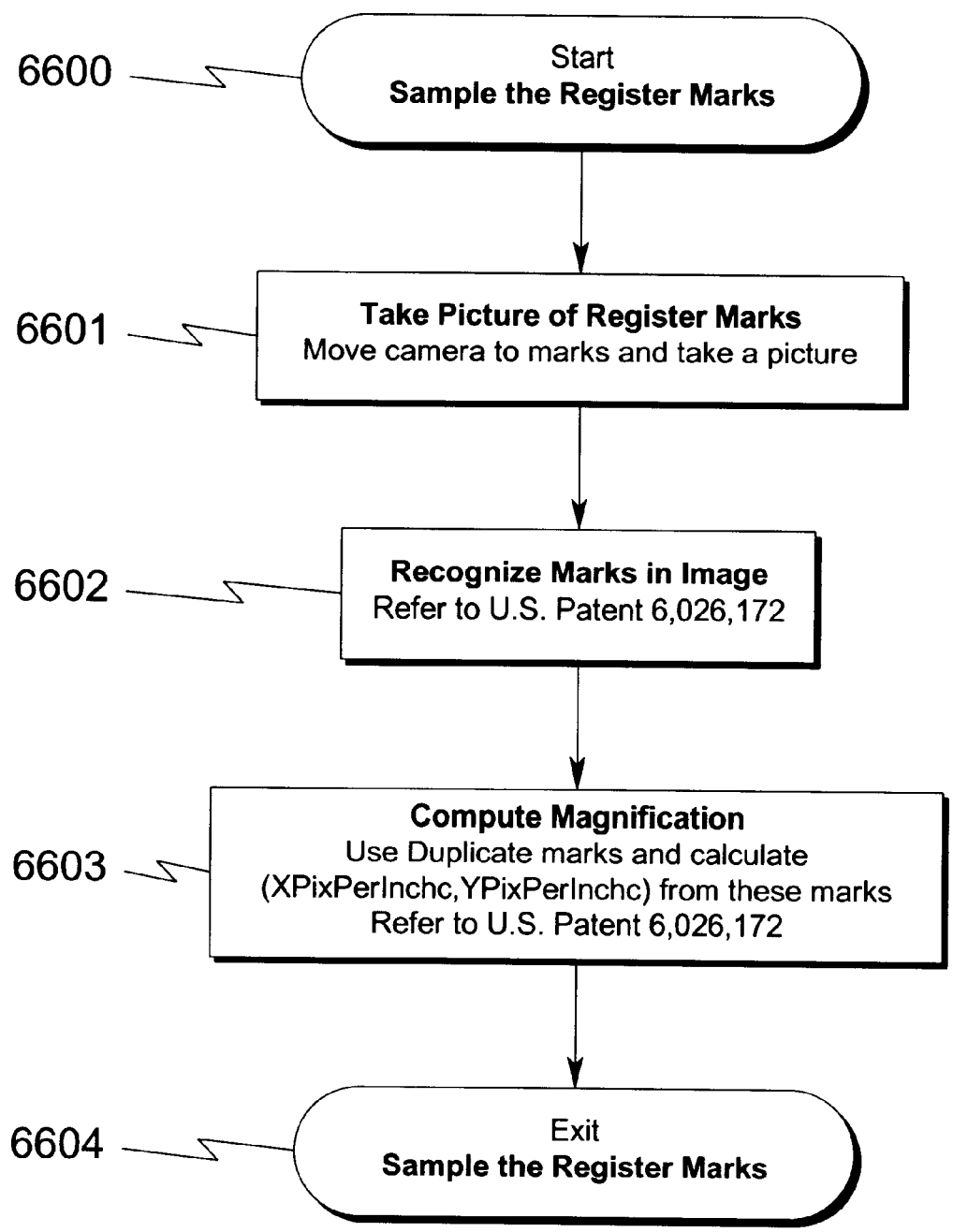

If the system can derive current magnification information from the registration marks (6005), it will position the camera to these marks and analyze them (6006). FIG. 66 illustrates this process in some detail (6600). First the camera is moved over the marks (1800) and a sample image is acquired (6601). The marks (1800) and there center locations are recognized in the image (6602). The current magnification is calculated from the Duplicate Marks (6603) and processing returns with the current magnification (6604, 6007).

Selecting the Appropriate Data Point File

The next important piece of information necessary for the computation of the distortion-correction image is the Data Point file (5902). FIG. 61 illustrates how this file is located (6100). Depending on the camera selected, only the files pertaining to the camera in question are considered (6101). If a traversing mechanism (0700) is employed, only the closest traverse location files are considered (6102). Finally, depending on the current magnification, the Data Point file with the magnification closest to the current is selected (6103). The system returns with this file (6104).

Data Point File to Linked-List of Data Points

Figure 67:
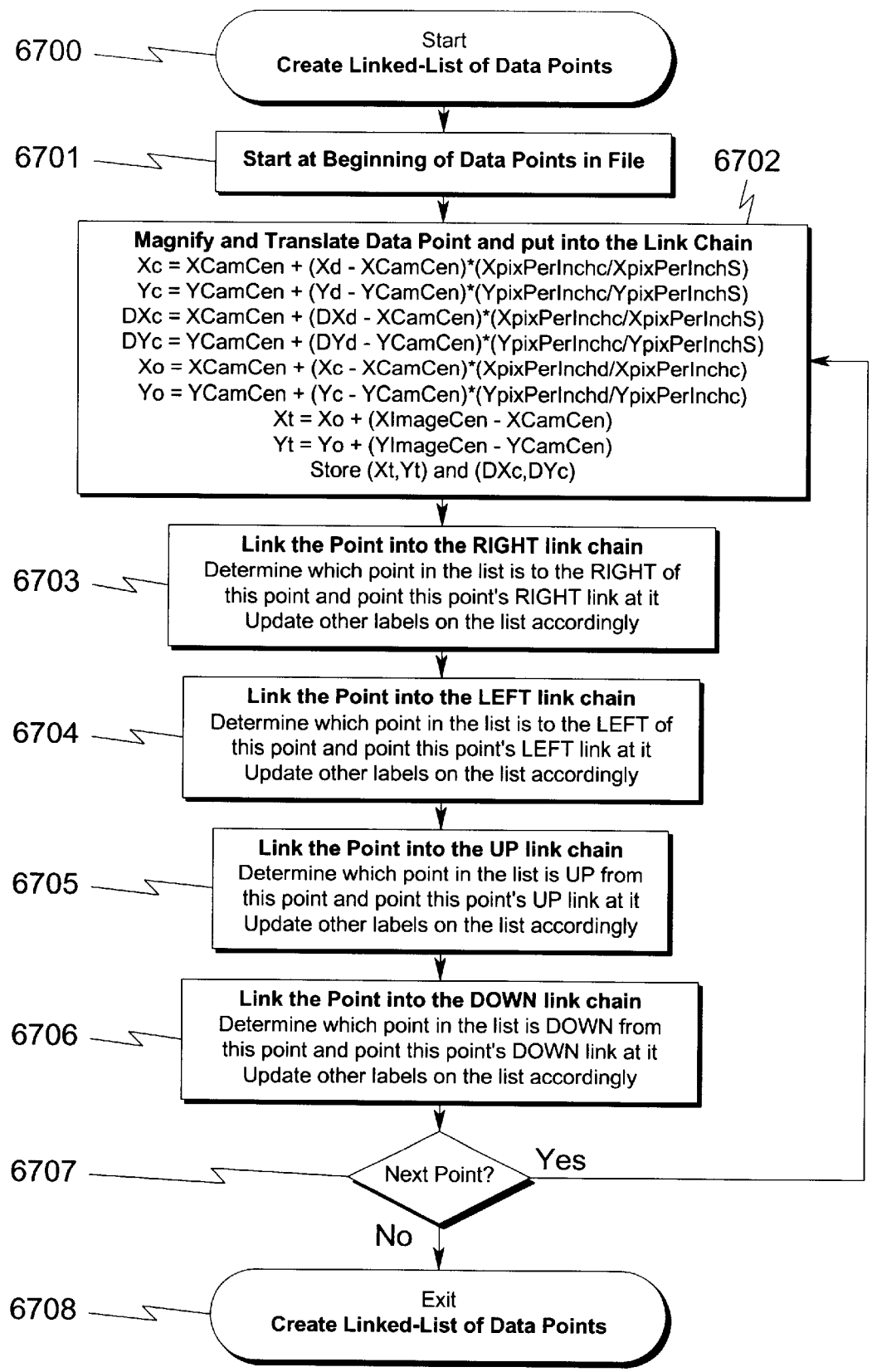

If one recalls from earlier discussion in the "Calculation of Data Point Files from Calibration Image Files" section, the Data Points are retrieved from a file known as the "Data Point File". This file was retrieved from mass storage and this process was described in the "Selecting the Appropriate Data Point File" section. These points are a series of matched coordinate pairs, which were derived from examining the calibration plate (0900). The matched pairs of coordinates give the desired location of a white calibration target to its actual coordinate as viewed by a camera. Along with these points, the Data Point File also contains the magnification, which existed during the sampling of the calibration plate (XpixPerInchS, YpixPerInchS). The following describes the data points stored in the Data Point File:

(Xd,Yd) Is the desired x,y coordinate of a target (DXd,DYd) Is the distorted or actual x, y coordinate Before these points can be used to produce a distortion-correction image, they must first be pre-processed so they represent the current and desired magnifications present on the system. Additionally it is advantageous to also organize them into an easily managed linked-list. This list is organized in such a way to easily locate adjacent Data Points from one another. FIG. 67 illustrates the procedure for creation of the linked-list of Data Points (6700). As mentioned earlier, a Data Point consists of a desired coordinate matched with its corresponding distorted coordinate. The distorted coordinates (DXd,DYd) need to be magnified or de-magnified to accurately represent the input image. The desired coordinates (Xd,Yd) need to be magnified or de-magnified to accurately represent the desired output image's magnification. Processing starts at the beginning of all the Data Points in the file (6701) and perform the following calculations on each Data Point to bring the coordinates into the current source image's magnification (6702).

Given Values:

(XpixPerInchS,YpixPerInchS) Magnification of Data Points (XpixPerInchc,YpixPerInchc) Current Magnification (XCamCen,YCamCen) Camera centerline pixel Calculate (Xc,Yc): Current image desired coordinates:

$$Xc = XCamCen + (Xd - XCamCen) \times \frac{XpixPerInchc}{XpixPerInchS} \quad (13)$$

$$Yc = YCamCen + (Yd - YCamCen) \times \frac{YpixPerInchc}{YpixPerInchS} \quad (14)$$

Calculate (DXc,DYc): Current image distorted coordinates:

$$DXc = XCamCen + (DXd - XCamCen) \times \frac{XpixPerInchc}{XpixPerInchS} \quad (15)$$

$$DYc = YCamCen + (DYd - YCamCen) \times \frac{YpixPerInchc}{YpixPerInchS} \quad (16)$$

At this point each Data Point is now mapped into the current image's magnification. The next operation is to map the desired coordinates into the output image's magnification. The following calculations are performed on each Data Point to bring the coordinates into the output image's magnification (6702).

Given Values:

(XpixPerInchd,YpixPerInchd) Destination Magnification

Calculate (Xo,Yo): Output image desired coordinates:

$$Xo = XCamCen + (Xc - XCamCen) \times \frac{XpixPerInchd}{XpixPerInchc} \quad (17)$$

$$Yo = YCamCen + (Yc - YCamCen) \times \frac{YpixPerInchd}{YpixPerInchc} \quad (18)$$

We now have coordinate pairs that accurately reflect the magnifications involved. The last desired operation needed is a translation of the points. In the "Calibration Procedure", "Compute Camera Center" section, it was discussed how the camera centerline pixel was determined. Also discussed was how the frame-grabber electronics could sometimes compensate for this location and force it to be the actual image center. Most of the time, however, this is not the case and it is desirable to make the camera centerline pixel the center of the image. To accomplish this, a translation operation is performed on the Data Points. The following calculations are performed on each Data Point to force the centerline pixel to lie on the image center (6702).

Given Values:

(XImageCen,YImageCen) Image centerline pixel Calculate (Xt,Yt): Translated output image coordinates:

$$Xt = Xo (X\ ImageCen\ X\ CamCen) \quad (19)$$

$$Yt = Yo (Y\ ImageCen\ Y\ CamCen) \quad (20)$$

After each Data Point is processed in this manner (6702), it is then stored on the linked-list (6702). After installation on the linked-list, the Data Point is then linked into four link chains that relate each Data Point to one another. It is linked into the RIGHT link chain (6703), which allows quick lookup of points to the RIGHT of this point. Similarly, it is linked into the LEFT, UP, and DOWN link chains (6704, 6705, 6706). If there are anymore points in the Data Point File (6707), they are processed (6702), otherwise the linked-list of Data Points is ready for use (6708).

Adjusting Desired Magnification to Remove Undefined Pixels

In some cases when the output image has equal or less magnification than the source image, there are output pixels Ace that are undefined. This is due to the fact that their source image pixel is not in the source image. When this is the case, it could be desirable depending on the application to remove these undefined output pixels. These pixels are always found on the periphery of the output image and can be removed by magnifying the image to force them outside the output image. To accomplish this, a special two-pass pre-processing operation is performed on the Data Points (5903). FIG. 62 illustrates this two-pass process (6200). If this operation is desirable (6201), then the first-pass is to magnify and translate the Data Points as described in the "Data Point File to Linked-List of Data Points" section (6202).

Figure 68:
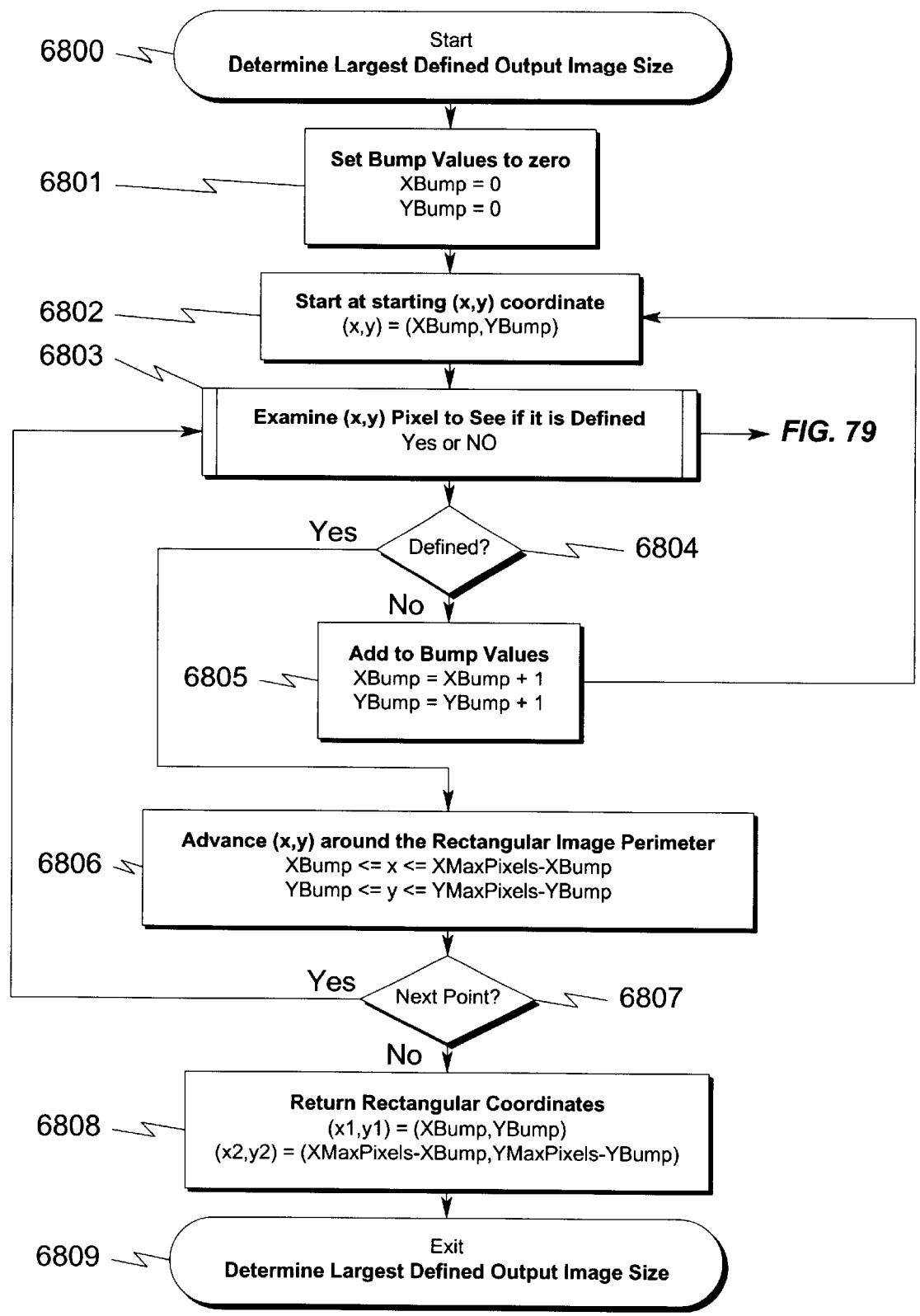
Figure 79:
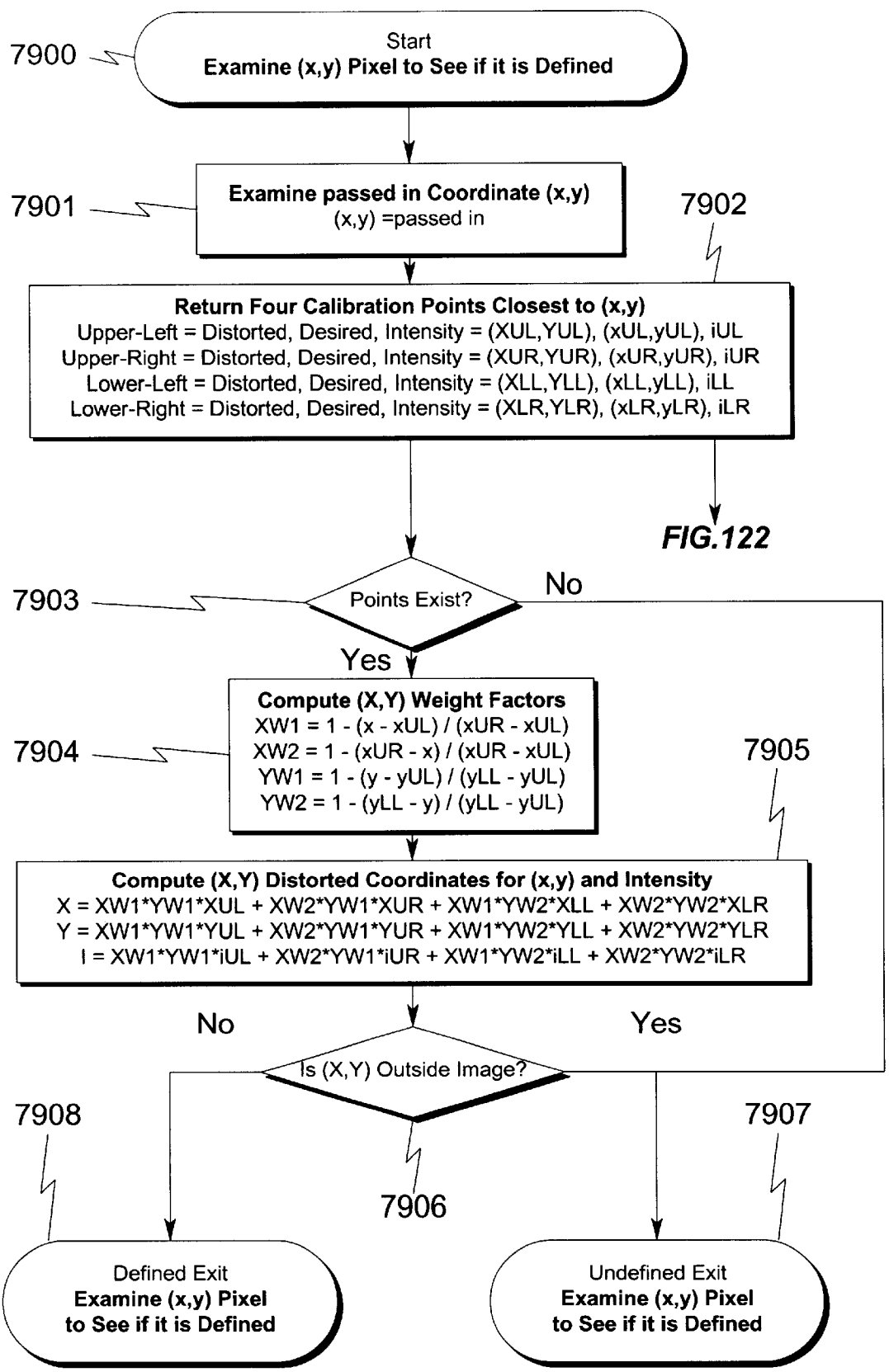

After this operation, the system determines the largest defined output image size (6203). FIG. 68 illustrates this process (6800). First the X and Y "Bump" values are initialized to zero (6801). These values are a measure of how far the image needs to be shrunk until all undefined pixels are removed. The system starts at (x,y)=(XBump, YBump) (6802) and then examines the pixel location to see if it is defined (6803). FIG. 79 illustrates how a pixel is examined (7900). The passed in coordinate (x,y) is examined (7901). The linked list of Data Points is searched to return the four Data Points that surround the desired coordinate (7902).

Figure 70:
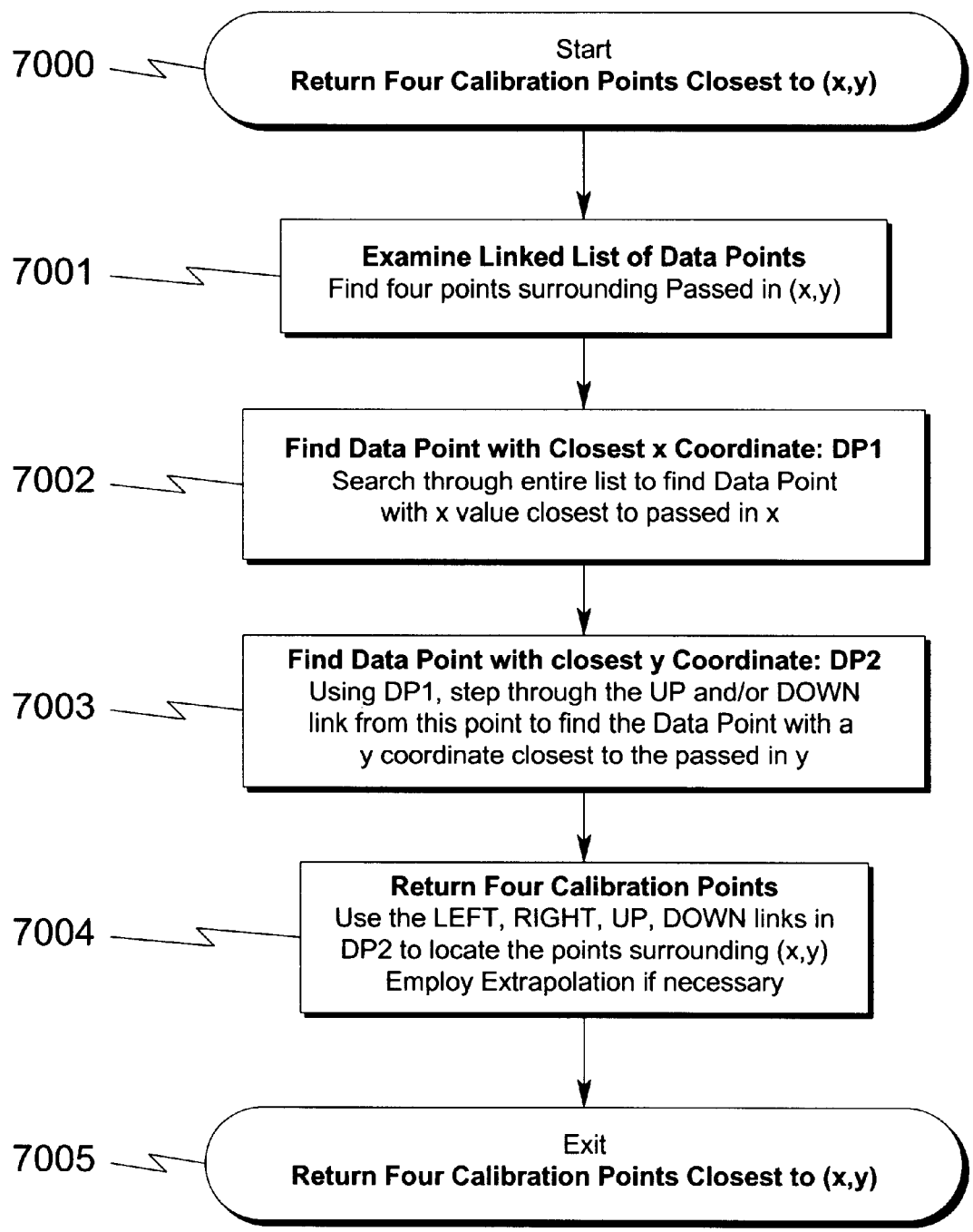

FIG. 70 illustrates this process (7000). First the linked list is searched to find the point DP1 which has X coordinate which is closest to the passed in X coordinate (7002). Using this Data Point DP1, the UP and/or DOWN linked lists are searched from this point to locate the Data Point DP2 which has the closest Y coordinate closest to the desired coordinate (7003). Using the UP, DOWN, LEFT, and RIGHT linked lists from the Data Point DP2, the four surrounding Data Points are determined (7004). For (x,y) coordinates close to the periphery of the image, extrapolation is sometimes necessary to locate the four surrounding points (7004). The system returns (7005) and a check is made to make sure the four points were located (7903). If it was not possible to locate the four points (7903), the system returns with and undefined status (7907). If the four points were located (7903), the system computes weights based on the desired point's location to each of the four Data Points (7904). These weights are then used to interpolate between the four Data Points to come up with this point's distorted coordinates and intensity (7905).

After computing these distorted coordinates (7905), the system checks to see if the point is inside the image (7906). If it is not (7906), an undefined status is returned (7907). If the point lies inside the image (7906), a defined status is returned (7908). The system returns and checks the undefined or defined status (6804). If the point is undefined (6804), the XBump and YBump values are increased to shrink the image size (6805) and the system starts the check using these new "Bump" values (6802). If the pixel is defined (6804), the system checks the next pixel along the periphery of the current image size (6806). If there are no more points to check (6807), the system calculates the image size (6808) and returns it (6809). If there are more points to check (6807), the system continues the check (6803).

Figure 69:
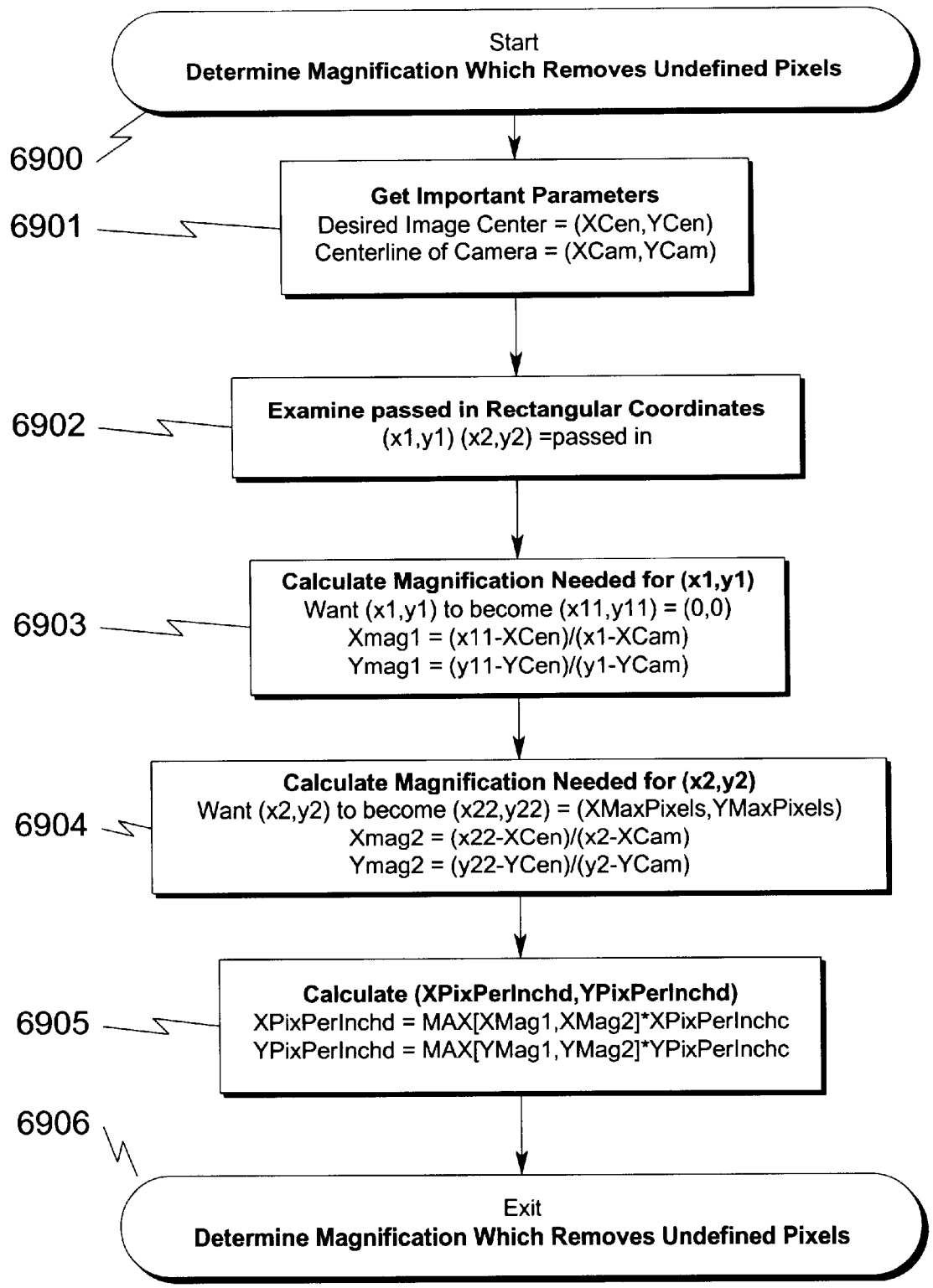

With the defined image size calculated (6203), the system now determines the desired magnification that will remove all undefined pixels (6204). FIG. 69 illustrates this process (6900). Given the desired image center and centerline pixel location of the camera (6901) along with the passed in defined image size (6902), the system calculates the desired magnification that will remove all undefined pixels (6903, 6904). First the magnification that places the upper-left corner of the defined image size on coordinate (0,0) is determined (6903). The system then determines the magnification necessary to place the lower-right corner of the defined image size on the maximum image size coordinate (6904). The desired magnifications (XPixPerInchd, YPixPerInchd) are determined by selecting the largest magnifications calculated (6905). The system sets and returns this magnification (6906, 6206).

Creation of the Distortion-Correction Image

With a desired magnification determined (5903), it is now possible for the system to create the distortion correction image. The linked list of Data Points is created based on the desired and current magnifications and the Data Point File selected (5904). FIG. 67 illustrates this process (6700). This procedure has already been discussed in the "Data Point File to Linked-List of Data Points" section. From this list, the distortion correction image is produced (5905). FIG. 63 illustrates this process (6300). As discussed earlier, the distortion correction image is an image of (X,Y,I) values. An output pixel (x,y) is input and the (X,Y,I) values are output. The (X,Y,I) values are the coordinates and intensity of the source pixel for the desired output pixel (x,y). To compute this image, the system starts at the upper-left corner (0,0) (6301) and computes (X,Y,I) values for each (x,y) output pixel in the distortion correction image. First the four surrounding Data Points for the output pixel (x,y) are located (6302). FIG. 70 illustrates this process (6100). This process has already been discussed in the "Adjusting Desired Magnification to Remove Undefined Pixels" section. If the Data Points do not exist for the output pixel (x,y) (6303), the pixel is marked as undefined (6304) and processing continues for the image (6307). If the four Data Points do exist (6303), weight factors are calculated based on the location of the output pixel to each of the four Data Points (6305). The distorted coordinates (X,Y) and intensity (I) are calculated by using these weights and interpolating between the four Data Points (6306). The system then saves the (X,Y,I) data in the distortion correction image (6307) and checks to see if the entire image has been processed (6308). If it has not (6308), processing continues (6302). If the image is completely processed (6308), the system exits (6309, 5906).

At this point a distortion correction image is ready for use in the distortion free system for the camera and magnification desired. As discussed earlier, this procedure outlined the process for computing a single plane distortion correction image. If three or more planes are desired, this process is run again on each of the planes desired to produce a three-plane or multi-plane distortion correction image.

The Distortion-Free System in Action

Overview

Figure 19:
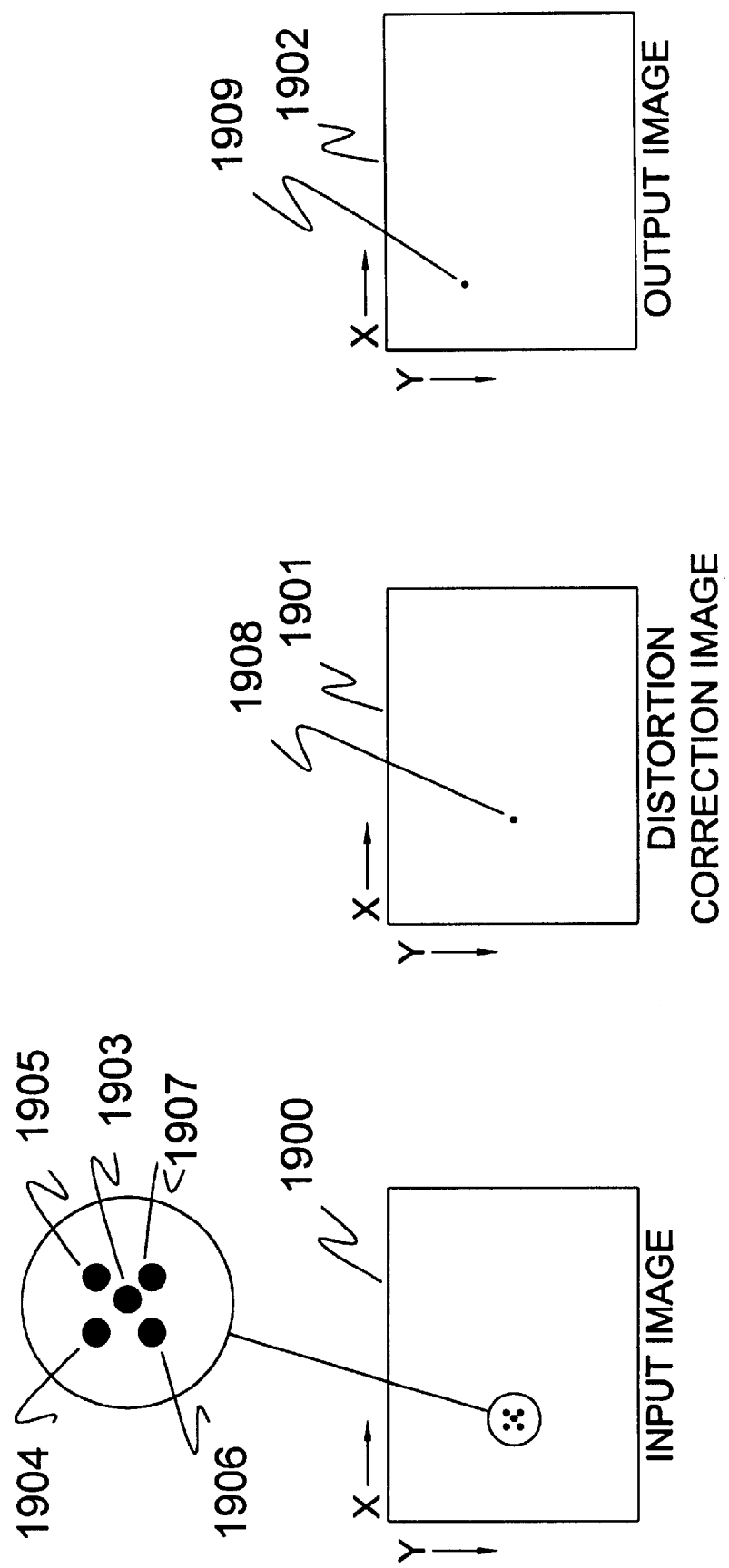
FIG. 19 illustrates a sequence of calibration a camera system having a multiplicity of errors.
Figure 80:
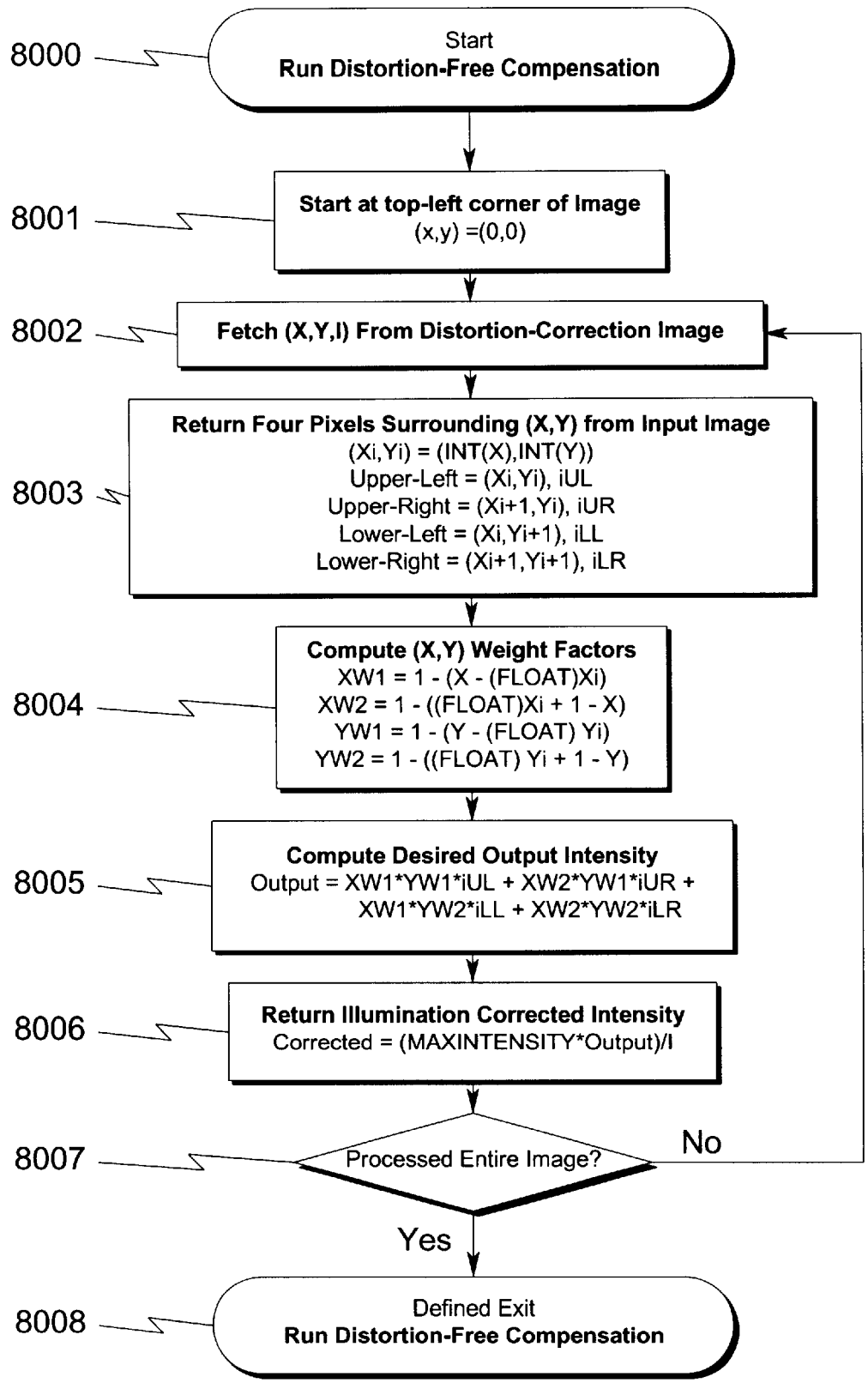

FIG. 19 illustrates the concept behind the distortion-free system in action. There are basically three objects in this process: the input image (1900), the distortion-correction image (1901), and the output image (1902). Each coordinate (x,y) in the output image (1909) is lookup to the distortion-correction image (1908) producing (X,Y,I) values. The four pixels (1904, 1905, 1906, 1907) in the input image are located which surround the (X,Y) coordinate and their intensity values are used in an interpolation to produce an output intensity for the output image. The output intensity value is further processed, if desired, to remove any illumination anomalies based on the I-value and a MAXINTENSITY value (usually 255). FIG. 80 illustrates this process and is outlined in the next section. As mentioned earlier, if a three-plane or multi-plane version of the distortion-free system is being utilized, this process is run separately for each plane of the image.

General Procedure

The flowchart in FIG. 80 illustrates the process of removing all distortion of an input image to produce a distortion-free output image (8000). This is the process that is run on every plane of the image. As discussed earlier, in a three-plane or multi-plane distortion-free application, each plane is run separately with separate distortion-correction image data. FIG. 80 illustrates the process on a single plane. The reader must remember that this process must be run on each plane with the same data (single-plane distortion-free application) or with separate data (three-plane or multi-plane distortion-free application).

Processing begins at the top-left corner of the output image at coordinate (x,y)=(0,0) (8001). The (X,Y,I) values are fetched from the distortion-correction image at coordinate (x,y) (8002). The (X,Y) floating point coordinates are truncated to produce the (Xi,Yi) integer coordinates (8003). The intensities of the four adjacent pixels (1904, 1905, 1906, 1907) are read from the (Xi,Yi), (Xi+1,Yi), (Xi,Yi+1), and (Xi+1,Yi+1) coordinates (8003). These intensities are labeled iUL, iUR, iLL, and iLR respectively (8003). The weights are computed for interpolation purposes (8004). An interpolation is performed in order to determine the intensity at (X,Y) (8005). This resulting intensity is then compensated for illumination anomalies by scaling relative to a MAXINTENSITY (255 for example) and the I-value fetched from the distortion correction image (8006). The resulting intensity is then stored in the output image (1909). If the image has not been fully processed (8007), the system continues processing (8002). If processing has completed (8007), the system has completed distortion correction (8008).

Computer Software

As would be known by one skilled in the art and as indicated in the exemplary embodiments above, the system and method described herein and generally illustrated in FIGS. 1–83 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft® Windows™ operating environment and/or equivalent operating environments in all their variations or their equivalent commercial embodiments, including but not limited to any system incorporating a graphical user interface.

CONCLUSION

A system and method for correcting distortions that occur in image capture systems is disclosed. The present invention in some preferred embodiments includes provisions to correct or change magnification differences for all causes including position errors in zoom lens positioning mechanisms as well as those caused by chromatic aberration, CCD alignment errors, lens distortion off center variations, pincushion/barrel lens distortion, magnification distortions, camera and lens misalignment errors, and lighting variations (including flash-to-flash illumination variations). A significant feature of the present invention in contrast with the prior art is that with the use of a movable calibration plate in the present invention it is possible to image capture both the calibration plate and the input object image in a single image capture, thus permitting simultaneous compensation for a variety of lighting and illumination variations not possible with the prior art.

Although a preferred embodiment of the present invention has been illustrated in the accompanying Drawings and described in the foregoing Detailed Description, it will be understood that the present invention is not limited to the embodiments disclosed, but is capable of numerous rearrangements, modifications, and substitutions without departing from the spirit of the present invention as set forth and defined by the following claims.

What is claimed is:

1. An image capture system comprising:
   (a) a geometric calibration plate;
   (b) an illumination calibration plate;
   (c) one or more lens(es) or optics;
   (d) an imaging system;
   (e) one or more imaging plane(s);
   (f) an image processor;
   wherein
   said lens (es)/optics are used in conjunction with said imaging system to image said geometric and/or illumination calibration plate(s) to form an image correction database under control of said image processor;
   an image correction database is used to create a distortion correction image under control of said image processor; and
   said image processor permits application of said image correction database and/or said distortion correction image to an input object image to produce a distortion-free output image; and
   said image processor simultaneously corrects for sources of geometric distortions, lighting variations, color variations, and magnification variances in said input object image.

2. The image capture system of claim 1 wherein said image processor is a personal computer.

3. The image capture system of claim 2 wherein said personal computer utilizes a Microsoft® Windows™ operating environment.

4. The image capture system of claim 1 wherein said image processor communicates over the Internet to access a reference image and/or a reference image archive database.

5. The image capture system of claim 1 wherein said image processor first corrects for pixel geometric distortions and then assigns measured lighting values to said pixel positions.

6. The image capture system of claim 1 further comprising a camera digitization calibration system means.

7. The image capture system of claim 1 wherein said calibration plate(s) further comprise white and/or color chips to permit lighting values on said chips to correct for flash-to-flash variations in said object image illumination.

8. The image capture system of claim 1 wherein said calibration plate(s) are movable within the field of view of said input object image.

9. The image capture system of claim 1 wherein said calibration plate(s) are contained within the field of view of said input object image permitting said input object image to be corrected for flash-to-flash illumination variations.

10. The image capture system of claim 1 wherein said calibration plate(s) are contained at the edge of the field of view of said input object image permitting said input object image to be corrected for flash-to-flash illumination variations.

11. The image capture system of claim 1 wherein said image correction database further comprises
   (1) means for setting an operating iris to full open;
   (2) means for setting offsets;
   (3) means for setting gains;
   (4) means for setting the optimum iris value;
   (5) means for setting said operating iris to said optimum value;
   (6) means for setting offsets based on said optimum iris value; and
   (7) means for setting gains based on said optimum iris value.

12. An image capture method comprising:
   (1) image capturing a geometric calibration plate;
   (2) image capturing an illumination calibration plate;
   (3) generating an image correction database;
   (4) generating an image correction image;
   (5) capturing an image of an input object to be correctly imaged;
   (6) applying said image correction database and/or said image correction to said input object image; and
   (7) generating a distortion free output image from the results of step (6);
   wherein
   said image capture method simultaneously corrects for sources of geometric distortions, lighting variations, color variations, and magnification variances in said object image.

13. The image capture method of claim 12 wherein one or more steps are performed on a personal computer.

14. The image capture method of claim 13 wherein said personal computer utilizes a Microsoft® Windows™ operating environment.

15. The image capture method of claim 12 wherein said distortion free output image is compared to a reference image and/or a reference image archive database that is accessed over the Internet.

16. The image capture method of claim 12 wherein said image processor first corrects for pixel geometric distortions and then assigns measured lighting values to said pixel positions.

17. The image capture method of claim 12 further comprising a calibrating camera digitization means process.

18. The image capture method of claim 12 further comprising viewing white and/or color chips in the field of view and using corrected lighting values on said chips to correct for flash-to-flash variations in said object image illumination.

19. The image capture method of claim 12 wherein said calibration plate is movable within the field of view of said input object image.

20. The image capture method of claim 12 wherein said calibration plate is contained within the field of view of said input object image permitting said input object image to be corrected for flash-to-flash illumination variations.

21. The image capture method of claim 12 wherein said calibration plate is contained at the edge of the field of view of said input object image permitting said input object image to be corrected for flash-to-flash illumination variations.

22. The image capture method of claim 12 wherein said image correction database generation step further comprises (1) setting an operating iris to full open;

(2) setting offsets;

(3) setting gains;

(4) setting the optimum iris value;

(5) setting said operating iris to said optimum value;

(6) setting offsets based on said optimum iris value; and (7) setting gains based on said optimum iris value.

23. A computer usable medium having computer-readable program code means providing image capture functionality, said computer-readable program means comprising:

(1) computer program code means for image capturing a geometric calibration plate;

(2) computer program code means for image capturing an illumination calibration plate;

(3) computer program code means for generating an image correction database;

(4) computer program code means for generating an image correction image;

(5) computer program code means for capturing an image of an input object to be correctly imaged;

(6) computer program code means for applying said image correction database and/or said image correction to said input object image; and (7) computer program code means for generating a distortion free output image from the results of said means (6);

wherein said computer program code means for image capturing simultaneously corrects for sources of geometric distortions, lighting variations, color variations, and magnification variances in said object image.

24. The computer usable medium of claim 23 wherein said medium is compatible with a personal computer (PC).

25. The computer usable medium of claim 24 wherein said personal computer utilizes a Microsoft® Windows™ operating environment.

26. The computer usable medium of claim 23 wherein said distortion free output image is compared to a reference image and/or a reference image archive database that is accessed over the Internet.

27. The computer usable medium of claim 23 wherein said computer program code means first corrects for pixel geometric distortions and then assigns measured lighting values to said pixel positions.

28. The computer usable medium of claim 23 further comprising computer program code means for calibrating camera digitization.

29. The computer usable medium of claim 23 further comprising computer program code means for viewing white and/or color chips in the field of view and using corrected lighting values on said chips to correct for flash-to-flash variations in said object image illumination.

30. The computer usable medium of claim 23 wherein said calibration plate is movable within the field of view of said input object image.

31. The computer usable medium of claim 23 wherein said calibration plate is contained within the field of view of said input object image permitting said input object image to be corrected for flash-to-flash illumination variations.

32. The computer usable medium of claim 23 wherein said calibration plate is contained at the edge of the field of view of said input object image permitting said input object image to be corrected for flash-to-flash illumination variations.

33. The computer usable medium of claim 23 wherein said image correction database further comprises (1) computer program code means for setting an operating iris to full open;

(2) computer program code means for setting offsets;

(3) computer program code means for setting gains;

(4) computer program code means for setting the optimum iris value;

(5) computer program code means for setting said operating iris to said optimum value;

(6) computer program code means for setting offsets based on said optimum iris value; and (7) computer program code means for setting gains based on said optimum iris value.

* * * * *